US009668225B2

(12) United States Patent
Li et al.

(10) Patent No.: US 9,668,225 B2
(45) Date of Patent: May 30, 2017

(54) METHODS AND APPARATUS FOR ACTIVE SUCCESSIVE INTERFERENCE CANCELLATION BASED ON ONE RATE FEEDBACK AND PROBABILITY ADAPTATION IN PEER-TO-PEER NETWORKS

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 822 days.

(21) Appl. No.: 12/164,431

(22) Filed: Jun. 30, 2008

(65) Prior Publication Data
US 2009/0017783 A1 Jan. 15, 2009

Related U.S. Application Data

(60) Provisional application No. 60/948,984, filed on Jul. 10, 2007.

(51) Int. Cl.
*H04B 1/10* (2006.01)
*H04W 52/32* (2009.01)
(Continued)

(52) U.S. Cl.
CPC .......... *H04W 52/325* (2013.01); *H04W 28/22* (2013.01); *H04W 52/10* (2013.01)

(58) Field of Classification Search
USPC ....... 370/229; 375/148; 455/296, 41.2, 41.1, 455/41.3, 63.1, 101, 501, 502, 503, 504,
(Continued)

(56) References Cited

U.S. PATENT DOCUMENTS 5,696,765 A 12/1997 Safadi
6,765,883 B1 7/2004 Van Heeswyk
(Continued)

FOREIGN PATENT DOCUMENTS

CN 1536925 A 10/2004
EP 1003302 5/2000
(Continued)

OTHER PUBLICATIONS

Sang Wu Kim, Young-J un Hong. Log-likelihood ratio based successive interference cancellation in CDMA systems[A]. Proc of VTC 2003 Spring [C]. Jeju, Korea : IEEE press, 2003, 4:2390-2393.*

(Continued)

*Primary Examiner* — Nay A Maung
*Assistant Examiner* — Erica Fleming-Hall
(74) *Attorney, Agent, or Firm* — François A. Pelaez

(57) ABSTRACT

A first receiver device receives a first pilot signal from a first transmitter device and a second pilot signal from a second transmitter device. The second pilot signal indicates that the second transmitter device intends to transmit a second traffic signal. The first receiver device determines a transmission rate for the first transmitter device as a function of the received signal strength of the first pilot and a predicted amount of the total interference to be perceived by the first receiver device. The predicted amount of the total interference being determined as a function of a SIC success probability. The transmission rate is sent to the first transmitter device. The first receiver device predicts whether the second traffic signal can be decoded and subtracted before the first receiver device decodes the first traffic signal to be transmitted by the first transmitter device as a function of the SIC success probability.

39 Claims, 41 Drawing Sheets

(51) Int. Cl.
*H04W 28/22* (2009.01)
*H04W 52/10* (2009.01)

(58) Field of Classification Search
USPC .......................................................... 455/506
See application file for complete search history.

(56) References Cited

U.S. PATENT DOCUMENTS

| | | | |
|---|---|---|---|
| 6,973,289 B2 | 12/2005 | Ue et al. | |
| 7,158,804 B2 | 1/2007 | Kumaran et al. | |
| 7,184,713 B2 | 2/2007 | Kadous et al. | |
| 7,298,805 B2 | 11/2007 | Walton et al. | |
| 8,019,372 B2 | 9/2011 | Kobayashi et al. | |
| 8,532,060 B2* | 9/2013 | Reumerman | H04W 24/00 370/255 |
| 2001/0053678 A1* | 12/2001 | Bonaccorso et al. | 455/137 |
| 2002/0068534 A1 | 6/2002 | Ue et al. | |
| 2002/0181410 A1 | 12/2002 | Bae et al. | |
| 2003/0023080 A1 | 1/2003 | Koch et al. | |
| 2003/0142645 A1 | 7/2003 | Belcea | |
| 2003/0165189 A1* | 9/2003 | Kadous | 375/225 |
| 2004/0102202 A1* | 5/2004 | Kumaran et al. | 455/515 |
| 2004/0110470 A1 | 6/2004 | Tsien et al. | |
| 2004/0192208 A1 | 9/2004 | Kong et al. | |
| 2004/0203459 A1 | 10/2004 | Borras-Chia et al. | |
| 2004/0208251 A1 | 10/2004 | Learned et al. | |
| 2004/0235472 A1 | 11/2004 | Fujishima et al. | |
| 2004/0242257 A1 | 12/2004 | Valkealahti et al. | |
| 2005/0063378 A1* | 3/2005 | Kadous | 370/389 |
| 2005/0176436 A1* | 8/2005 | Mantravadi et al. | 455/450 |
| 2006/0009149 A1 | 1/2006 | Baessler et al. | |
| 2006/0092881 A1* | 5/2006 | Laroia et al. | 370/331 |
| 2006/0205396 A1* | 9/2006 | Laroia et al. | 455/422.1 |
| 2006/0209712 A1 | 9/2006 | Morioka et al. | |
| 2006/0210001 A1* | 9/2006 | Li et al. | 375/346 |
| 2006/0215611 A1 | 9/2006 | Nakagawa et al. | |
| 2006/0229017 A1 | 10/2006 | Larsson et al. | |
| 2006/0245395 A1 | 11/2006 | Jain et al. | |
| 2006/0245398 A1* | 11/2006 | Li et al. | 370/335 |
| 2006/0251156 A1* | 11/2006 | Grant et al. | 375/148 |
| 2006/0258382 A1 | 11/2006 | Zhang et al. | |
| 2006/0286081 A1 | 12/2006 | Bordoni et al. | |
| 2007/0040704 A1* | 2/2007 | Smee et al. | 340/981 |
| 2007/0042784 A1* | 2/2007 | Anderson | 455/450 |
| 2007/0082620 A1 | 4/2007 | Zhang et al. | |
| 2007/0099647 A1 | 5/2007 | Lee et al. | |
| 2007/0141995 A1 | 6/2007 | Youn et al. | |
| 2007/0147535 A1 | 6/2007 | Niu et al. | |
| 2007/0171840 A1* | 7/2007 | Kim et al. | 370/252 |
| 2007/0173279 A1 | 7/2007 | Kuroda et al. | |
| 2007/0183533 A1 | 8/2007 | Schmidl et al. | |
| 2007/0243878 A1 | 10/2007 | Taira et al. | |
| 2007/0298762 A1 | 12/2007 | Morris | |
| 2008/0009306 A1 | 1/2008 | Suga et al. | |
| 2008/0026761 A1 | 1/2008 | Usuda et al. | |
| 2008/0075059 A1* | 3/2008 | Kermoal et al. | 370/343 |
| 2008/0112366 A1 | 5/2008 | Uchida et al. | |
| 2008/0146241 A1 | 6/2008 | Das et al. | |
| 2008/0160921 A1* | 7/2008 | Li et al. | 455/67.13 |
| 2009/0017759 A1 | 1/2009 | Li et al. | |
| 2009/0017760 A1 | 1/2009 | Li et al. | |
| 2009/0017761 A1 | 1/2009 | Li et al. | |
| 2009/0017762 A1 | 1/2009 | Jovicic et al. | |
| 2009/0017850 A1 | 1/2009 | Jovicic et al. | |
| 2009/0017859 A1 | 1/2009 | Seppinen et al. | |
| 2009/0069023 A1* | 3/2009 | Ahn et al. | 455/450 |
| 2009/0109943 A1 | 4/2009 | Yomo et al. | |
| 2009/0116571 A1 | 5/2009 | Imai et al. | |
| 2009/0201860 A1 | 8/2009 | Sherman et al. | |
| 2009/0268704 A1 | 10/2009 | Kim | |
| 2009/0304047 A1 | 12/2009 | Hulbert et al. | |
| 2010/0172295 A1 | 7/2010 | Sagfors et al. | |
| 2011/0051674 A1 | 3/2011 | Niedzwiecki et al. | |
| 2011/0105046 A1* | 5/2011 | Molnar et al. | 455/67.11 |

FOREIGN PATENT DOCUMENTS

| | | |
|---|---|---|
| EP | 1853006 | 11/2007 |
| GB | 2407005 | 4/2005 |
| GB | 2426150 | 11/2006 |
| JP | 2003209535 A | 7/2003 |
| JP | 2006101400 A | 4/2006 |
| JP | 2007067472 A | 3/2007 |
| JP | 2007166373 A | 6/2007 |
| JP | 2007515843 A | 6/2007 |
| JP | 2008532366 A | 8/2008 |
| JP | 2009514439 A | 4/2009 |
| WO | 2004091238 | 10/2004 |
| WO | WO2004102891 A1 | 11/2004 |
| WO | 2005043844 | 5/2005 |
| WO | 2005043948 | 5/2005 |
| WO | 2006040388 A1 | 4/2006 |
| WO | 2006044719 | 4/2006 |
| WO | WO2006044718 | 4/2006 |
| WO | 2006081574 | 8/2006 |
| WO | 2006085365 A1 | 8/2006 |
| WO | 2006089568 A1 | 8/2006 |
| WO | 2006120388 A1 | 11/2006 |
| WO | WO2007014021 | 2/2007 |
| WO | 2007049998 | 5/2007 |
| WO | WO2007050191 A1 | 5/2007 |
| WO | WO2007051130 | 5/2007 |
| WO | 2007133051 | 11/2007 |

OTHER PUBLICATIONS

C. Evers, R. Esmailzadeh, H. Haas, M. Nakagawa, Performance of a hybrid TDD-CDMA system with random slot allocation (RSA) in comparison with an equivalent FDD-CDMA system, Proc. of the 14th IST Mobile Wireless Communications Summit. 2005 /www.eurasip.org/Proceedings/Ext/IS T O5/papers/393.pdf>.*
Michael-Philip Powell, Performance Analysis of a Hybrid Topology CDD/TDD-CDMA Network Architecture, p. 114, Nov. 2005 /wiredspace.wits.ac.za/bitstream/handle/10539/2186/Research.pdf?sequence=1 >.*
International Search Report—PCT/US08/069278—International Search Authority—European Patent Office—Dec. 4, 2008.
International Search Report—PCT/US08/069279—International Search Authority—European Patent Office—Nov. 20, 2008.
International Search Report—PCT/US08/069280—International Search Authority—European Patent Office—Dec. 4, 2008.
International Search Report—PCT/US08/069282—International Search Authrotiy—European Patent Office—Dec. 4, 2008.
International Search Report—PCT./US08/069284—International Search Authority—European Patent Office—Nov. 28, 2008.
Written Opinion—PCT/US08/069278—International Search Authority—European Patent Office—Dec. 4, 2008.
Written Opinion—PCT/US08/069279—International Search Authority—European Patent Office—Nov. 20, 2008.
Written Opinion—PCT/US08/069280—International Search Authority—European Patent Office—Dec. 4, 2008.
Written Opinion—PCT/US08/069282—International Search Authrotiy—European Patent Office—Dec. 4, 2008.
Written Opinion—PCT./US08/069284—International Search Authority—European Patent Office—Nov. 28, 2008.
Alimi R et al: "iPack: in-Network Packet Mixing for High Throughput Wireless Mesh Networks" INFOCOM 2008, The 27th Conference on Computer Communications. IEEE, IEEE, Piscataway, NJ, USA, Apr. 13, 2008, pp. 66-70, XP031247120.
Pouriya Sadeghi et al: "Snapshot Capacity of Multi Hop Ad Hoc Networks" Communications, 2006, iCC '06. IEEE International Conference on IEEE. PI. Jun. 1, 2006. pp. 1555-1561. XP031025282.
"International Search Report—PCT/US08/069281—International Search Authority—European Patent Office—Dec. 4, 2008".
"Written Opinion—PCT/US08/069281—International Search Authority—European Patent Office—Dec. 4, 2008".
Hasan A, et al., "Clustered CDMA ad hoc networks without closed-loop power control" IEEE Military Communications Con-

(56) References Cited

OTHER PUBLICATIONS ference, vol. 2, Oct. 13, 2003 (Oct. 13, 2003), pp. 1030-1035, XP010698629 New York, NY : IEEE, US ISBN: 978-0-7803-8140-7 abstract; figures 1,2 p. 1030-p. 1034.
J.G. Andrews et al., "Ad Hoc Networks: To Spread or Not to Spread", IEEE Communications Magazine, Dec. 2007,vol. 45, No. 12, pp. 84-91.
Taiwan Search Report—TW097126156—TIPO—Dec. 2, 2011.
Liu, X., et al., "Effects of rate adaptation on the throughput of random ad hoc networks", Vehicular Technology Conference, 2005. VTC-2005-Fall. 2005 IEEE 62nd Dallas, TX, USA Sep. 25-28, 2005, Piscataway, NJ, USA, IEEE, vol. 3, Sep. 25, 2005 (Sep. 25, 2005), pp. 1887-1891, XP010878732, DOI: 10.1109/VETECF.2005.1558434 ISBN: 978-0-7803-9152-9.
Mostofa, M., et al., "System architecture for implementing multiuser detector within an ad-hoc network ", MILCOM 2001. Proceeding's. Communications for Network-Centric Operations: Creating the Information Force. McLean, VA, Oct. 28-30, 2001; [IEEE Military Communications Conference], New York, NY: IEEE, US, vol. 2, Oct. 28, 2001 (Oct. 28, 2001), pp. 1119-1123, XP010579177, DOI: 10.1109/MILCOM.2001.986019 ISBN: 978-0-7803-7225-2.
Sahin, O., et al., "Dynamic Resource Allocation for Multi Source-Destination Relay Networks" Information Sciences and Systems, 2007. CISS '07. 41st Annual Con Ference on, IEEE, PI, Mar. 1, 2007 (Mar. 1, 2007), pp. 19-24, XP031131819, ISBN: 978-1-4244-1063-7.

\* cited by examiner

METHODS AND APPARATUS FOR ACTIVE SUCCESSIVE INTERFERENCE CANCELLATION BASED ON ONE RATE FEEDBACK AND PROBABILITY ADAPTATION IN PEER-TO-PEER NETWORKS

CLAIM OF PRIORITY UNDER 35 U.S.C. §119

The present Application for Patent claims priority to U.S. Provisional Application No. 60/948,984 entitled "Method and Apparatus for Successive Interference Cancellation in Peer To Peer Network" filed Jul. 10, 2007, and assigned to the assignee hereof and hereby expressly incorporated by reference herein.

BACKGROUND

Field

Various embodiments are directed to methods and apparatus for wireless communication and, more particularly, to methods and apparatus related to perform successive interference cancellation in a peer to peer communications network.

Background

In a wireless network, e.g., an ad hoc network, in which a network infrastructure does not exist, a terminal has to combat certain challenges in order to set up a communication link or connection with another peer terminal. One challenge is that when a terminal just powers up or moves into a new area, the terminal may have to first find out whether another terminal is present in the vicinity before any communication between the two terminals can start.

Due to the lack of the network infrastructure, terminals in an ad hoc wireless network may often not have a common timing reference which can assist in traffic management. So it is possible that when a first terminal is transmitting a signal and a second terminal is not in the receiving mode, therefore the transmitted signal does not help the second terminal to detect the presence of the first terminal. Power efficiency has great impact on the battery life of the terminals and is thus another important issue in the wireless system.

Additionally, a plurality of wireless terminals may operate in an environment while sharing a frequency spectrum to establish ad hoc peer-to-peer communications. Because such ad hoc peer-to-peer communications are not centrally managed by a centralized controller, interference between multiple peer-to-peer connections among nearby wireless terminals is problem. That is, transmissions from a wireless terminal may cause interference with other unintended receiver wireless terminals.

Consequently, a solution is needed to permit peer-to-peer communications a shared frequency spectrum while reducing unwanted interference to other wireless terminals.

SUMMARY

A first receiver device is provided for performing successive interference cancellation (SIC) in a peer-to-peer network, the first receiver device being the intended receiver of a first traffic signal to be transmitted from a first transmitter device. The first receiver device may receive a first pilot signal from the first transmitter device and a second pilot signal from a second transmitter device. The second pilot signal may indicate that the second transmitter device intends to transmit a second traffic signal. The first receiver device may determine a transmission rate for the first transmitter device as a function of the received signal strength of the first pilot and a predicted amount of the total interference to be perceived by the first receiver device, the predicted amount of the total interference being determined as a function of a SIC success probability. A rate report signal may be sent to the first transmitter device, the rate report signal including the transmission rate. The first receiver device may predict whether the interfering second traffic signal to be transmitted by the second transmitter device can be decoded and subtracted before the first receiver device decodes the first traffic signal to be transmitted by the first transmitter device as a function of the SIC success probability.

According to one feature, the amount of interference to be caused by the interfering second traffic signal to be transmitted by the second transmitter device is then predicted by the first receiver device as a function of the received signal strength of the second pilot and including the predicted amount of the interfering second traffic signal to be transmitted by the second transmitter device in the calculation of the predicted amount of the total interference to be perceived by the first receiver device if it is predicted that the interfering second traffic signal to be transmitted by the second transmitter device cannot be decoded and subtracted. The interfering second traffic signal to be transmitted by the second transmitter device may be excluded in the calculation of the predicted amount of the total interference to be perceived by the first receiver device if it is predicted that the interfering second traffic signal to be transmitted by the second transmitter device can be decoded and subtracted.

According to another feature, the amount of interference to be caused by the interfering second traffic signal to be transmitted by the second transmitter device may be predicted as a function of the received signal strength of the second pilot signal. The predicted amount of interference to be caused by the interfering second traffic signal to be transmitted by the second transmitter device may be discounted by a discounting factor as a function of the SIC success probability, the discounting factor being between zero and one. The discounted predicted amount of interference to be caused by the interfering second traffic signal to be transmitted by the second transmitter device may be included in the calculation of the predicted amount of the total interference to be perceived by the first receiver device.

The first receiver device may receive a traffic signal in a subsequent traffic channel, the received traffic signal including the first traffic signal from the first transmitter device, the first traffic signal having a data rate not exceeding the transmission rate reported by the first receiver device to the first transmitter device. The received traffic signal may include the interfering second traffic signal from the second transmitter device, and the interfering second traffic signal may be decoded from the received traffic signal.

The decoded interfering second traffic signal may be subtracted from the received traffic signal if decoding the interfering second traffic signal succeeds. The first traffic signal may then be decoded from the remaining portion of received traffic signal after the decoded interfering second traffic signal has been subtracted. The value of the SIC success probability may be adjusted as a function of whether decoding the interfering traffic signal succeeds. The value of the SIC success probability may be increased if decoding the interfering second traffic signal succeeds and the value of the SIC success probability is decreased if decoding the interfering second traffic signal fails. In one example, it is assumed that the second traffic signal will interfere with the first traffic signal.

The first traffic signal is transmitted over a shared frequency spectrum and in an overlapping time interval as the second traffic signal transmitted by the second transmitter device to a second receiver device.

The various features describe herein may be implemented within a wireless device, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

Figure 1:
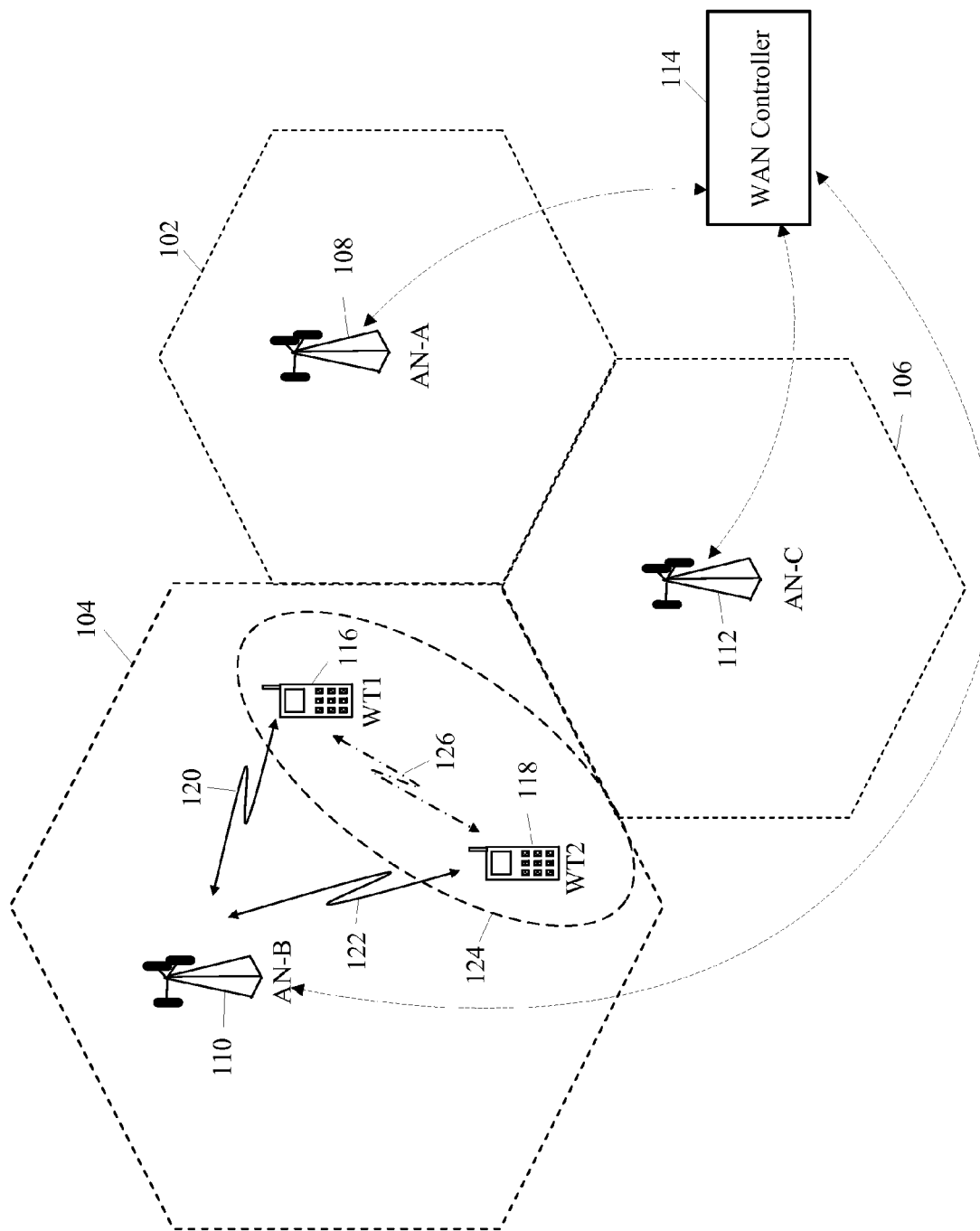
FIG. 1 is a block diagram illustrating the how an ad hoc peer-to-peer network may be implemented within the same frequency spectrum as a wide area network.

FIG. 1 is a block diagram illustrating the how an ad hoc peer-to-peer network may be implemented within the same frequency spectrum as a wide area network. The wide area network (WAN) may include a plurality of cells 102, 104, and 106, in which each cell is serviced by one or more access nodes (e.g., base stations) AN-A 108, AN-B 110, and AN-C 112 that may be distributively managed or centrally managed by a WAN controller 114. In this example, a first wireless terminal WT1 116 and/or a second wireless terminal WT2 118 may capable of communicating with the access node AN-B 110 of the WAN network via wireless communication connections 120 and 122. The WAN network may operate on a first frequency spectrum or band.

Wireless terminals WT1 116 and WT2 118 may also establish an ad hoc peer-to-peer network 124 on the same first frequency spectrum used by the WAN network, where a communication connection 126 may be used by the wireless terminals WT1 116 and WT2 118 for peer-to-peer communications. Sharing of a frequency spectrum by two different wireless networks may provide a more efficient use of limited spectrum resources. For instance, an ad hoc peer-to-peer network may be established between wireless terminals WT1 116 and WT2 118 over an existing channel allocation for another network, thereby reusing and/or concurrently using the frequency spectrum to efficiently utilize spectrum resources. In one example, the wide area network (WAN) may share the same frequency spectrum or band with the ad-hoc peer-to-peer network.

While FIG. 1 illustrates the shared use of a frequency spectrum between a WAN network and a peer-to-peer network, the first wireless terminal WT1 116 and the second wireless terminal WT2 118 may also operate in a frequency spectrum allocated to just the peer-to-peer network. The two wireless terminals use the available spectrum band to establish a peer-to-peer communication connection between each other.

For the sake of description, in the following it is assumed that at a given time, the wireless terminal can either transmit or receive, but not both. It is understood that people with ordinary skills in the field can apply the same principles to the case where the terminal can both transmit and receive at the same time.

According to one example of an ad hoc peer-to-peer communication system, connection prioritizing, connection scheduling, and power scaling may be performed among the wireless terminals WT 1116 and WT2 118 to more efficiently use the shared frequency spectrum or communication channel. As a result of such frequency spectrum sharing among, interference with other wireless terminals may occur. Consequently, one feature provides for implementing successive interference cancellation (SIC) among the wireless terminals to reduce interference from a desired signal of interest.

Figure 2:
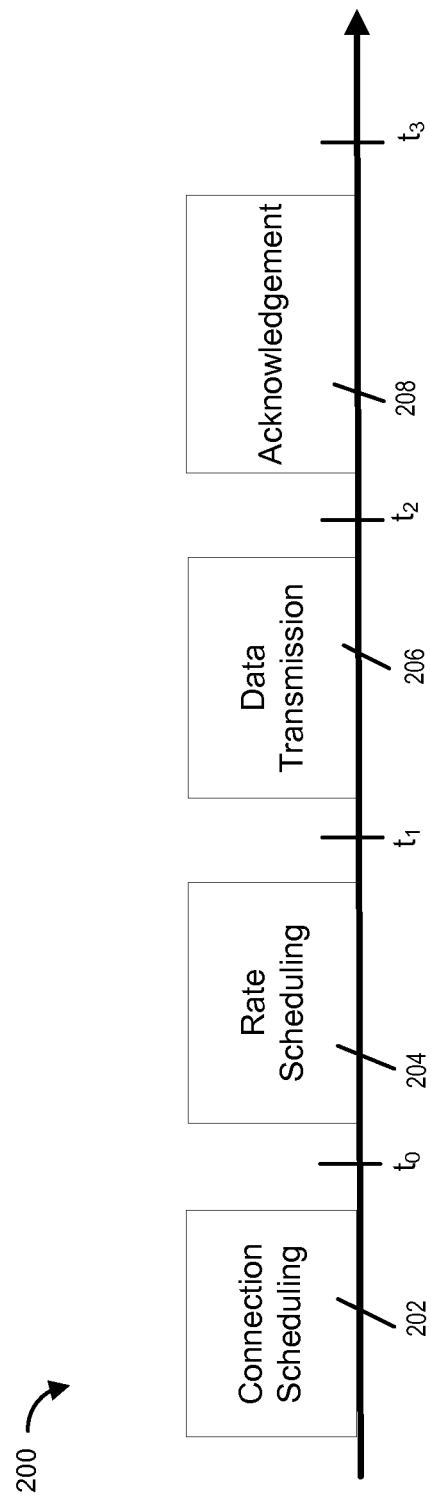
FIG. 2 illustrates one example of a timing sequence that may be used by wireless terminals to establish and/or maintain a peer-to-peer communication connection.

FIG. 2 illustrates one example of a timing sequence that may be used by wireless terminals to establish and/or maintain a peer-to-peer communication connection. The timing sequence 200 may include a connection scheduling segment 202 in which a wireless terminal may attempt to reserve a transmission channel in which to transmit data, a rate scheduling segment 204 in which the wireless terminal may attempt to obtain a transmission rate and/or power to use in transmitting the data, a data transmission segment 206 is then used to transmit the desired data at the obtained transmission rate and/or power, and an acknowledgement segment 208 to reply to the acknowledgement.

Interference Cancellation Within Peer-To-Peer Network

In an ad hoc peer-to-peer communication system, multiple communications may take place using frequency spectrum resources shared in both space and time. Because of the distributed nature of the ad hoc peer-to-peer network, it may not always be possible to control the interference seen by the wireless terminals.

Figure 3:
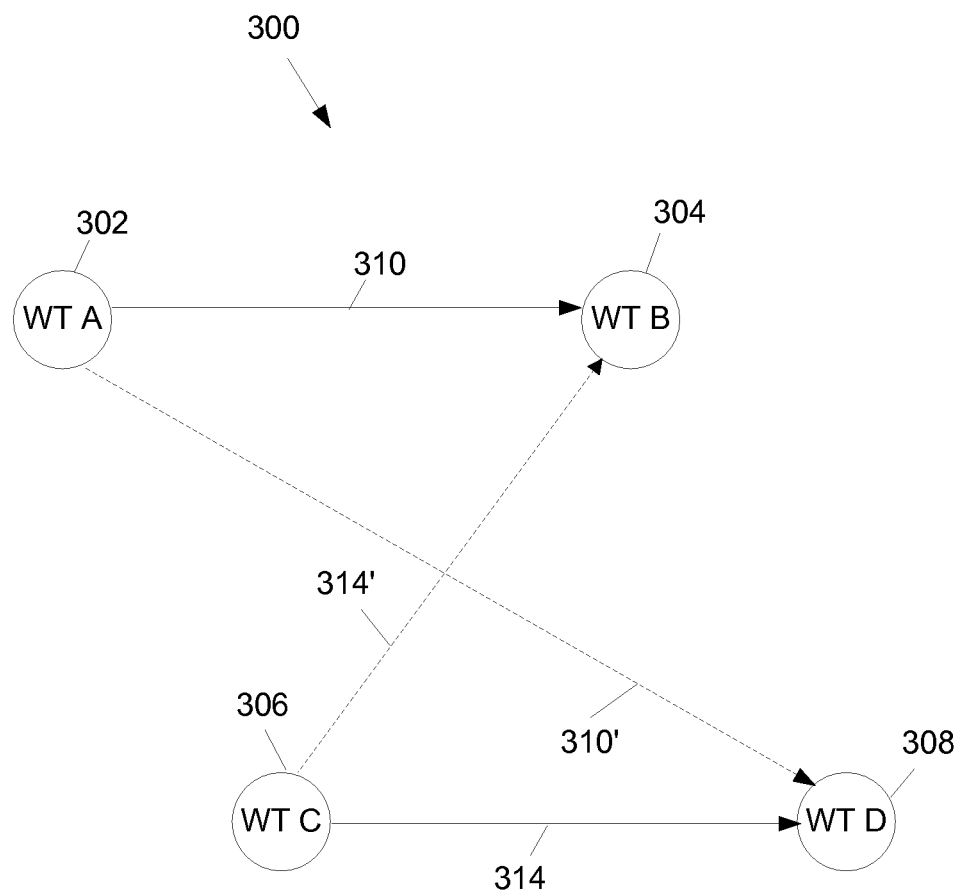
FIG. 3 is a block diagram illustrating an environment in which a plurality of wireless terminals may establish peer-to-peer communication connections that may cause interference to other nearby wireless terminals.

FIG. 3 is a block diagram illustrating an environment in which a plurality of wireless terminals may establish peer-to-peer communication connections that may cause interference to other nearby wireless terminals. A peer-to-peer network 300 may include a plurality of wireless terminals that may share and/or concurrently use a frequency spectrum. The shared frequency spectrum may include one or more transmission and/or control channels, with each transmission channel having a corresponding control channel. In one example, the control channel may be used to send a traffic request for communications over a corresponding transmission channel.

In one example, a first wireless terminal WT A 302 may be attempting to transmit 310 to a second wireless terminal WT B 304 while a third wireless terminal WT C 306 is concurrently attempting to transmit 314 to a fourth wireless terminal WT D 308 using the same traffic channel bandwidth resource. The first wireless terminal WT A 302 may be referred to as the intended transmitter, the second wireless terminal WT B 304 may be referred to as the intended receiver, and the third wireless terminal WT C 306 may be considered the interferer. In this peer-to-peer network 300, a transmission and control channel pair may be shared by the plurality of the wireless terminals WT A, WT B, WT C, and WT D. Such control channel may allow the wireless terminals WT A, WT B, WT C, and WT D to find each other and/or assist in setting up peer-to-peer communication connections, e.g., discovery and/or paging phases. However, because such transmission and/or control channel is shared (e.g., frequency spectrum sharing) by the wireless terminals, it may also result in unwanted interference 314' and 310' among the wireless terminals.

If both transmissions 310 and 314 actually take place, then the signal 314' from the third wireless terminal WT C 306 may be seen as interference to the second wireless terminal WT B 304 receiver and may degrade its ability to successfully recover the desired signal 310 from the first wireless terminal WT A 302. Therefore, certain interference management protocol is needed to manage interference from the third wireless terminal WT C 306 to the second wireless terminal WT B 304. One goal of the interference management protocol is to allow the third wireless terminal WT C 306 to transmit without creating excessive interference to the second wireless terminal WT B 304, thereby increasing the overall throughput and improving the system performance. Note that in the meantime, the first wireless terminal WT A 302 may also cause interference 310' to the fourth wireless terminal WT D 308, and a similar interference management protocol may also be used to control that interference.

For purposes of explanation, traffic transmissions from the first device WT A 302 to be received by the second device WT B 304 are said to have higher priority than traffic transmissions from the interfering third device WT C 306 to the fourth device 308. Additionally, the priority of one device versus another device (or between different concurrent communication connections) may be established by different methods. For instance, in one example, the transmitter device having the earliest pilot signal may be considered to have a higher priority. In another example, the pilot signals may include an transmitter identifier or numerical value which can be compared to each other to assign priority to the highest or lowest identifier value. In yet another example, the pilot signals may include priority indicators assigned by a carrier or other entity which can be used to classify wireless devices with respect to each other.

Note that in the description that follows, some devices may be referred to as "transmitter devices" while others may be referred to as "receiver devices". This nomenclature simply indicates that a "transmitter" device is the initiator of a traffic transmission to a receiver or target device. However, a "transmitter device" can also receive signal transmissions and a "receiver device" can also transmit signals.

In one example, a baseline interference management protocol may include three stages as illustrated by the Connection Scheduling 202, Rate Scheduling 204 and Traffic Transmission 206 in FIG. 2.

Figure 4:
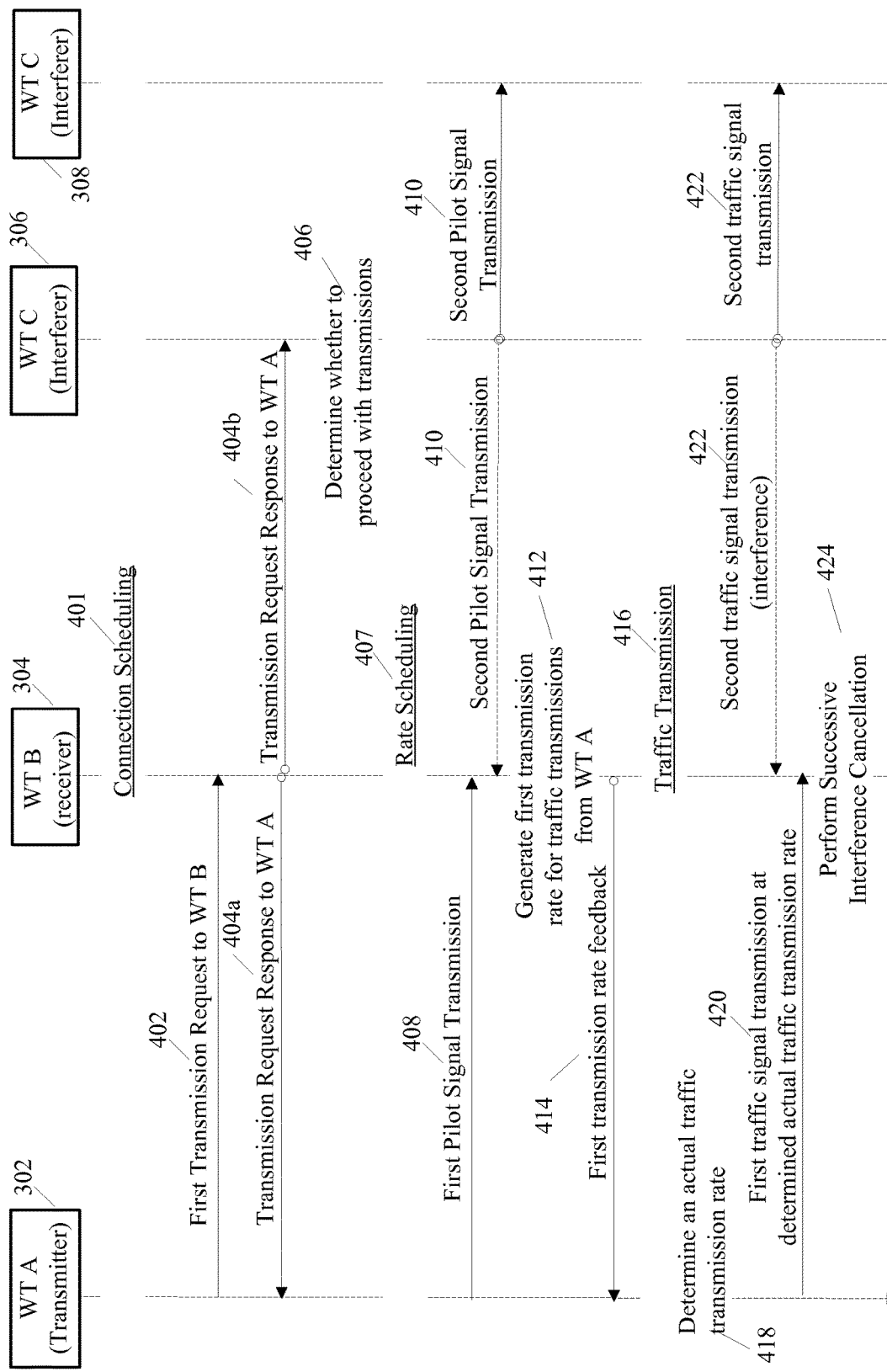
FIG. 4 illustrates one example of a protocol operational in a peer-to-peer network to establish a communication connection between two wireless terminals.

FIG. 4 illustrates one example of a protocol operational in a peer-to-peer network to establish a communication connection between two wireless terminals. In a first connection scheduling stage 401, a first wireless terminal WT A 302 transmits a first transmission request 402, which is received by the second wireless terminal WT B 304. The second wireless terminal WT B 304 then transmits a transmission request response 404a, which is received by the first wireless terminal WT A 302 so that the first wireless terminal WT A 302 knows that the second wireless terminal WT B 304 is ready to receive traffic transmission from the first terminal WT A 302. Both the first and the second wireless terminals may proceed to the second stage 407 (rate scheduling). Meanwhile, because of the broadcast nature of the wireless channel, the same transmission request response (labeled as 404b) may also be received by the third terminal WT C 306, which will determine whether it will cause unduly large interference to the second terminal WT B 304 if it chooses to proceed to transmit in the traffic channel 406. In one example, such determination may assume that the traffic transmissions from the first wireless terminal WT A 302 and third wireless terminal WT C 306 will have a power proportional to the power of their transmission requests. If it is determined that it will cause excessive interference, the third terminal WT C 306 may choose not to proceed to the second stage 407 of the protocol. For the sake of description, it is assumed that the traffic transmission from the third terminal WT C 306 has a lower scheduling priority than traffic transmissions from the first terminal WT A 302.

In a second stage 407 of the protocol, rate scheduling may be performed. The first terminal WT A 302 may transmit a first pilot signal or beacon $P_1$ 408. If the third terminal WT C 306 does not drop out in the connection scheduling stage 401, it also transmits a second pilot signal or beacon $P_2$ 410. The second terminal WT B 304 obtains or generates a feedback message that may include a first transmission rate $R_1$ 412 it can support for traffic transmissions from the first terminal WT A 302 as a function of the received signal strengths of the first pilot $P_1$ from the first terminal WT A 302 and/or the second pilot $P_2$ from the third terminal WT C 306. The second terminal WT B 304 may then send the first transmission rate message 414 to the first terminal WT A 302.

In a third stage 416 of the protocol, traffic transmission may be performed. The first terminal WT A 302 may determine the actual traffic transmission rate 418 as a function of the received first transmission rate $R_1$ feedback 414 from the second terminal WT B 304, and transmits a first traffic signal $S_1$ 420 to the second terminal WT B 304 at that actual traffic transmission rate.

Concurrent with the transmission of the first traffic signal $S_1$, a second traffic signal $S_2$ 422 may be sent from the third terminal WT C 306 to the fourth terminal WT D 308. The second traffic signal $S_2$ 422' may be considered interference to the second terminal WT B 304. As a result, the third terminal WT C 306 may have to drop out in the connection scheduling stage 401 to avoid interfering the second terminal WT B 304, or if it decides to proceed, the interference may (in effect) reduce the data rate that the second terminal WT B 304 can support of the traffic transmission from the first terminal WT A 302.

In one example, the stages of connection scheduling 401, rate scheduling 407, and traffic transmission 416 may be performed on a cyclical basis. At any one moment, if two or more nearby terminals attempt to use a shared frequency spectrum or channel for peer-to-peer communications they will discover each other and interference mitigation may be implemented by one or more of the terminals.

One way to deal with a strong interference from other wireless terminals is for a receiving wireless terminal to decode the unwanted interference and subtract it out from a signal of interest before decoding the signal or interest. This is often referred to as successive interference cancellation (SIC) 424.

The basic idea of successive interference cancellation (SIC) is for the second terminal WT B 304 to first decode the traffic transmission 314' from the third terminal WT C 306, then cancel it out from the total received signal (e.g., combined signals 310 and 314'), and finally decode the desired traffic transmission 310 from the first terminal WT A 302. If the interference from the third terminal WT C 306 can be substantially or completely cancelled out, the traffic transmission 314 and 314' of the third terminal WT C 306 may have little or no adverse impact on the second terminal WT B 304.

According to various features, a control channel design may be provided with signaling that can support SIC and improve system spectral efficiency. In some aspects, two types of SIC schemes are provided: active SIC and passive SIC.

Active Successive Interference Cancellation

In active SIC, a network spatial reuse topology is employed in an active manner to fully utilize the benefit of SIC. A receiver terminal can withstand reception of interfering transmissions so long as it is able to decode them and subtract them from a received signal to obtain a desired signal of interest. So long as the interfering transmissions are kept at or below a transmission rate that the receiver terminal can decode (for given channel conditions), the receiver terminal can implement interference cancellation to separate the signal of interest from the interfering signals. To accomplish this, the receiver terminal may provide a maximum transmission rate feedback to the interfering terminal(s).

Without SIC, a receiver terminal that receives a traffic request for itself may attempt to disable other transmitter terminals which concurrent or overlapping transmissions may interfere with its own reception of a desired signal from its intended transmitter. With SIC, in general, a receiver terminal may allow a subset of other terminals to operate even if these may cause strong interference with its reception of a desired signal. To accomplish this, the receiver terminal may measure the channel between the potential interferer terminals and decide which subset of interfering signals can be tolerated. To enhance robustness and reduce the control channel overhead, the subset size may be small, i.e., only one or two interfering terminals may be selected as SIC candidates for any active transmission. Interfering signals from other interfering terminals may be suppress by blocking transmission from the interfering terminals.

To successfully decode a desired signal from the SIC candidates at the receiver terminal, a mechanism is employed to control the transmit rates at the SIC candidates. This can be accomplished in the rate scheduling stage, where all the chosen transmissions measure the channel and determine which rate to use for data transmissions. According to one feature, each receiver terminal may send a feedback (e.g., broadcasts a rate feedback message) of the rate for the intended transmission and the rate it can tolerate for the SIC candidates. The SIC candidates may decode the transmission rate feedback message from both the intended receiver terminal and an active receiver terminal and choose the smallest rate it gets assigned.

Figure 5A:
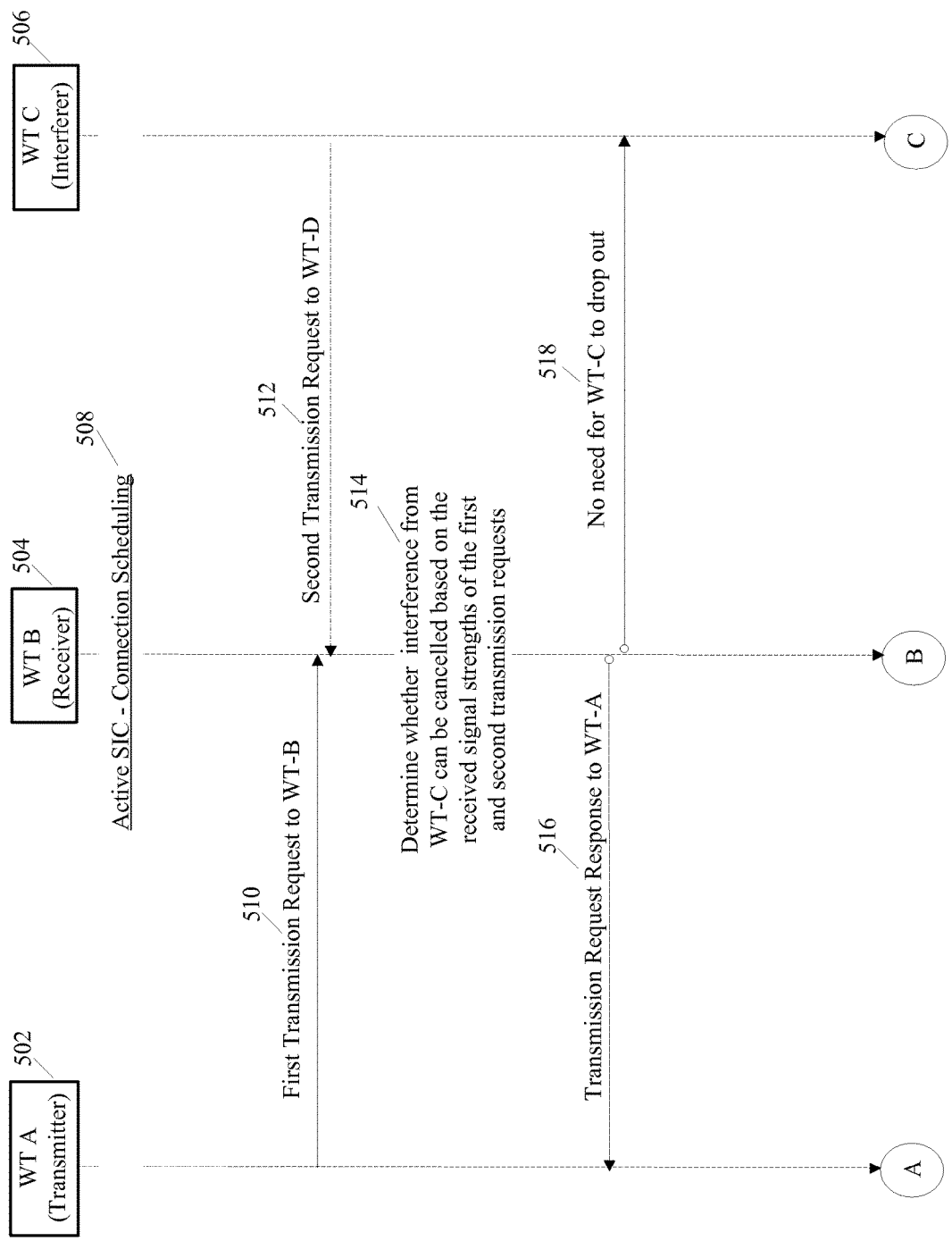
FIG. 5 (comprising FIGS. 5A, 5B, and 5C) illustrates one example of a protocol for an ad hoc communication network that facilitates interference cancellation.
Figure 5B:
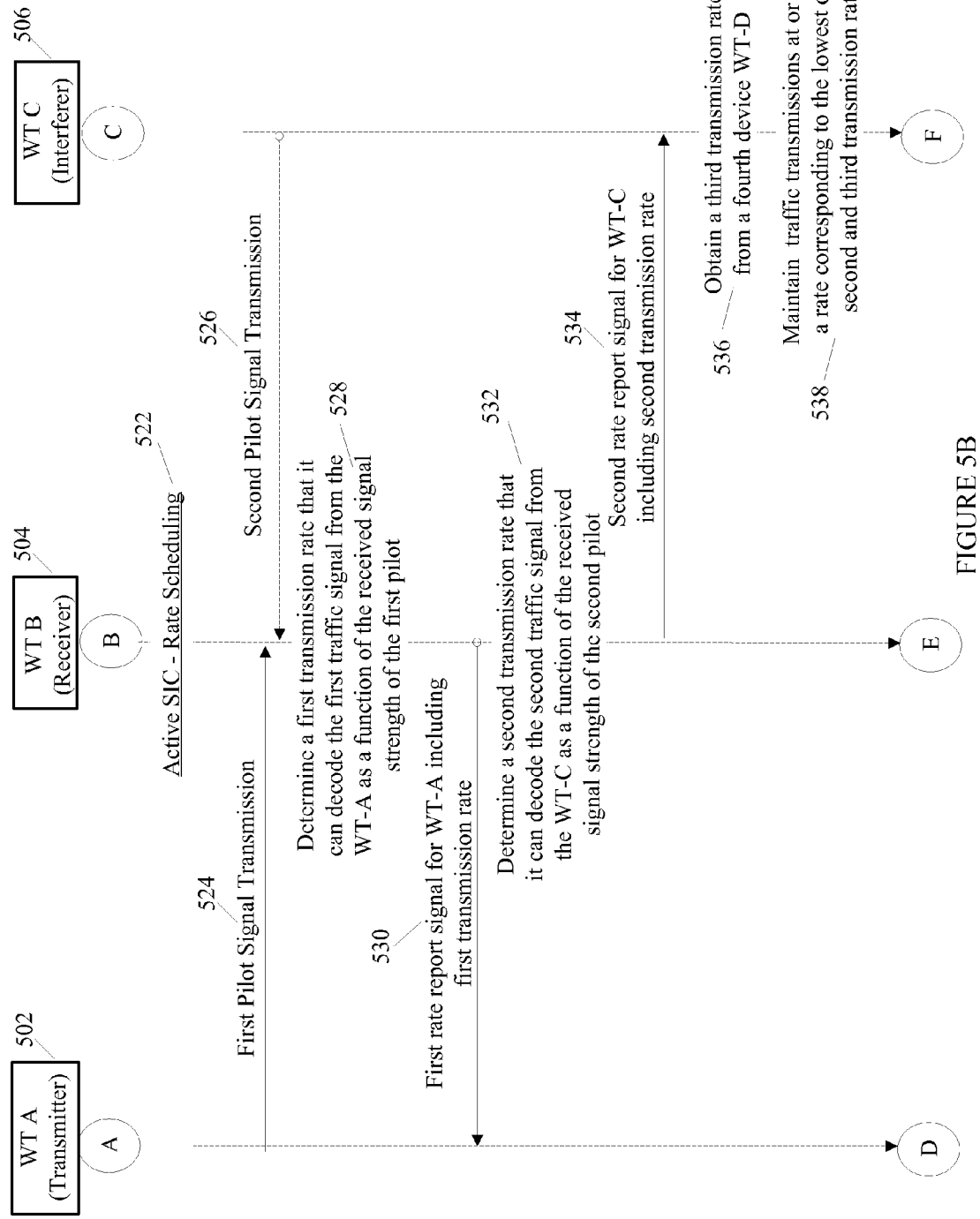
Figure 5C:
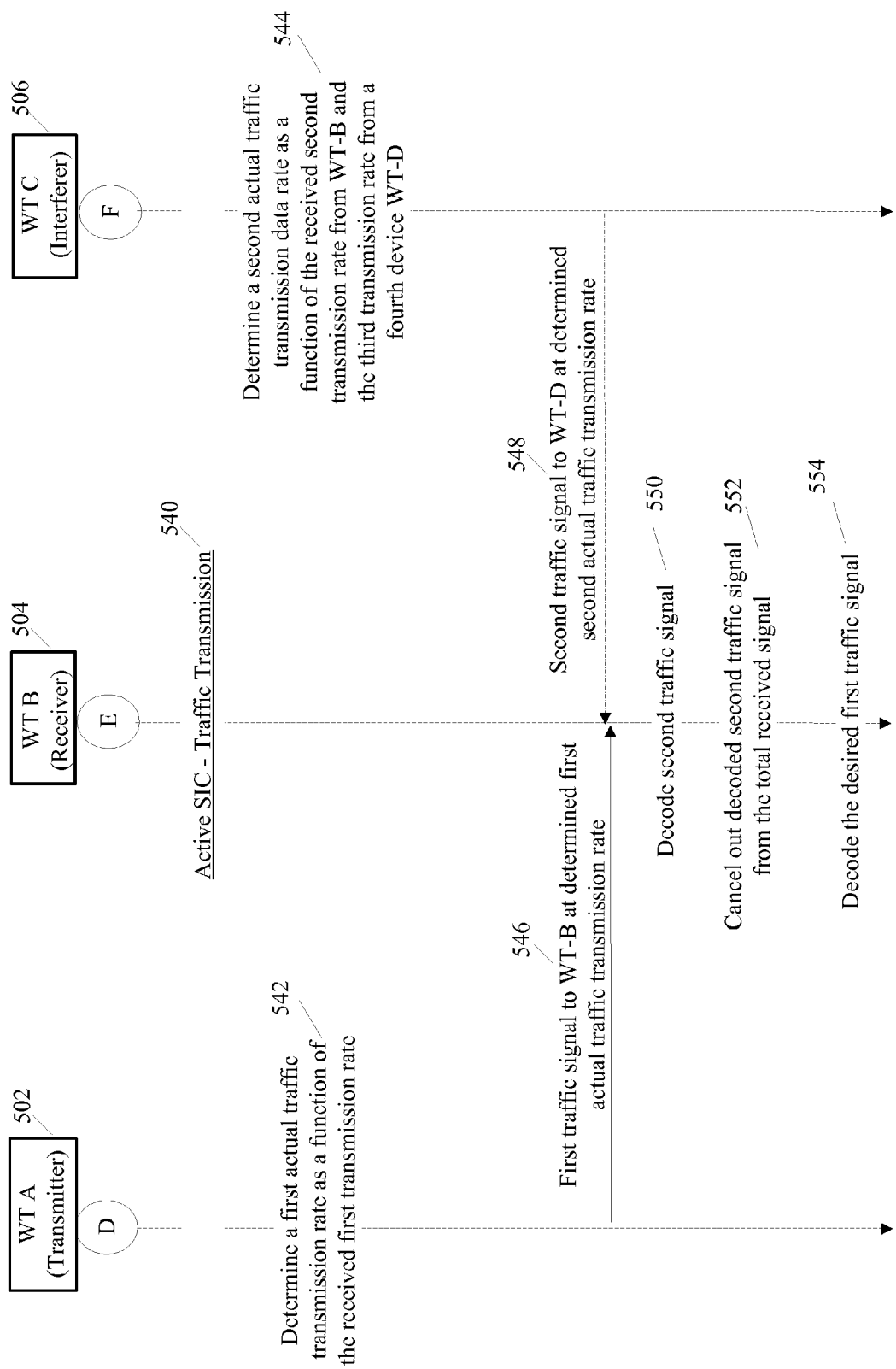

FIG. 5 (comprising FIGS. 5A, 5B, and 5C) illustrates one example of a protocol for an ad hoc communication network that facilitates interference cancellation. In this example, the protocol may include a connection scheduling stage 508, a rate scheduling stage 522, and a transmission stage 540.

In the link (connection) scheduling stage 508, a first device WT-A 502 (transmitter) transmits a first transmission request 510, which is heard by a second device WT-B 504 (receiver). A nearby third device WT-C 506 (interferer) may transmit a second transmission request 512 to a fourth device (not illustrated), which is different from the second device WT-B 504. The second transmission request 512 may also be received or perceived by the second device WT-B 504. According to one feature, the second device WT-B 904 may then perform receiver yielding where it may decide to drop out (e.g., ignore or deny the transmission request from the first device WT-A 502) if it will cause unacceptable interference to a higher priority communication. The second device WT-B 504 may determine, as a function of the received signal strength of the first and/or the second transmission requests 510 and 512, whether it can cancel the interference from the third device WT-C 506. If so, the second device WT-B 504 sends a transmission request response 516 to the first device WT-A 502 and another signal 518 to the third device WT-C 506 SO that the third device WT-C 506 does not need to drop out. For example, suppose that the third device WT-C 506 is very close to the second device WT-B 504. Recall that in the baseline protocol, after the third device receives the transmission request response sent by the second device, the third device may have to drop out in order to avoid causing excessive interference to the second device. In the present protocol, the second device WT-B 504 may inform the third device WT-C 506 via a control message 518 that it does not have to drop out.

In the rate scheduling stage 522, the first device WT-A 502 may transmit a first pilot signal $P_1$ 524. The third device WT-C 506 may also transmit a second pilot signal $P_2$ 526. The second device WT-B 504 may determine a first transmission rate $R_1$ 528 at which it can decode the first traffic signal $S_1$ from the first device WT-A 502 as a function of the received signal strength $PWR_{P1}$ of the first pilot $P_1$ from the first device WT-A 502, assuming at least some portion of the signal energy from the third device WT-C 506 can be cancelled out. The second device WT-B 504 may send a first rate report signal (feedback) including the first transmission rate $R_1$ 530 to the first device WT-A 502. In addition, the second device WT-B 504 may determine a second transmission rate $R_2$ 532 at which it can decode the second traffic signal $S_2$ from the third device WT-C 506 as a function of the received signal strength $PWR_{P2}$ of the second pilot signal $P_2$ 526 from the third device WT-C 506. The second transmission rate $R_2$ 532 may be determined also as a function of the received signal strength $PWR_{P1}$ of the first pilot $P_1$ from the first device WT-A 502. This is because when the second device WT-B 504 attempts to carry out SIC to cancel out (remove) the second traffic signal $S_2$ from the third device WT-C 506 before it can decode the intended first traffic signal $S_1$ from the first device WT-A 502, the first traffic signal $S_1$ from the first device WT-A 502 is treated as interference in the process of first decoding the second traffic signal $S_2$ from the third device WT-C 506. The second device WT-B 504 may send the second rate report signal including the second transmission rate $R_2$ 534 to the third device WT-C 506. Note that if the third device WT-C 506 transmits its second traffic signal $S_2$ at a data rate higher than the second transmission rate $R_2$, the second device WT-B 504 may not be able to successfully decode and cancel out the second traffic signal $S_2$, and as a result, the SIC may fail. Therefore, the third device WT-C 506 may not be allowed to transmit above the second transmission rate $R_2$. Similarly, the fourth device may determine a third transmission rate $R_3$ 536 at which it can decode the second traffic signal $S_2$ from the third device WT-C 506, and sends the third transmission rate $R_3$ to the third device WT-C 506.

In the traffic transmission stage 540, the first device WT-A 502 may determine a first actual traffic transmission rate $R_{ACTUAL-1}$ 542, as a function of the received first transmission rate $R_1$ from the second device WT-B 540, and sends the first traffic signal $S_1$ 546 to the second device WT-B 504. The third device WT-C 506 may also determine a second actual traffic transmission rate $R_{ACTUAL-2}$ 544, as a function of the received second transmission rate $R_2$ 548 from the second device WT-B 504 and the received third transmission rate $R_3$ 536 from the fourth device. The third device WT-C 506 may then send its second traffic signal $S_2$ to the fourth device at the $R_{ACTUAL-2}$ 544 that does not exceed either the second or the third transmission rates $R_2$ and $R_3$ 538. The second device WT-B 504 may decode the second traffic signal 550 from the third device WT-C 506, then cancels it out (subtracts) from the total received signal 552, and finally decodes the desired first traffic signal 554 from the first device WT-A 502.

Figure 6:
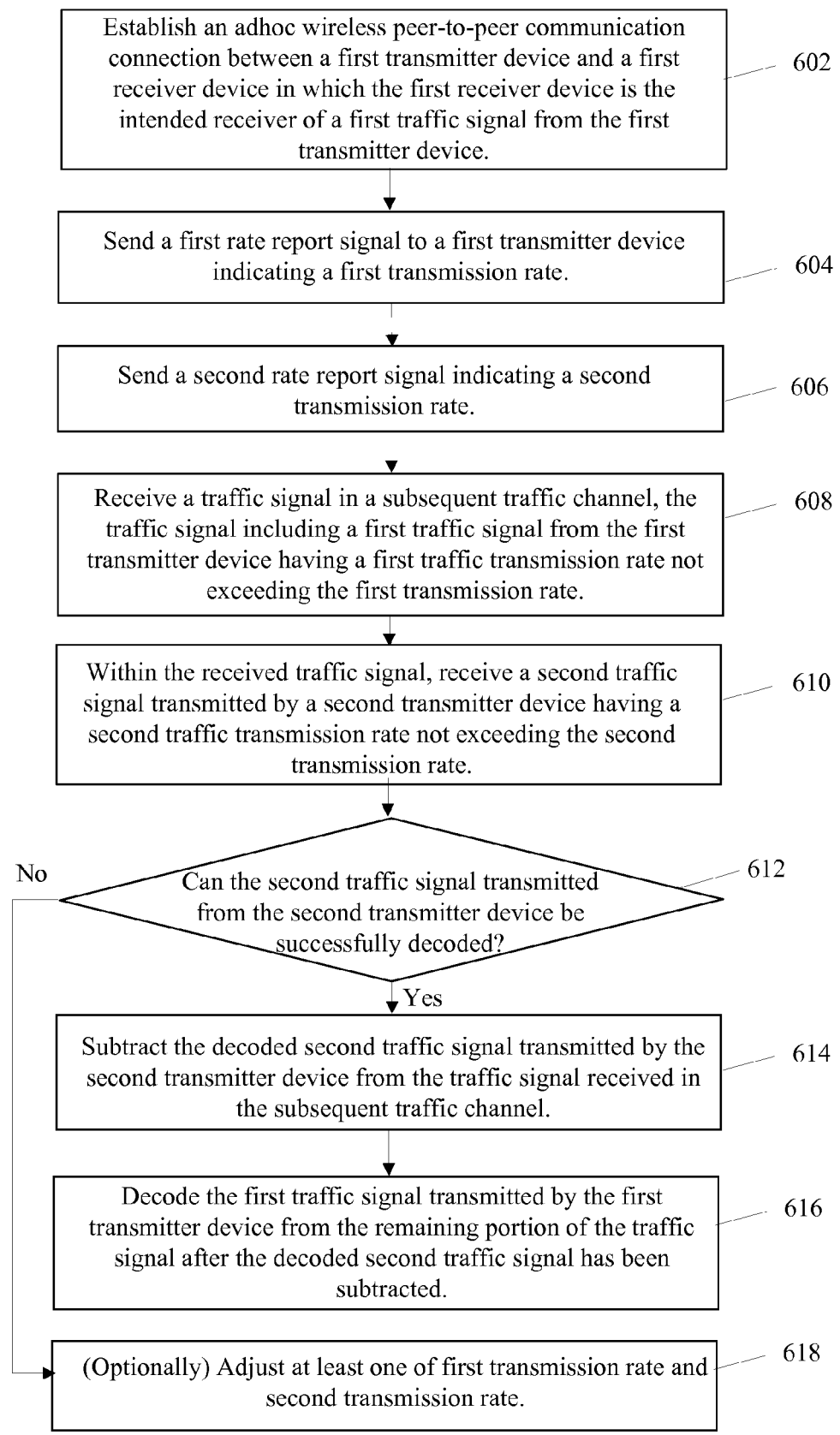
FIG. 6 illustrates an example of a method operational on a wireless receiver terminal that performs active successive interference cancellation within a peer-to-peer network.

FIG. 6 illustrates an example of a method operational on a wireless receiver terminal that performs active successive interference cancellation within a peer-to-peer network. In this example, the "second device" (e.g., WT B 304 in FIG. 3) is referred to as the first receiver device, the "first device" (e.g., WT A 302 in FIG. 3) is referred to as the intended first transmitter device, the "third device" (e.g., WT C 306 in FIG. 3) is referred to as the interfering second transmitter device, and the "fourth device" (e.g., WT D 308 in FIG. 3) is referred to as the second receiver device. In this example, traffic transmissions from the first transmitter device (first device) to the first receiver device (second device) may have a higher priority than traffic transmissions from the second transmitter device (third device) to a second receiver device (fourth device).

A communication connection may be established between a first transmitter device (first device WT-A) and first receiver device (second device WT-B) in which the first receiver device (second device WT-B) is the intended receiver of a first traffic signal from the first transmitter device (first device WT-A) 602. A first rate report signal is sent to the first transmitter device (first device WT-A) indicating a first transmission rate $R_1$ 604. A second rate report signal is sent indicating a second transmission rate $R_2$ 606. A traffic signal $S_{TRAFFIC-RX}$ is received in a subsequent traffic channel, the traffic signal $S_{TRAFFIC-RX}$ may include a first traffic signal $S_1$ from the first transmitter device (first device WT-A) having a first traffic transmission rate $R_{TX-1}$ not exceeding the first transmission rate $R_1$ 608. The received traffic signal $S_{TRAFFIC-RX}$ in the subsequent traffic channel may also include a second traffic signal $S_2$ transmitted by a second transmitter device (third device WT-C) having a second traffic transmission rate $R_{TX-2}$ not exceeding the second transmission rate $R_2$ 610. The first and second transmission rates $R_1$ and $R_2$ may be maximum rates at which the first receiver device (second device WT-B) can reliably decode the respective traffic signals from the first and second transmitter devices. The first receiver device (second device WT-B) may attempt to decode (from the received traffic signal $S_{TRAFFIC-RX}$) the second traffic signal $S_2$ transmitted from the second transmitter device (third device WT-C) 612. If the second traffic signal $S_2$ is successfully decoded, (a) the decoded second traffic signal $S_2$ transmitted by the second transmitter device (third device WT-C) is subtracted from the traffic signal $S_{TRAFFIC-RX}$ received in the subsequent traffic channel 614, and (b) the first traffic signal $S_1$ transmitted by the first transmitter device (first device WT-A) is decoded from the remaining of the traffic signal $S_{TRAFFIC-RX}$ after the decoded second traffic signal $S_2$ has been subtracted 616. The first and second traffic signals $S_1$ and $S_2$ may be received in overlapping time intervals, and the first and second traffic signals $S_1$ and $S_2$ may be transmitted in the same frequency spectrum.

As part of establishing the communication connection, the first receiver device (second device WT-B) may receive a first transmission request from the first transmitter device (first device WT-A) prior to sending the first rate report signal. The first receiver device (second device WT-B) may further receive a first transmission request from the first transmitter device (first device WT-A) prior to sending the first rate report signal. The first transmission request may indicate that the first transmitter device (first device WT-A) intends to transmit to the first receiver device (second device WT-B) the first traffic signal $S_1$ in the subsequent traffic channel. The first receiver device (second device WT-B) may also receive a second transmission request from the second transmitter device (third device WT-C) prior to sending the second rate report signal. The second transmission request may indicate that the second transmitter device (third device WT-C) intends to transmit the second traffic signal $S_2$ to a second receiver device (fourth device WT-D) in the subsequent traffic channel, wherein the second traffic signal $S_2$ to be transmitted by the second transmitter device (third device WT-C) may interfere with the first traffic signal $S_1$ to be transmitted by the first transmitter device. The first receiver device (second device WT-B) may then determine whether the interfering second traffic signal $S_2$ from the second transmitter device (third device WT-C) can be decoded and subtracted based on the signal strengths for the first and second transmission requests. A transmission response may be sent by the first receiver device (second device WT-B) to the interfering second transmitter device (third device WT-C) indicating whether the interfering second traffic signal $S_2$ can be decoded and subtracted. Assuming that the first transmitter device (first device WT-A) and/or first receiver device (second device WT-B) (or their communication connection) has a higher communication priority than the second receiver device (fourth device WT-D) and/or second transmitter device (third device WT-C) (or their communication connection), the transmission response may allow the second transmitter device (third device WT-C) to desist from transmitting the second traffic signal $S_2$ if the first receiver device (second device WT-B) cannot decode it.

In establishing the communication connection, the first transmitter device (first device WT-A) may also receive a first pilot $P_1$ from the first transmitter device (first device WT-A) prior to sending the first rate report signal and may receive a second pilot $P_2$ from a second transmitter device (third device WT-C) prior to sending the second rate report signal. The second transmission rate $R_2$ may be determined as a function of the received signal strength of the second pilot $P_2$. The second transmission rate $R_2$ may be a transmission rate at which the second traffic signal $S_2$ transmitted by the second transmitter device (third device WT-C) is decodable by the first receiver device, assuming the signal from the intended first transmitter device (first device WT-A) may not be decoded yet and thus be treated as interference when decoding the second traffic signal $S_2$. Similarly, the first transmission rate $R_1$ may be determined as a function of the received signal strength of the first pilot $P_1$. The first transmission rate $R_1$ may be a transmission rate at which the first traffic signal $S_1$ transmitted by the first transmitter device (first device WT-A) is decodable by the first receiver device, assuming all of or at least some portion of the signal energy from the interfering second transmitter device (third device WT-C) can be canceled out.

Figure 7:
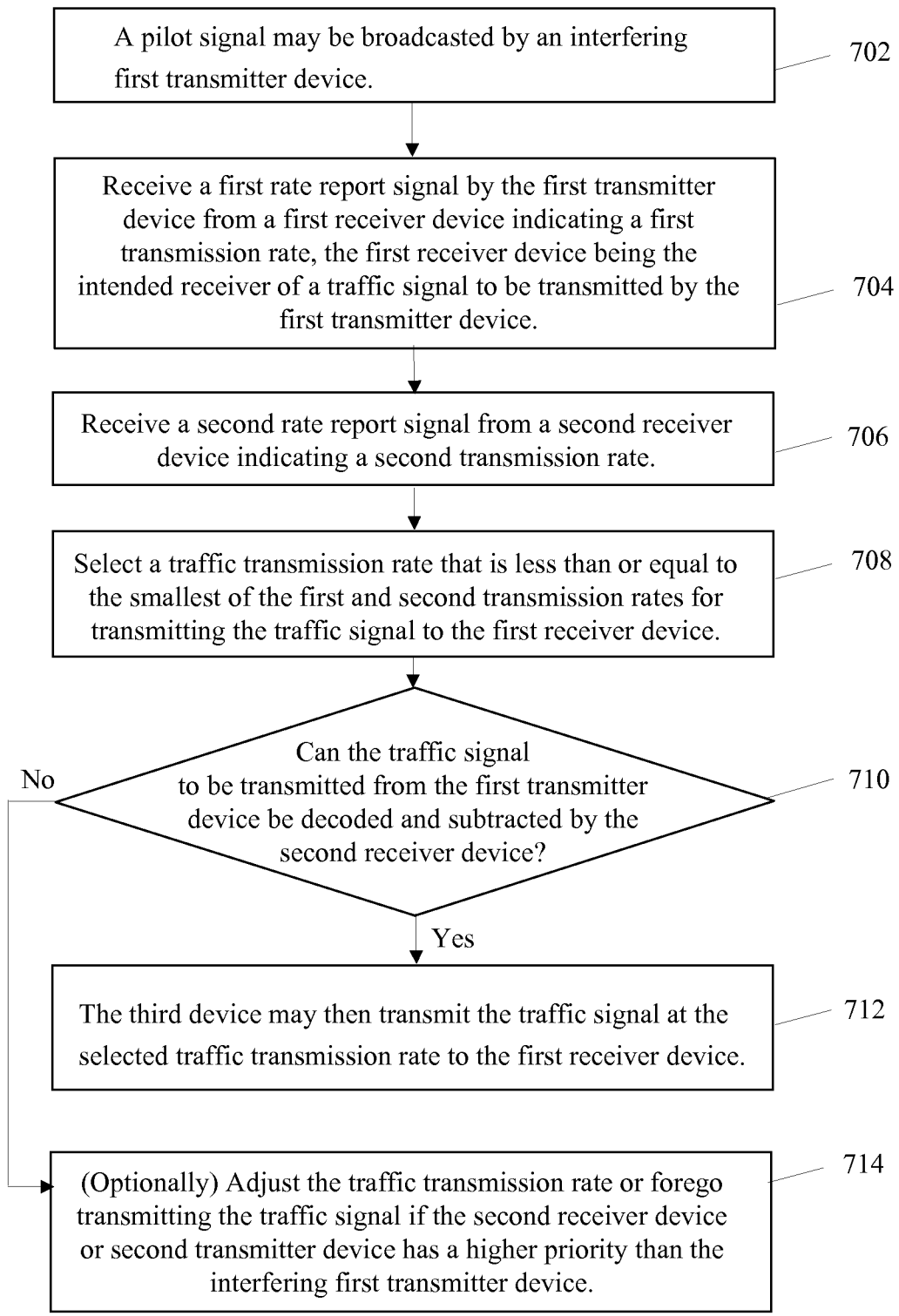
FIG. 7 illustrates an example of a method operational on an interfering first transmitter device that facilitates active successive interference cancellation within a peer-to-peer network.

FIG. 7 illustrates an example of a method operational on an interfering first transmitter device that facilitates active successive interference cancellation within a peer-to-peer network. In this example, the "third device" (e.g., WT C 306 in FIG. 3) is referred to as the interfering first transmitter device while the "fourth device" (e.g., WT D 308 in FIG. 3) is referred to as the intended first receiver device. The "first device" (e.g., WT A 302 in FIG. 3) may be referred to as a second transmitter device while second device (e.g., WT B 304 in FIG. 3) is referred to as the intended second receiver device.

A first pilot signal $P_1$ may be broadcasted by the interfering first transmitter device (third device WT-C) 702 (e.g., prior to receiving a first and second rate report signals). A first rate report signal is received by the first transmitter device (third device WT-C) from the first receiver device indicating a first transmission rate $R_1^*$, the first receiver device being the intended receiver of a first traffic signal $S_1$ to be transmitted by the interfering first transmitter device (third device WT-C) 704. A second rate report signal is received from a second receiver device (second device WT-B) indicating a second transmission rate $R_2^*$ 706. The first and second transmission rates $R_1^*$ and $R_2^*$ may be maximum rates at which the first transmitter device (third device WT-C) can transmit for reliable decoding by the intended first receiver device and second receiver device, respectively.

A traffic transmission rate $R_{TRAFFIC}$ is selected that is less than or equal to (e.g., does not exceeding) the smallest of the first and second transmission rates $R_1^*$ and $R_2^*$ for transmitting the first traffic signal $S_1$ to the intended first receiver device 708. The first transmitter device (third device WT-C) may then transmit the first traffic signal at the selected traffic transmission rate $R_{TRAFFIC}$ to the first receiver device 710. The first traffic signal $S_1$ may be transmitted in an overlapping time interval with another traffic signal $S_2$ transmission from the second transmitter device (first device WT-A) on a shared frequency spectrum.

In one implementation, a message may be received from the second receiver device (second device WT-B) indicating whether the first traffic signal $S_1$ to be transmitted from the first transmitter device (third device WT-C) can be decoded and subtracted 710. If so, the first transmitter device (third device WT-C) may then transmit the first traffic signal $S_1$ at the selected traffic transmission rate $R_{TRAFFIC}$ to the first receiver device 712. The first traffic signal $S_1$ may be transmitted in an overlapping time interval with another traffic signal $S_2$ transmission from the second transmitter device (first device WT-A) on a shared frequency spectrum. Otherwise, if the first traffic signal $S_1$ to be transmitted from the first transmitter device (third device WT-C) cannot be decoded and subtracted by the second receiver device, the first transmitter device (third device WT-C) may adjust the traffic transmission rate or forego transmitting the first traffic signal $S_1$ if the second receiver device (second device WT-B) and/or second receiver device (second device WT-B) has a higher priority than the first transmitter device (third device WT-C) 714.

Figure 8:
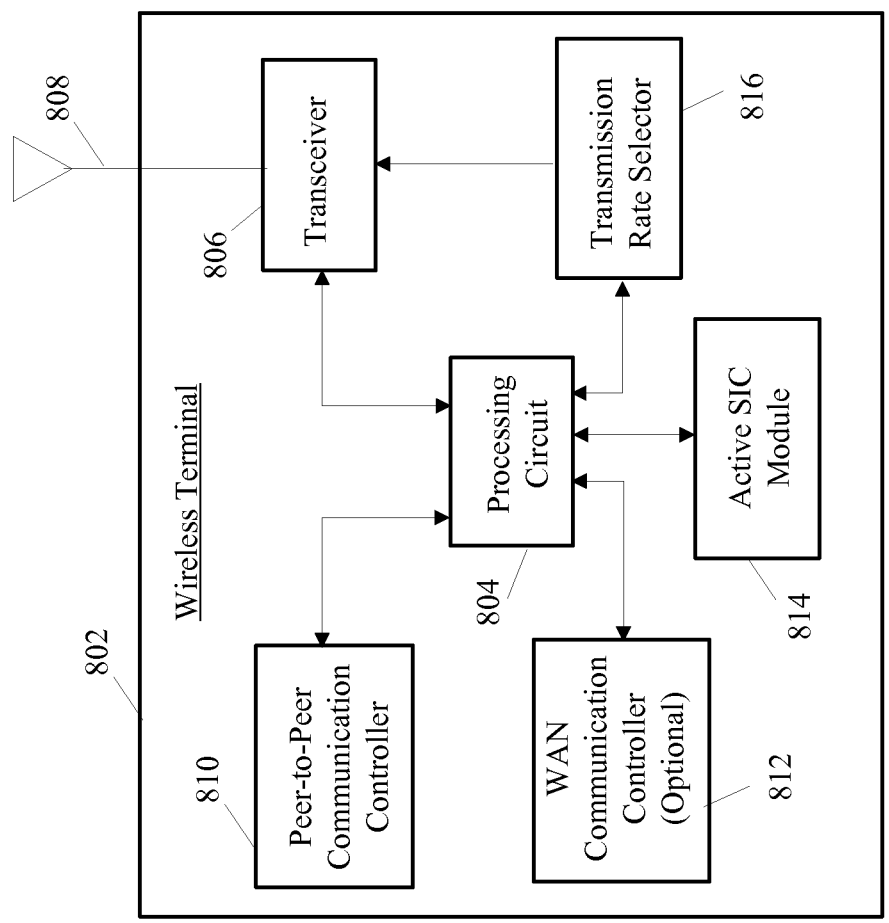
FIG. 8 is a block diagram illustrating a wireless terminal that is configured to perform or facilitate active successive interference cancellation (SIC) within a peer-to-peer wireless network.

FIG. 8 is a block diagram illustrating a wireless terminal that is configured to perform or facilitate active successive interference cancellation (SIC) within a peer-to-peer wireless network. The wireless terminal 802 may include a processing circuit 804 (e.g., one or more processors, electrical components, and/or circuit modules) coupled to a transceiver 806 (e.g., transmitter and/or receiver modules) which is coupled to an antenna 808 through which peer-to-peer communications can take place. The processing circuit 804 may also be coupled to a peer-to-peer communication controller 810 that may facilitate peer-to-peer communications and (optionally) a wide area network (WAN) communication controller 812 that may facilitate communications over a WAN. The first receiver device 802 may also include an active successive interference cancellation module 814 coupled to the processing circuit 804 and a transmission rate selector 816.

In one example, the wireless terminal 802 may operate as the intended first receiver device (i.e., second device WT B 304 in FIG. 3) and may be adapted to perform active SIC so as to subtract an interfering signal from a received signal to obtain a desired signal from another device with which it has a peer-to-peer communication connection. In this configuration, the wireless terminal 802 may be configured to perform the operations described in FIG. 6. For instance, the processing circuit 804, transmission rate selector 816 and/or transceiver 806 may operate to (a) determine and/or send a first rate report signal to a first transmitter device indicating a first transmission rate and (b) determine and/or send a second rate report signal indicating a second transmission rate. The transceiver 806, processing circuit 804, and/or peer-to-peer communication controller 810 may receive a traffic signal in a subsequent traffic channel, the traffic signal including a first traffic signal from the first transmitter device having a first traffic transmission rate not exceeding the first transmission rate. The traffic signal may also include a second traffic signal transmitted by a second transmitter device having a second traffic transmission rate not exceeding the second transmission rate. The processing circuit 804, peer-to-peer communication controller 810, and/or active SIC module 814 may then obtain the first traffic signal by decoding and subtracting the second traffic signal from the received traffic signal.

Consequently, a circuit in a first receiver device may be adapted to determine and/or send a first rate report signal to a first transmitter device indicating a first transmission rate. The same circuit, a different circuit, or a second section of the same or different circuit may be adapted to determine and/or send a second rate report signal indicating a second transmission rate. The same circuit, a different circuit, or a third section of the same or different circuit may be adapted to receive a traffic signal in a subsequent traffic channel, the traffic signal including a first traffic signal from the first transmitter device having a first traffic transmission rate not exceeding the first transmission rate. The traffic signal may also include a second traffic signal transmitted by a second transmitter device having a second traffic transmission rate not exceeding the second transmission rate. The same circuit, a different circuit, or a fourth section of the same or different circuit may be adapted to obtain the first traffic signal by decoding and subtracting the second traffic signal from the received traffic signal.

In another example, the wireless terminal 802 may operate as the interfering first transmitter device (i.e., third device WT C 306 in FIG. 3) and may be adapted to facilitate active SIC by a second receiver device (i.e., second device WT B 304 in FIG. 3) with which it shares a frequency spectrum within a peer-to-peer network. In this configuration, the wireless terminal may be configured to perform the operations described in FIG. 7. For instance, the transceiver 806, processing circuit 804, and/or peer-to-peer communication controller 810 may (a) receive a first rate report signal from a first receiver device indicating a first transmission rate, the first receiver device being the intended receiver of a first traffic signal to be transmitted by the first transmitter device, and/or (b) receive a second rate report signal from a second receiver device indicating a second transmission rate. The processing circuit 804 and/or transmission rate selector 816 may then select a traffic transmission rate not exceeding the smallest of the first and second transmission rates for wirelessly transmitting the first traffic signal to the intended first receiver device. The processing circuit 804, transceiver 806 and/or peer-to-peer communication controller 810 may then wirelessly transmit the first traffic signal to the first receiver device over a shared frequency spectrum and in an overlapping time interval as a second traffic signal transmitted by a second transmitter device to the second receiver device.

Consequently, a circuit operating in a first transmitter device may be adapted to receive a second rate report signal from a second receiver device indicating a second transmission rate. The same circuit, a different circuit, or a second section of the same or different circuit may be adapted to determine and/or send a second rate report signal indicating a second transmission rate. The same circuit, a different circuit, or a third section of the same or different circuit may be adapted to select a traffic transmission rate not exceeding the smallest of the first and second transmission rates for wirelessly transmitting the first traffic signal to the first receiver device. The same circuit, a different circuit, or a fourth section of the same or different circuit may be adapted to wirelessly transmit the first traffic signal to the first receiver device over a shared frequency spectrum and in an overlapping time interval as a second traffic signal transmitted by a second transmitter device to the second receiver device.

Active Successive Interference Cancellation—Three Rate Report from Interfering Device In another implementation, rather than implementing transmitter yielding by the interfering wireless terminal, the interfering wireless terminal may perform power control.

Figure 9A:
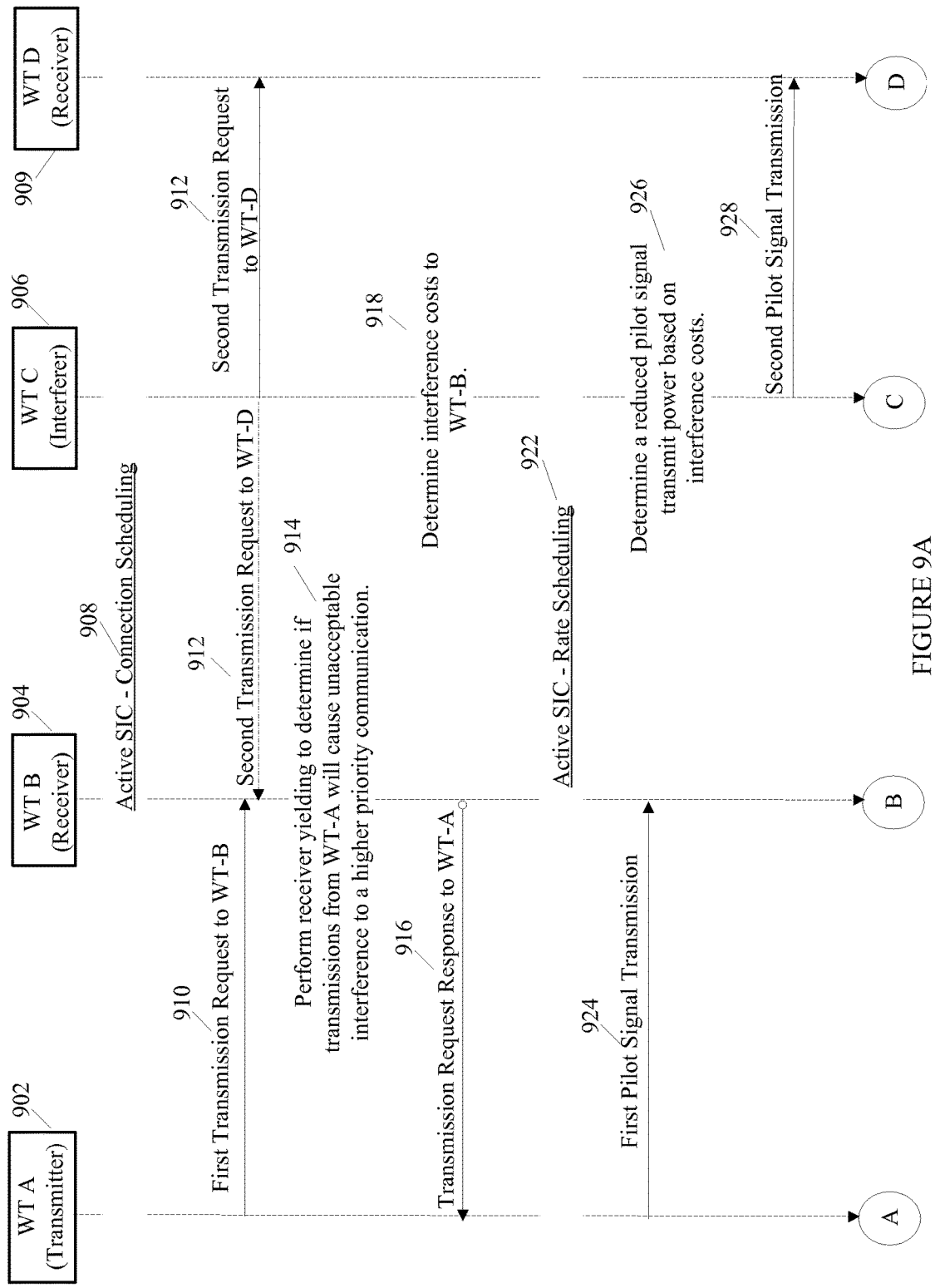
FIG. 9 (comprising FIGS. 9A, 9B, and 9C) illustrates another example of a protocol for an ad hoc communication network that facilitates interference cancellation.
Figure 9B:
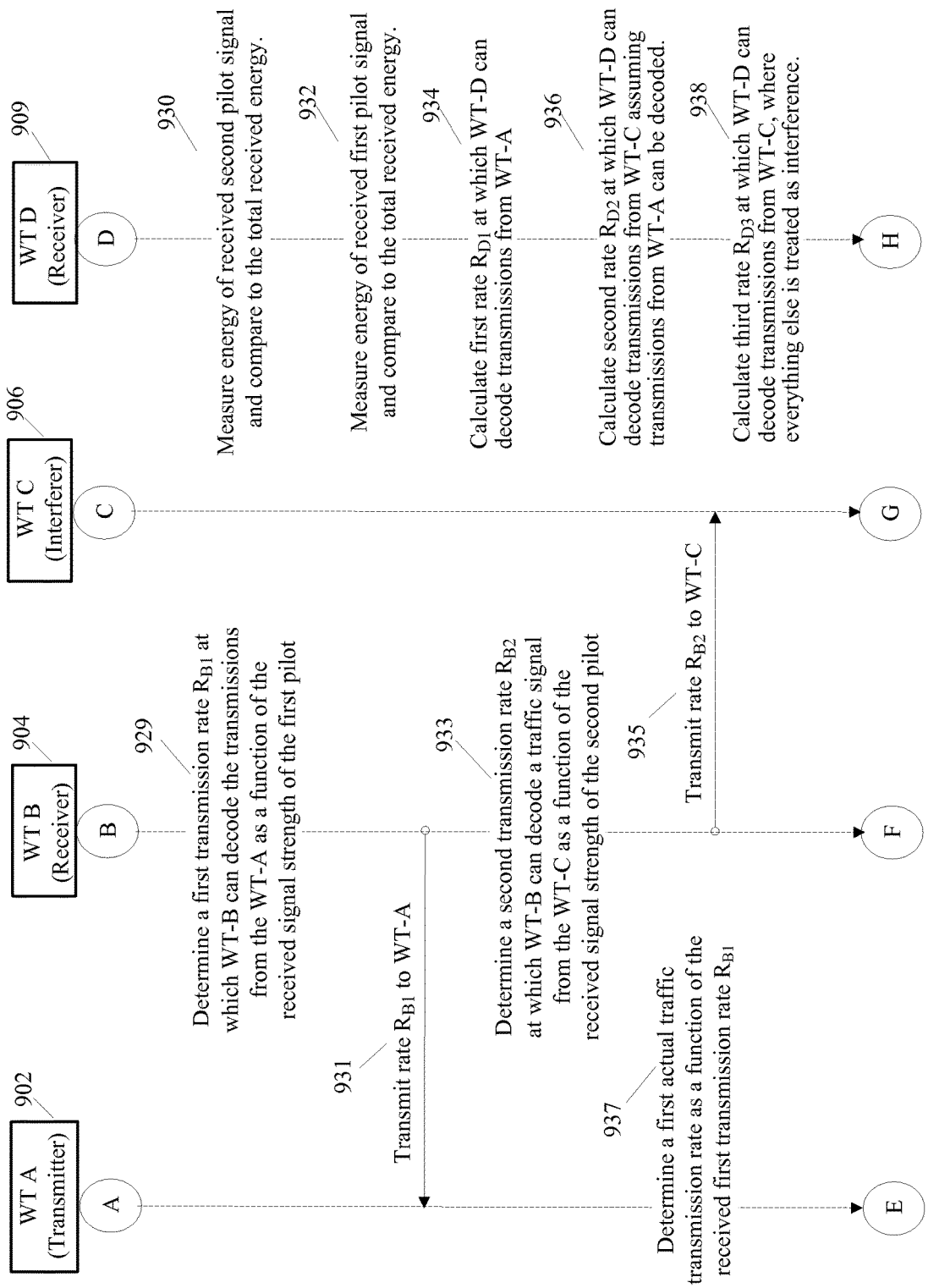
Figure 9C:
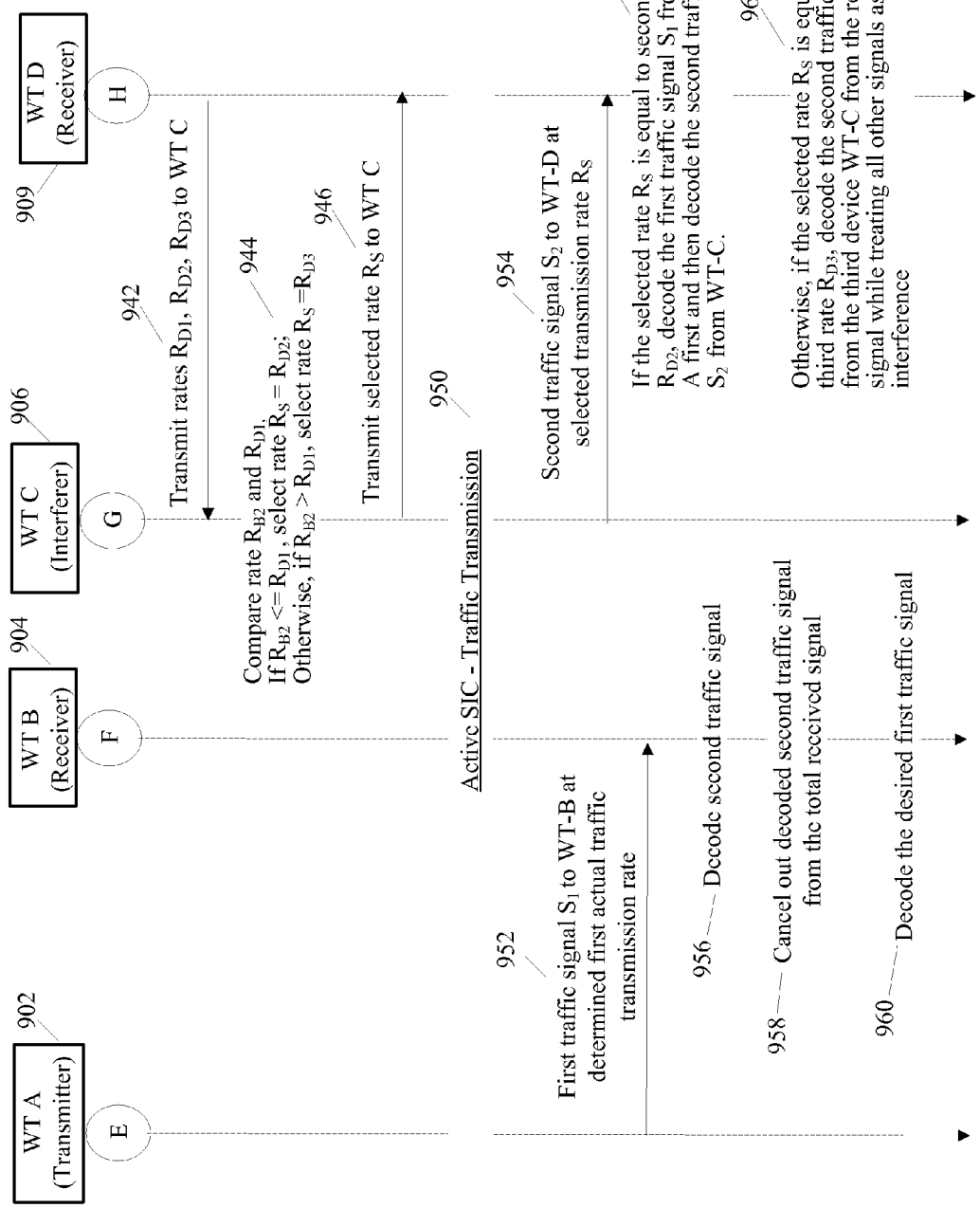

FIG. 9 (comprising FIGS. 9A, 9B, and 9C) illustrates another example of a protocol for an ad hoc communication network that facilitates interference cancellation. In this example, the protocol may include a connection scheduling stage 908, a rate scheduling stage 922, and a transmission stage 950. In this example, active successive interference cancellation is performed similar to the method illustrated in FIGS. 5-8, but additional power control is performed by the interfering device with rate control from the lower-priority receiver device.

In the connection scheduling stage 908, a first device WT-A 902 (transmitter) transmits a first transmission request 910, which is heard by a second device WT-B 904 (receiver). A nearby third device WT-C 906 (interferer) may transmit a second transmission request 912 to a fourth device WT-D 909 (receiver). The second transmission request 912 may also be received or perceived by the second device WT-B 904. According to one feature, the second device WT-B 904 may then perform receiver yielding where it may decide to drop out (e.g., ignore or deny the transmission request from the first device WT-A 902) if it will cause unacceptable interference to a higher priority communication. For instance, the second device WT-B 904 may determine, as a function of the received signal strength of the first and/or the second transmission requests 910 and 912, whether it can cancel the interference from the third device WT-C 906. If so, the second device WT-B 904 may send a transmission request response 916 to the first device WT-A 902.

Rather than implementing transmitter yielding at the third device WT-C 906, the third device WT-C 906 may instead perform power control in the later stages of the protocol (i.e., rate scheduling stage and/or traffic transmission stage) so as to ensure that it does not generate excessive interference for the second device WT-B 904. Similarly, a fourth device WT-D 909, which is the intended receiver for transmissions from the third device WT-C 906, need not perform receiver yielding. That is, the fourth device WT-D 909 does not drop out if it detects that the signal power from the first device WT-A 902 is greater than a receiver-yield threshold. Instead, the fourth device WT-D 909 may choose to decode and subtract the traffic signal from the first device WT-A 902 before decoding the signal from the third device WT-C 906.

In the rate scheduling stage 922, the first device WT-A 902 may transmit a first pilot signal $P_1$ 924. The third device WT-C 906 may also transmit a second pilot signal $P_2$ 928. However, the third device WT-C 906 may determine a reduced transmit power 926 if the interference cost 918, as determined in the connection scheduling stage 908, is greater than a given threshold. The third device WT-C 906 then transmits the second pilot signal $P_2$ at the reduced transmit power 926.

The second device WT-B 904 may determine a first transmission rate $R_{B1}$ 929 at which it can decode a first traffic transmission $S_1$ from the first device WT-A 902 as a function of the received signal strength $PWR_{P1-B}$ of the first pilot signal $P_1$ 924 from the first device WT-A 902, assuming at least some portion of the signal energy from the third device WT-C 906 can be cancelled out. The second device WT-B 904 may send a first rate report signal (feedback) including the first transmission rate $R_{B1}$ 931 to the first device WT-A 902. The first device WT-A 902 may determine a first actual traffic transmission rate $R_{ACTUAL-1}$ 937, as a function of the received first transmission rate $R_{B1}$ from the second device WT-B 904.

In addition, the second device WT-B 904 may also determine a second transmission rate $R_{B2}$ 933 at which it can decode a second traffic transmission $S_2$ from the third device WT-C 906 as a function of the received signal strength $PWR_{P2-B}$ of the second pilot signal $P_2$ 928 from the third device WT-C 906. The second transmission rate $R_{B2}$ 933 may also be determined as a function of the received signal strength $PWR_{P1-B}$ of the first pilot $P_1$ from the first device WT-A 902. This is because when the second device WT-B 904 attempts to carry out SIC to cancel out the traffic signal from the third device WT-C 906 before it can decode the intended traffic signal from the first device WT-A 902, the traffic signal from the first device is treated as interference in the process of first decoding the traffic signal from the third device WT-C 906. The second device WT-B 904 may send the second rate report signal including the second transmission rate $R_{B2}$ 935 to the third device WT-C 906.

The fourth device WT-D 909 may measure the energy in the second pilot signal $P_2$ transmitted from the third device WT-C 906 and compare it to the total energy received 930. The fourth device WT-D 909 may also measure the energy in the first pilot signal $P_1$ transmitted from the first device WT-A 902 and compare it to the total energy received 932. Based on these pilot signal energy comparisons, the fourth device WT-D 909 may calculate three rate reports based on these received energy measurements. The first rate report 934 may be a first rate $R_{D1}$ at which the fourth device WT-D can decode the traffic signal transmitted by the first device WT-A 902. The second rate report 936 may be a second rate $R_{D2}$ at which the fourth device WT-D 909 can decode the traffic signal transmitted by the third device WT-C 906 assuming that it has decoded the traffic signal transmission from the first device WT-A 902 and subtracted its contribution from the overall received signal. The third rate report 938 may be a third rate $R_{D3}$ at which the fourth device WT-D 909 can decode the traffic signal transmitted by the third device WT-C 906 treating everything else (including the signal from the first device WT-A) as interference. The fourth device WT-D 909 may transmit all three rate reports 942 to the third device WT-C 906.

One example is provided herein of formulas that the fourth device WT-D 909 can use to compute the three transmission rates $R_{D1}$, $R_{D2}$, and $R_{D3}$. Suppose that $PWR_{P2}$-D is the received power of the second pilot $P_2$ sent by the third device WT-C 906 as measured by the fourth device WT-D 909, $PWR_{P1-D}$ is the received power of the first pilot $P_1$ sent by the first device WT-A 902 as measured by the fourth device WT-D 909, and Pt is the total received power of the overall received signal during a pilot interval as measured by the fourth device WT-D 909. The first, second and third rate reports by $R_{D1}$, $R_{D2}$ and $R_{D3}$ can be calculated as follows:

$$R_{D1} = \log(1 + PWR_{P1-D}/(Pt - PWR_{P1-D})) \quad \text{(Formula 1)}$$

$$R_{D2} = \log(1 + PWR_{P2-D}/(Pt - PWR_{P1-D} - PWR_{P2-D})) \quad \text{(Formula 2)}$$

$$R_{D3} = \log(1 + PWR_{P2-D}/(Pt - PWR_{P2-D})) \quad \text{(Formula 3)}$$

Note that the use of the log function is just a preferred embodiment and other functions may be used in its place.

In order to compute $R_{D1}$, the fourth device WT-D 909 may measure $PWR_{P1-D}$ by correlating the overall received signal with the known pilot signal $P_1$ sent by the first device WT-A 902. The fourth device WT-D 909 also measures the total power Pt of overall received signal and subtracts $PWR_{P1-D}$ from the total power Pt.

In order to compute $R_{D2}$, the fourth device WT-D 909 may measure $PWR_{P2-D}$ by correlating the overall received signal with the known pilot signal $P_2$ sent by the third device WT-C 906. The fourth device WT-D 909 may also measure $PWR_{P1-D}$ by correlating the overall received signal with the known pilot signal $P_1$ sent by the first device WT-A 902. The fourth device WT-D 909 also measures the total power Pt of overall received signal and subtracts $PWR_{P1-D}$ and $PWR_{P2-D}$ from the total power Pt.

In order to compute $R_{D3}$, the fourth device WT-D 909 may measure $PWR_{P2-D}$ by correlating the overall received signal with the known pilot signal $P_2$ sent by the third device WT-C 906. The fourth device WT-D 909 also measures the total power Pt of overall received signal and subtracts $PWR_{P2-D}$ from the total power Pt.

Once the rates $R_{D1}$, $R_{D2}$ and $R_{D3}$ are computed, they are transmitted to the third device WT-C 906.

The third device WT-C 906 also receives and decodes a fourth rate $R_{D4}$ coming from the second device WT-D 909. The third device WT-C 906 receives and decodes the three rate reports sent by the fourth device WT-D 909 as well as a fourth rate report sent by the second device WT-B 904 which indicates the rate $R_{B2}$. This fourth rate $R_{B2}$ is the maximum rate at which the second device WT-B 904 can decode traffic data from the first device WT-A 902. That is, the fourth rate $R_{B2}$ is the transmission rate at which the second device WT-B 904 can cancel out transmissions from the third device WT-C 906 to decode and obtain the desired traffic signal or transmissions from the first device WT-A 902.

Upon receiving the four rate reports $R_{D1}$, $R_{D2}$, $R_{D3}$ and $R_{B2}$, the third device WT-C 906 chooses a selected transmission rate $R_S$ for its traffic transmission to the fourth device WT-D 909 as follows:

if $R_{B2} > R_{D1}$, then $R_S <= R_{D3}$, otherwise if $R_{B2} <= R_{D1}$, then $R_S <= R_{D3}$.

That is, the third device WT-C 906 compares the rate report $R_{B2}$ sent by the second device WT-B 904 and the first rate $R_{D1}$ sent by the fourth device WT-D 909. If the rate report $R_{B2}$ is less than or equal to the first rate $R_{D1}$ (i.e., $R_{B2} <= R_{D1}$), the third device WT-C 906 encodes its traffic signal using the second rate $R_{D2}$ indicated by the fourth device WT-D 909. Otherwise, if the rate report $R_{B2}$ is greater than the first rate $R_{D1}$ (i.e., $R_{B2} > R_{D1}$), the third device WT-C 906 encodes its traffic signal using the third rate $R_{D3}$ sent by the fourth device WT-D 909. The third device WT-C 909 encodes the selected rate $R_S$ and indicates this selected rate $R_S$ to the fourth device via an in-band rate signaling portion of the traffic channel.

In the traffic transmission stage 950, the first device WT-A 902 sends the first traffic signal $S_1$ 952 to the second device WT-B 904 at the first actual traffic transmission rate $R_{ACTUAL-1}$. Concurrent or overlapping with the first traffic signal $S_1$, the third device WT-C 906 may also send its second traffic signal $S_2$ to the fourth device WT-D 909 at the selected rate $R_S$ 954.

The second device WT-B 904 may receive a combined signal including part or all of the first and second traffic signals $S_1$ and $S_2$. The second device WT-B 904 may decode the second traffic signal $S_2$ 946 from the third device WT-C 906, then cancel it out (subtract) from the total received signal 958, and finally decode the desired first traffic signal $S_2$ 960 from the first device WT-A 902.

Similarly, the fourth device WT-D 909 may receive a combined signal including part or all of the first and second traffic signals $S_1$ and $S_2$. If the selected rate $R_S$ is the second rate $R_{D2}$, the fourth device WT-D 909 first decodes the first traffic signal $S_1$ sent by the first device WT-A 902, reconstructs the corresponding signal and subtracts off its contribution from the overall received signal before decoding the second traffic signal $S_2$ from the third device WT-C 906. If the selected rate $R_S$ is the third rate $R_{D3}$, the fourth device WT-D 909 decodes the second traffic signal $S_2$ from the third device WT-C 906 from the received signal while treating all other signals (including signals from the first device WT-A 902) as interference 964.

Figure 10A:
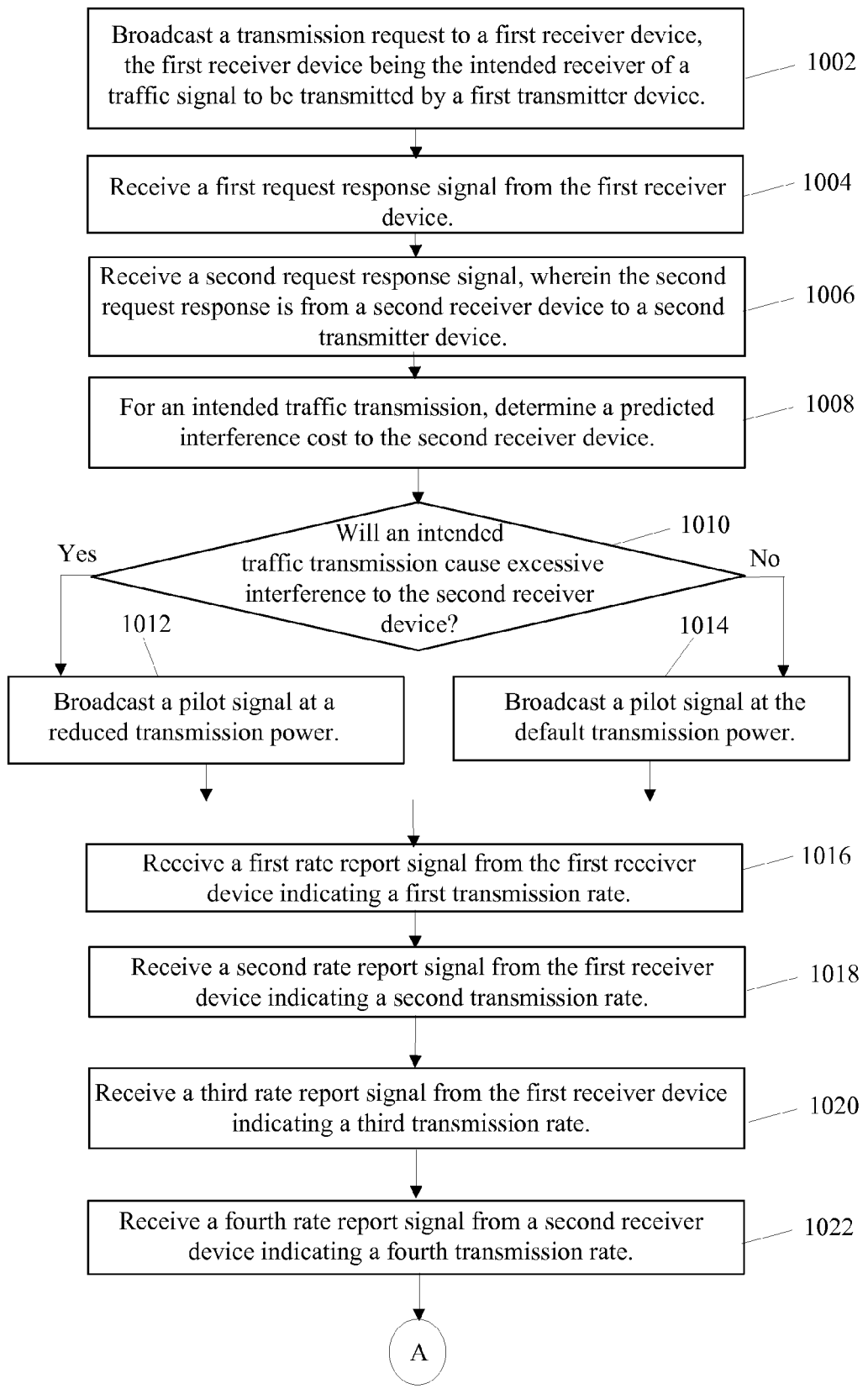
FIG. 10 (comprising FIGS. 10A and 10B) illustrates an example of a method operational on an interfering transmitter device that facilitates active successive interference cancellation within a peer-to-peer network.
Figure 10B:
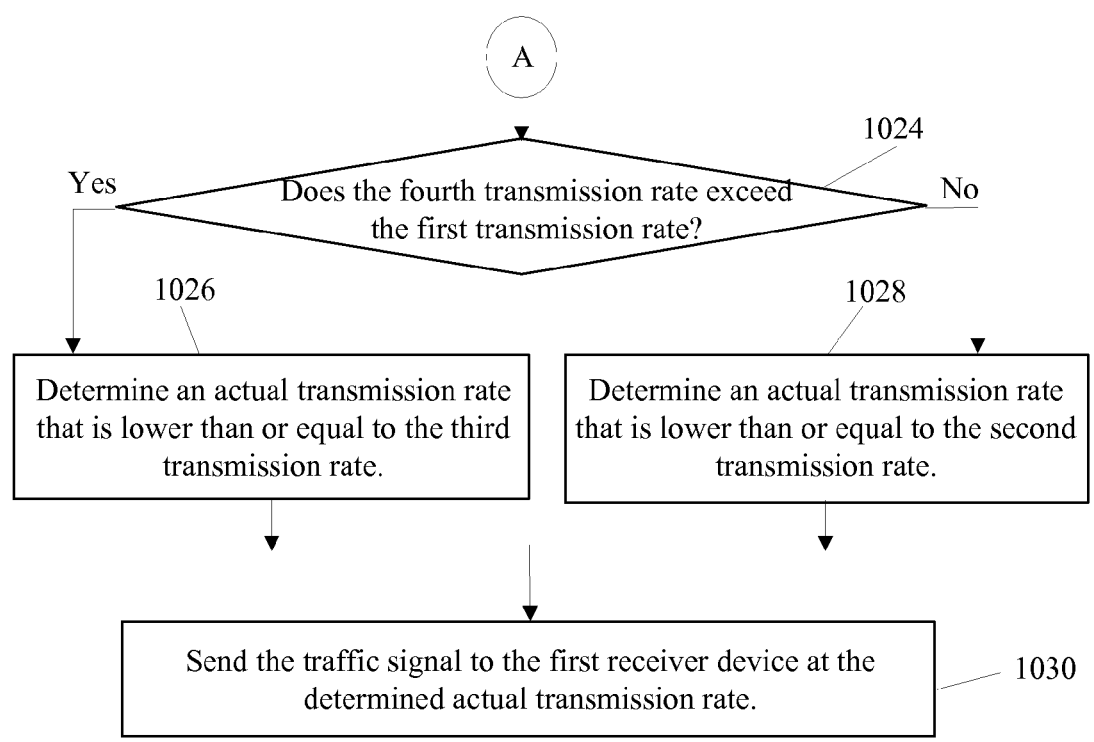

FIG. 10 (comprising FIGS. 10A and 10B) illustrates an example of a method operational on an interfering transmitter device that facilitates active successive interference cancellation within a peer-to-peer network. In this example, the "third device" (e.g., WT C 306 in FIG. 3) is referred to as the low-priority interfering first transmitter device while the "fourth device" (e.g., WT D 308 in FIG. 3) is referred to as the first receiver device. The "first device" (e.g., WT A 302 in FIG. 3) may be referred to as may be referred to as the second transmitter device while the "second device" (e.g., WT B 304 in FIG. 3) may be referred to as the second receiver device. In this example, traffic transmissions from the third device to the fourth device may have a lower communication priority than traffic transmissions from the first device to the second device.

The interfering first transmitter device (third device WT-C) may broadcast a transmission request to a first receiver device (fourth device WT-D), the first receiver device (fourth device WT-D) being the intended receiver of a traffic signal to be transmitted by the interfering first transmitter device (third device WT-C) 1002.

Prior to sending a first traffic signal to the intended first receiver device (fourth device WT-D), the first transmitter device (third device WT-C) may receive a first request response signal from the first receiver device (fourth device WT-D) which indicates that the first receiver device (fourth device WT-D) is ready to receive traffic from the first transmitter device (third device WT-C) 1004. Likewise, a second request response signal may be received by the first transmitter device (third device WT-C), wherein the second request response signal may be sent by a second receiver device (second device WT-B) to a second transmitter device (first device WT-A) indicating that the second receiver device (second device WT-B) is ready to receive traffic from the second transmitter device (first device WT-A) 1006.

The first transmitter device (third device WT-C) may then determine whether to send or broadcast the traffic signal to the first receiver device (fourth device WT-D). In one example, the first transmitter device (third device WT-C) may determine whether its intended traffic transmission will cause excessive interference to the second receiver device (second device WT-B), which will be receiving a traffic transmission from the second transmitter device (first device WT-A), by calculating a predicted interference cost to the second receiver device (second device WT-B) 1008. The predicted interference cost may be calculated as a function of the received power of the second request response signal as well as the transmission power the first transmitter device (third device WT-C) intends to use for its traffic transmission.

The first transmitter device (third device WT-C) may then determine whether the intended traffic transmission at a default transmission power will cause excessive interference to the second receiver device (second device WT-B) 1010. For instance, the first transmitter device (third device WT-C) may determine whether the ratio received power of the second request response signal and its transmission power for traffic is greater than a threshold amount. If so, the first transmitter device (third device WT-C) may broadcast its pilot signal at a reduced transmit power based on the interference costs 1012. That is, the first transmitter device (third device WT-C) may reduce its pilot transmit power to reduce its interference to other nearby devices to an acceptable level. Otherwise, the transmitter device (third device) can broadcast its pilot signal at its default transmission power 1014. Note that, in one implementation, the power of pilot signals within a peer-to-peer network may be proportional to the traffic transmission power for the transmitting device.

The first transmitter device (third device WT-C) may then receive a first rate report signal from the first receiver device (fourth device WT-D) indicating a first transmission rate 1016. For example, the first transmission rate may be the maximum rate at which the intended first receiver device (fourth device WT-D) can reliably decode a second traffic signal from a second transmitter device (first device WT-A) that is intended for the second receiver device (second device WT-B). The first transmitter device (third device WT-C) may also receive a second rate report signal from the first receiver device (fourth device WT-D) indicating a second transmission rate 1018. For instance, the second transmission rate may be the maximum rate at which the intended first receiver device (WT-D) can reliably decode the first traffic signal from the interfering first transmitter device (third device WT-C) assuming that the second traffic signal from the second transmitter device (first device WT-A) has been decoded and subtracted from the overall received signal. The first transmitter device (third device WT-C) may also receive a third rate report signal from the first receiver device (fourth device WT-D) indicating a third transmission rate 1020. The third transmission rate may be the maximum rate at which the intended first receiver device (fourth device WT-D) can reliably decode the first traffic signal from the interfering first transmitter device (third device WT-C) assuming that all other traffic signals, including the second traffic signal, are treated as noise and are not decoded and subtracted. The first transmitter device (third device WT-C) may also receive a fourth rate report signal from the second receiver device (second device WT-B) indicating a fourth transmission rate 1022. The fourth transmission rate may be the maximum rate at which the second receiver device (second device WT-B) can decode the second traffic signal from the first transmitter device (first device WT-C). Note that, the pilot signal may be broadcasted prior to receiving the first, second, third and/or fourth rate report signals.

The first transmitter device (third device WT-C) may then determine whether the fourth transmission rate exceeds the first transmission rate 1024. If it is determined that the fourth transmission rate exceeds the first transmission rate, the first transmitter device (third device WT-C) may determine an actual transmission rate for transmitting the first traffic signal to the intended first receiver device (fourth device WT-D), wherein the actual transmission rate is lower than or equal to the third transmission rate 1026. Otherwise, if it is determined that the fourth transmission rate is lower than or equal to the first transmission rate, the first transmitter device (third device WT-C) determines an actual transmission rate for transmitting the first traffic signal to the intended first receiver device (fourth device WT-D), wherein the transmission rate is lower than or equal to the second transmission rate 1028. The first traffic signal is then transmitted to the intended first receiver device (fourth device WT-D) at the determined actual traffic transmission rate 1030.

Note that, in one example, traffic transmissions from the second transmitter device (first device WT-A) to the second receiver device (second device WT-B) are of higher priority than the traffic transmissions from the interfering first transmitter device (third device WT-C) to the first receiver device (fourth device WT-D). According to one feature, the transmission power of the first traffic signal may be proportional to the transmission power of the pilot signal. The first traffic signal may be transmitted over a frequency spectrum shared with a second traffic signal transmitted from the second transmitter device (first device WT-A) to the second receiver device (second device WT-B).

Figure 11:
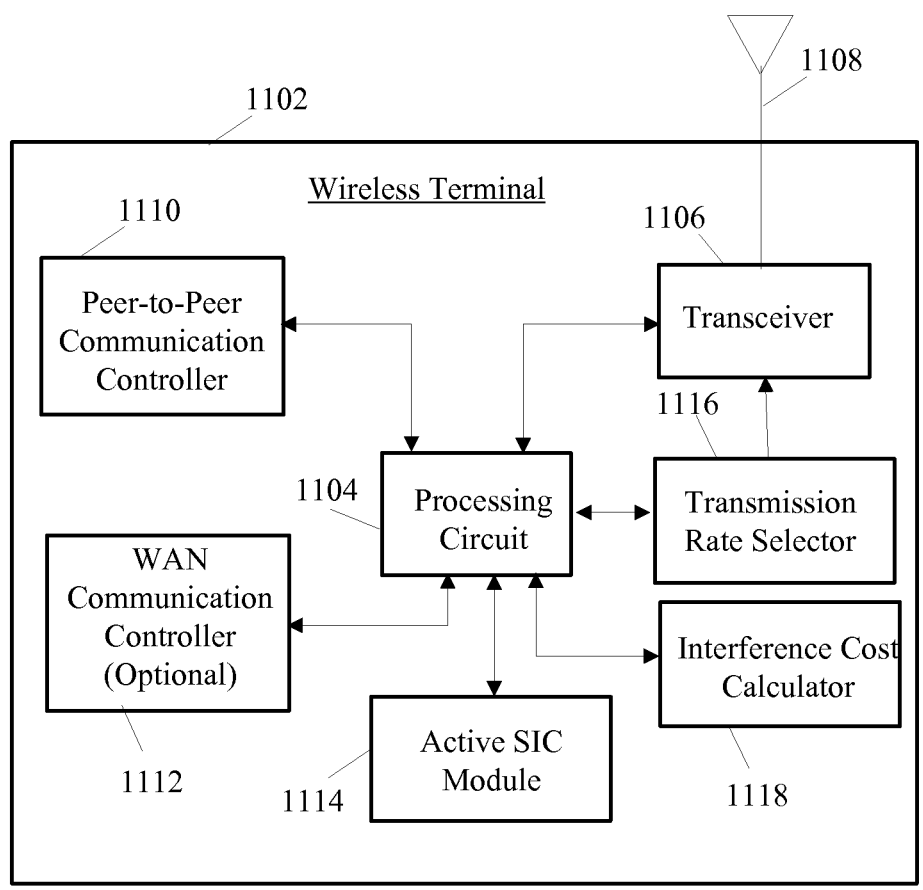
FIG. 11 is a block diagram illustrating a wireless terminal (interfering transmitter) that is configured to perform or facilitate active successive interference cancellation (SIC) within a peer-to-peer wireless network.

FIG. 11 is a block diagram illustrating a wireless terminal (interfering transmitter) that is configured to perform or facilitate active successive interference cancellation (SIC) within a peer-to-peer wireless network. The wireless terminal 1102 may include a processing circuit 1104 (e.g., one or more processors, electrical components, and/or circuit modules) coupled to a transceiver 1106 (e.g., transmitter and/or receiver modules) which is coupled to an antenna 1108 through which peer-to-peer communications can take place. The processing circuit 1104 may also be coupled to a peer-to-peer communication controller 1110 that may facilitate peer-to-peer communications and (optionally) a wide area network (WAN) communication controller 1112 that may facilitate communications over a WAN. The wireless terminal 1102 may also include an active successive interference cancellation module 1114 coupled to the processing circuit 1104, a transmission rate selector 1116 and an interference cost calculator 1118.

In one example, the wireless terminal 1102 may operate as a interfering first transmitter device (i.e., third device WT C 306 in FIG. 3) and may adjust its transmission power and/or transmission rate in its peer-to-peer communications to reduce interference to other nearby devices. In this configuration, the wireless terminal may be configured to perform the operations described in FIGS. 9 and 10. For instance, the processing circuit 1104 and/or transceiver 1106 may operate to send a first transmission request to an intended first receiver device. In response, the wireless terminal 1102 may receive a first request response signal from the intended first receiver device. Additionally, the wireless terminal 1102 may also receive a second request response signal, wherein the second request response is from a second receiver device to a second transmitter device. The processing circuit 1104, peer-to-peer communication controller 1110, active SIC module 1114 and/or interference cost calculator 1118 may determine a predicted interference cost to the second receiver device. If it is determined that an intended traffic transmission will cause excessive interference to the second receiver device, the transceiver 1106 may transmit a pilot signals at a reduced transmission power.

Subsequently, the transceiver 1106, processing circuit 1104, and/or peer-to-peer communication controller 1110 may receive (a) one or more rate reports from the first receiver device indicating a first, second, and third transmission rates and (b) a fourth rate report signal from the second receiver device indicating a fourth transmission rate.

If the fourth transmission rate exceeds the first transmission rate, the transmission rate selector 1116 may determine an actual transmission rate that is lower than or equal to the third transmission rate. Otherwise, the transmission rate selector 1116 may determine an actual transmission rate that is lower than or equal to the second transmission rate. The transceiver 1106, processing circuit 1104, and/or peer-to-peer communication controller 1110 may then send a first traffic signal to the intended first receiver device at the determined actual transmission rate. Such transmission may occur over a shared frequency spectrum and in an overlapping time interval as a second traffic signal transmitted by the second transmitter device to the second receiver device.

Consequently, a circuit in an interfering first transmitter device may be adapted to receive a first rate report signal from the intended first receiver device indicating a first transmission rate, the intended first receiver device being the intended receiver of a wireless first traffic signal to be transmitted by the first transmitter device. The same circuit, a different circuit, or a second section of the same or different circuit may be adapted to receive a second rate report signal from the intended first receiver device indicating a second transmission rate. The same circuit, a different circuit, or a third section of the same or different circuit may be adapted to receive a third rate report signal from the intended first receiver device indicating a third transmission rate. The same circuit, a different circuit, or a fourth section of the same or different circuit may be adapted to receive a fourth rate report signal from a second receiver device indicating a fourth transmission rate. The same circuit, a different circuit, or a fifth section of the same or different circuit may be adapted to determine whether the fourth transmission rate exceeds the first transmission rate. The same circuit, a different circuit, or a sixth section of the same or different circuit may be adapted to determine or select an actual transmission rate. If the fourth transmission rate exceeds the first transmission rate, the actual transmission rate for transmitting the first traffic signal to the intended first receiver device is lower than or equal to the third transmission rate. Otherwise, if the fourth transmission rate is lower than or equal to the first transmission rate, the actual transmission rate for transmitting the first traffic signal to the intended first receiver device is lower than or equal to the second transmission rate. The same circuit, a different circuit, or a seventh section of the same or different circuit may be adapted to transmit the first traffic signal to the intended first receiver device at the actual traffic transmission rate.

Figure 12A:
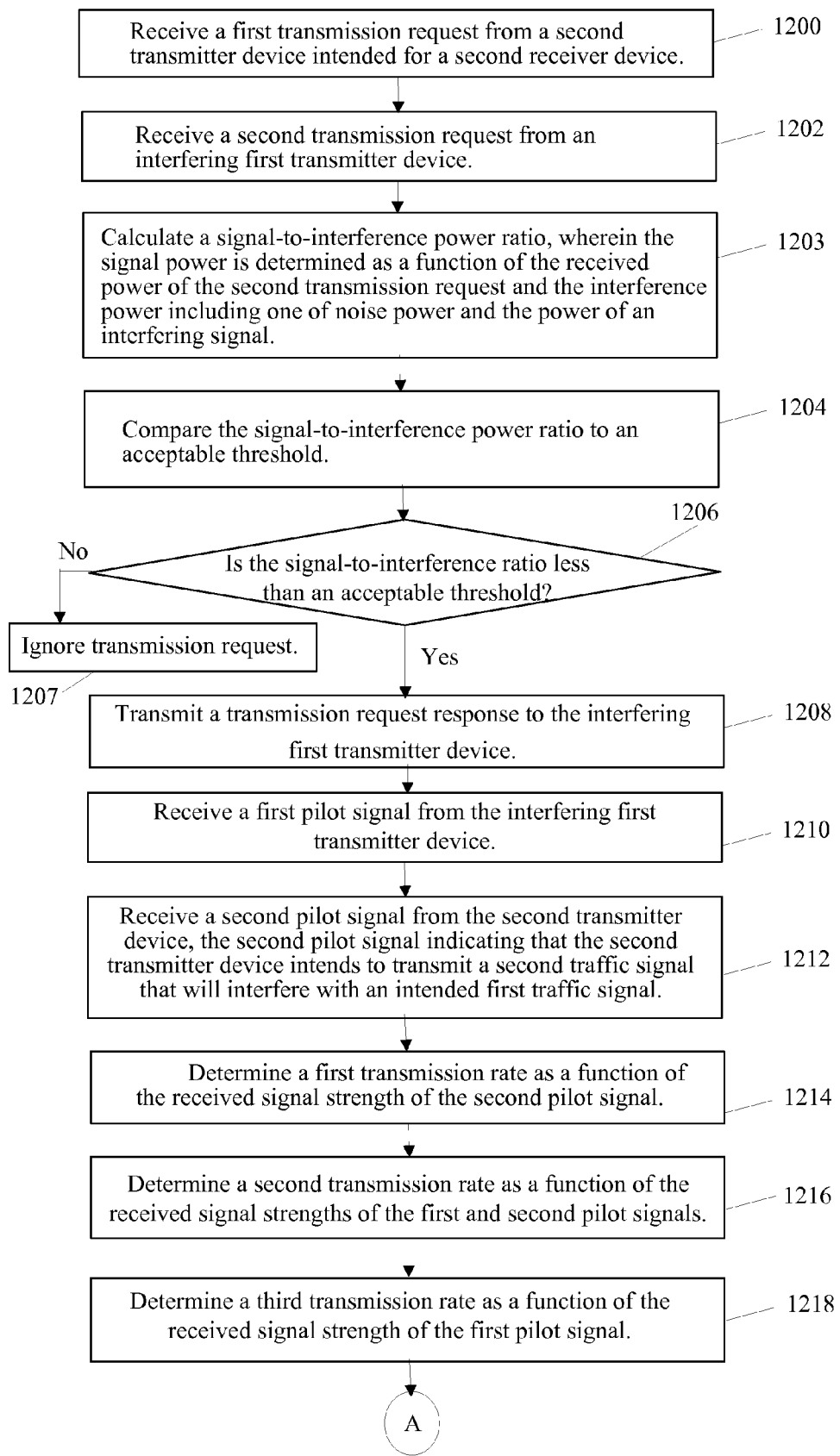
FIG. 12 (comprising FIGS. 12A and 12B) illustrates an example of a method operational on a low-priority receiver device that facilitates active successive interference cancellation within a peer-to-peer network.
Figure 12B:
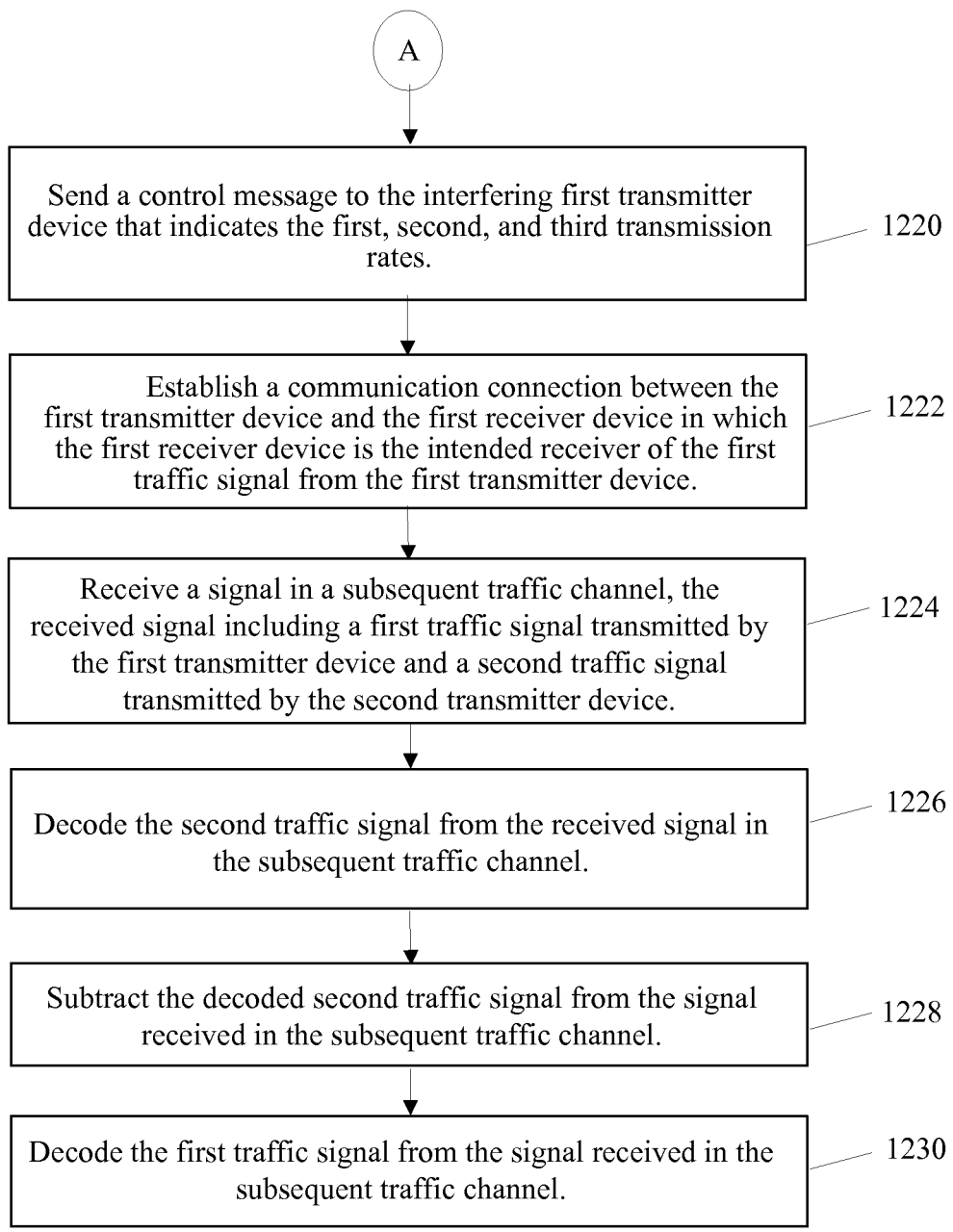

FIG. 12 (comprising FIGS. 12A and 12B) illustrates an example of a method operational on a low-priority receiver device that facilitates active successive interference cancellation within a peer-to-peer network. In this example, the "third device" (e.g., WT C 306 in FIG. 3) is referred to as the low-priority interfering first transmitter device while the "fourth device" (e.g., WT D 308 in FIG. 3) is referred to as the first receiver device. The "first device" (e.g., WT A 302 in FIG. 3) may be referred to as may be referred to as the second transmitter device while the "second device" (e.g., WT B 304 in FIG. 3) may be referred to as the second receiver device. In this example, traffic transmissions from the third device to the fourth device may have a lower communication priority than traffic transmissions from the first device to the second device.

A first transmission request may be received from the second transmitter device (first device WT-A) intended for the second receiver device (second device WT-B) 1200 prior to sending the first traffic transmission rate. The first transmission request may indicate that the second transmitter device (first device WT-A) intends to transmit the second traffic signal to the second receiver device (second device WT-B) in a subsequent traffic channel. A second transmission request may be received from the interfering first transmitter device (third device WT-C) 1202 prior to sending the second and third traffic transmission rates. The second transmission request may indicate that the interfering first transmitter device (third device WT-C) intends to transmit the first traffic signal to the first receiver device (fourth device WT-D) in the subsequent traffic channel. The second traffic signal to be transmitted by the second transmitter device (first device WT-A) will interfere with the first traffic signal to be transmitted by the interfering first transmitter device (third device WT-C).

The first receiver device (fourth device WT-D) may calculate a signal-to-interference power ratio, wherein the signal power is determined as a function of the received power of the second transmission request and the interference power including one of noise power and the power of an interfering signal, the interfering signal being different than the first transmission request 1203. The calculated signal-to-interference power ratio is then compared with an acceptable threshold 1204 to determine whether to send a transmission request response to the interfering first transmitter device (third device WT-C). If the signal-to-interference power is less an acceptable threshold 1206, the first receiver device (fourth device WT-D) transmits the transmission request response to the interfering first transmitter device (third device WT-C) 1208. Otherwise, the second transmission request is ignored. 1207.

The first receiver device (fourth device WT-D) may wirelessly receive a first pilot signal from the interfering first transmitter device (third device WT-C) 1210 and also wirelessly receive a second pilot signal from a second transmitter device (first device WT-A), the second pilot signal indicating that the second transmitter device (first device WT-A) intends to transmit a second traffic signal that will interfere with the first traffic signal 1212.

A first transmission rate is determined as a function of the received signal strength of the second pilot signal 1214. The first transmission rate may be the maximum rate at which the first receiver device (fourth device WT-D) can reliably decode the second traffic signal from the second transmitter device (first device WT-A). A second transmission rate is determined as a function of the received signal strengths of the first and second pilot signals 1216. The second transmission rate may be the maximum rate at which the first receiver device (fourth device WT-D) can reliably decode the first traffic signal from the first transmitter device (third device WT-C) assuming that the second traffic signal from the second transmitter device (first device WT-A) has been decoded and subtracted from the overall received signal. A third transmission rate is determined as a function of the received signal strength of the first pilot signal 1218. The third transmission rate may be the maximum rate at which the first receiver device (fourth device WT-D) can reliably decode the first traffic signal from the first transmitter device (third device WT-C) assuming that all other traffic signals, including the second traffic signal, are treated as noise and are not decoded and subtracted. A message may be wirelessly transmitted to the first transmitter device (third device WT-C) including data rate information indicative of the first, second, and third transmission rates 1220.

A wireless communication connection may then be established between the first transmitter device (third device WT-C) and the first receiver device (fourth device WT-D) 1222. A signal may be subsequently received over a traffic channel, the received signal including the first traffic signal transmitted by the first transmitter device (third device WT-C) and the second traffic signal transmitted by the second transmitter device (first device WT-A) 1224. The second traffic signal is decoded from the signal received in the subsequent traffic channel 1226. The decoded second traffic signal is subtracted from the received signal in the subsequent traffic channel 1228 to obtain the first traffic signal 1230. The first and second traffic signals may be received in overlapping time intervals and the first and second traffic signals may be transmitted in the same frequency spectrum.

Figure 13:
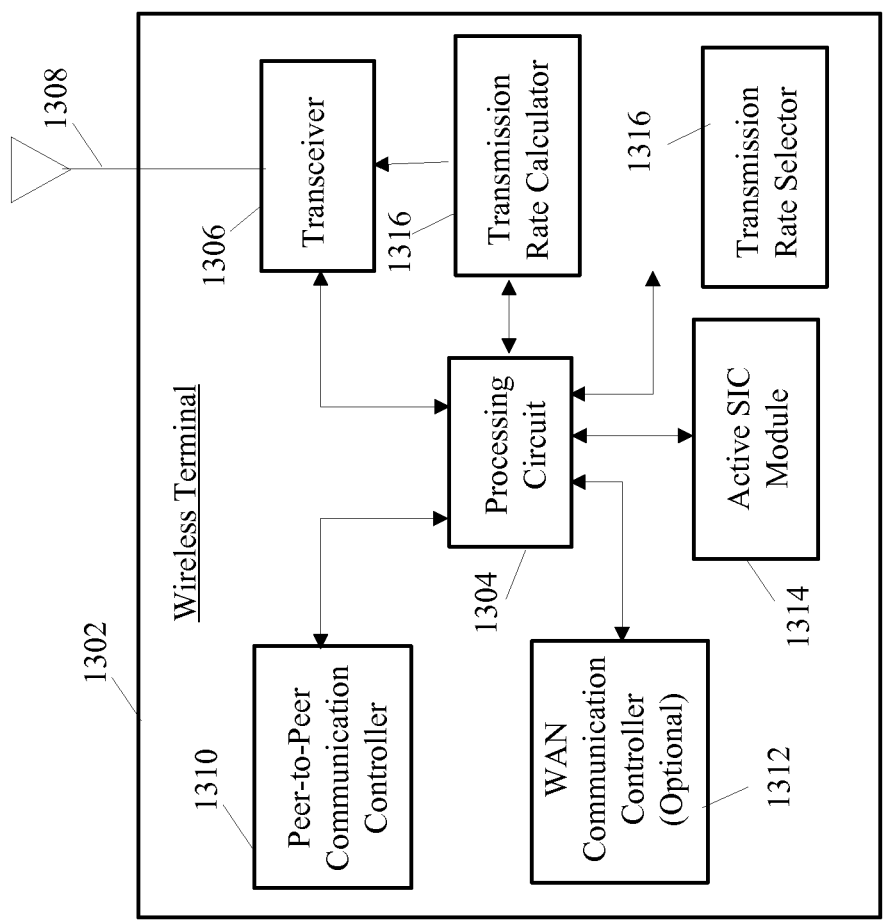
FIG. 13 is a block diagram illustrating a wireless first receiver device that is configured to perform or facilitate active successive interference cancellation (SIC) within a peer-to-peer wireless network.

FIG. 13 is a block diagram illustrating a wireless first receiver device that is configured to perform or facilitate active successive interference cancellation (SIC) within a peer-to-peer wireless network. The first receiver device 1302 may include a processing circuit 1304 (e.g., one or more processors, electrical components, and/or circuit modules) coupled to a transceiver 1306 (e.g., transmitter and/or receiver modules) which is coupled to an antenna 1308 through which peer-to-peer communications can take place. The processing circuit 1304 may also be coupled to a peer-to-peer communication controller 1310 that may facilitate peer-to-peer communications and (optionally) a wide area network (WAN) communication controller 1312 that may facilitate communications over a WAN. The first receiver device 1302 may also include an active successive interference cancellation module 1314 coupled to the processing circuit 1304, a transmission rate selector 1316 and an interference cost calculator 1318.

In one example, the first receiver device may be configured to perform the operations described in FIGS. 9 and 12. For instance, the processing circuit 1304 and/or transceiver 1306 may operate to receive a first transmission request from the second transmitter device. The first transmission request may indicate that the second transmitter device intends to transmit the second traffic signal to the second receiver device in the subsequent traffic channel. Similarly, the processing circuit 1304 and/or transceiver 1306 may operate to receive a second transmission request from the interfering first transmitter device prior to sending the second and third traffic transmission rates. The second transmission request may indicate that the interfering first transmitter device intends to transmit the first traffic signal to the first receiver device in the subsequent traffic channel. The second traffic signal to be transmitted by the second transmitter device will interfere with the first traffic signal to be transmitted by the interfering first transmitter device. The processing circuit 1304 and/or transceiver 1306 may (a) determine whether to send a request response to the interfering first transmitter device as a function of the received powers of the first and the second transmission requests, and (b) send the request response to the interfering first transmitter device if it is determined to send the transmission request response.

Subsequently, the transceiver 1306, processing circuit 1304, and/or peer-to-peer communication controller 1310 may receive (a) wirelessly receive a first pilot signal from the interfering first transmitter device, (b) wirelessly receive a second pilot signal from a second transmitter device, the second pilot signal indicating that the second transmitter device intends to transmit a second traffic signal that will interfere with the first traffic signal. The processing circuit 1304 and/or the transmission rate calculator 1316 may then (a) determine a first transmission rate as a function of the received signal strength of the second pilot signal, (b) determine a second transmission rate as a function of the received signal strengths of the first and second pilot signals, and (c) determine a third transmission rate as a function of the received signal strength of the first pilot signal. The processing circuit 1304 and/or the transceiver 1306 may then transmit a control message to the first transmitter device, the control message including data rate information indicative of the first, second, and third transmission rates.

Subsequently, the transceiver 1306, processing circuit 1304, and/or peer-to-peer communication controller 1310 may (a) establish a wireless communication connection between the interfering transmitter device and the wireless terminal (receiver device), (b) receive a signal in a subsequent traffic channel, the received signal including the first traffic signal transmitted by the interfering transmitter device and the second traffic signal transmitted by the first device, (c) decode the second traffic signal from the signal received in the subsequent traffic channel, (d) subtract the decoded second traffic signal from the received signal in the subsequent traffic channel to obtain the first traffic signal, and (e) decode the first traffic signal from the received signal in the subsequent traffic channel.

Consequently, a circuit in a first receiver device may be adapted to receive a first pilot signal from a first transmitter device, the first receiver device being the intended receiver of a first traffic signal to be transmitted by the first transmitter device. The same circuit, a different circuit, or a second section of the same or different circuit may be adapted to receive a second pilot signal from a second transmitter device, the second pilot signal indicating that the second transmitter device intends to transmit a second traffic signal that will interfere with the first traffic signal. The same circuit, a different circuit, or a third section of the same or different circuit may be adapted to determine a first transmission rate as a function of the received signal strength of the second pilot signal. The same circuit, a different circuit, or a fourth section of the same or different circuit may be adapted to determine a second transmission rate as a function of the received signal strengths of the first and second pilot signals. The same circuit, a different circuit, or a fifth section of the same or different circuit may be adapted to determine a third transmission rate as a function of the received signal strength of the first pilot signal. The same circuit, a different circuit, or a sixth section of the same or different circuit may be adapted to send a control message to the interfering first transmitter device, the control message including data rate information indicative of the first, second, and third transmission rates. The same circuit, a different circuit, or a seventh section of the same or different circuit may be adapted to receive a signal in a subsequent traffic channel, the received signal including the first traffic signal transmitted by the interfering first transmitter device and the second traffic signal transmitted by the second transmitter device. The same circuit, a different circuit, or a eight section of the same or different circuit may be adapted to decode the second traffic signal from the signal received in the subsequent traffic channel prior to decoding the first traffic signal from the received signal in the subsequent traffic channel. The same circuit, a different circuit, or a ninth section of the same or different circuit may be adapted to subtract the decoded second traffic signal from the received signal in the subsequent traffic channel to obtain the first traffic signal. The same circuit, a different circuit, or a tenth section of the same or different circuit may be adapted to decode the first traffic signal from the received signal in the subsequent traffic channel.

Active SIC may require a significant extra overhead in the control channels. Consequently, according to other examples, passive SIC may be implemented which demands a much smaller overhead. In passive SIC, a topology need not be created to enable SIC among terminals operating in an ad hoc, peer-to-peer network. Instead, the topology is passively monitored, and SIC is applied whenever possible. Specifically, under passive SIC, one may use the same connection scheduling algorithm as in the non-SIC case. However, in the rate scheduling stage, a receiver terminal identifies all the possible interferer terminals of its desired traffic transmissions. Then, the receiver terminal decides which subset of interferer terminals to use and decides the rate for its own transmission and/or the interferer's transmission(s). For example, the receiver terminal may determine a transmission rate at which it can receive desired traffic transmissions, assuming that the transmissions from the subset of interferer terminals can be cancelled out.

For ease of explanation, the case where each receiver terminal only tries to decode and cancel the signal from its strongest interferer terminals is considered. There are multiple choices to enable this, and a few exemplary options are provided below.

Passive Successive Interference Cancellation—Rate Capping

According to a first option for passive SIC in an ad hoc peer-to-peer network where a frequency spectrum is shared by a plurality of terminals in a region, rate cap control of the interferer terminal is implemented. A receiver terminal may give more priority to SIC and lets the receiver notify the dominant interferer a rate cap. This can be done in a similar way as described in the active SIC part.

Figure 14A:
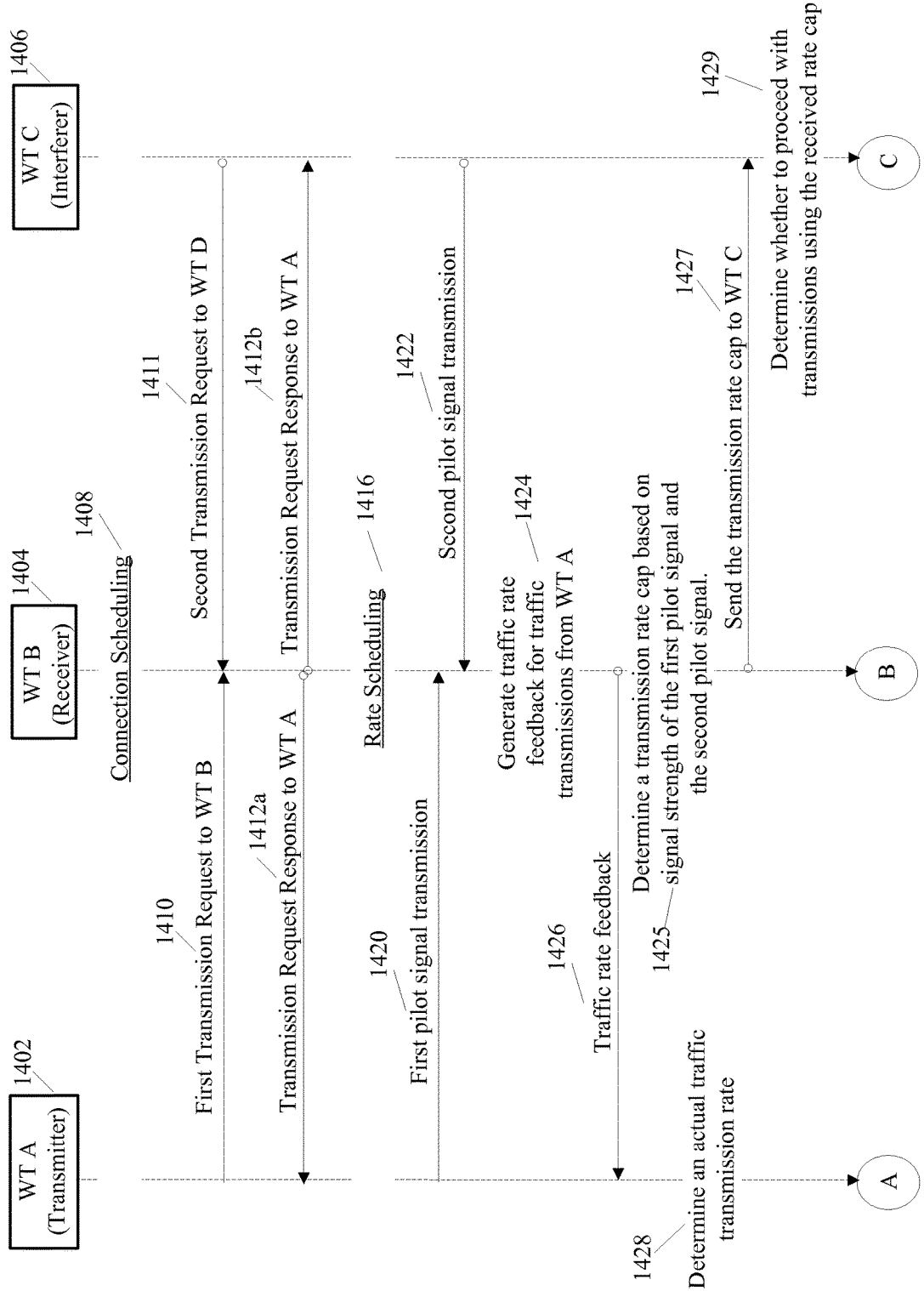
FIG. 14 (comprising FIGS. 14A and 14B) is a flow diagram illustrating one example of rate cap control of the interferer terminal.
Figure 14B:
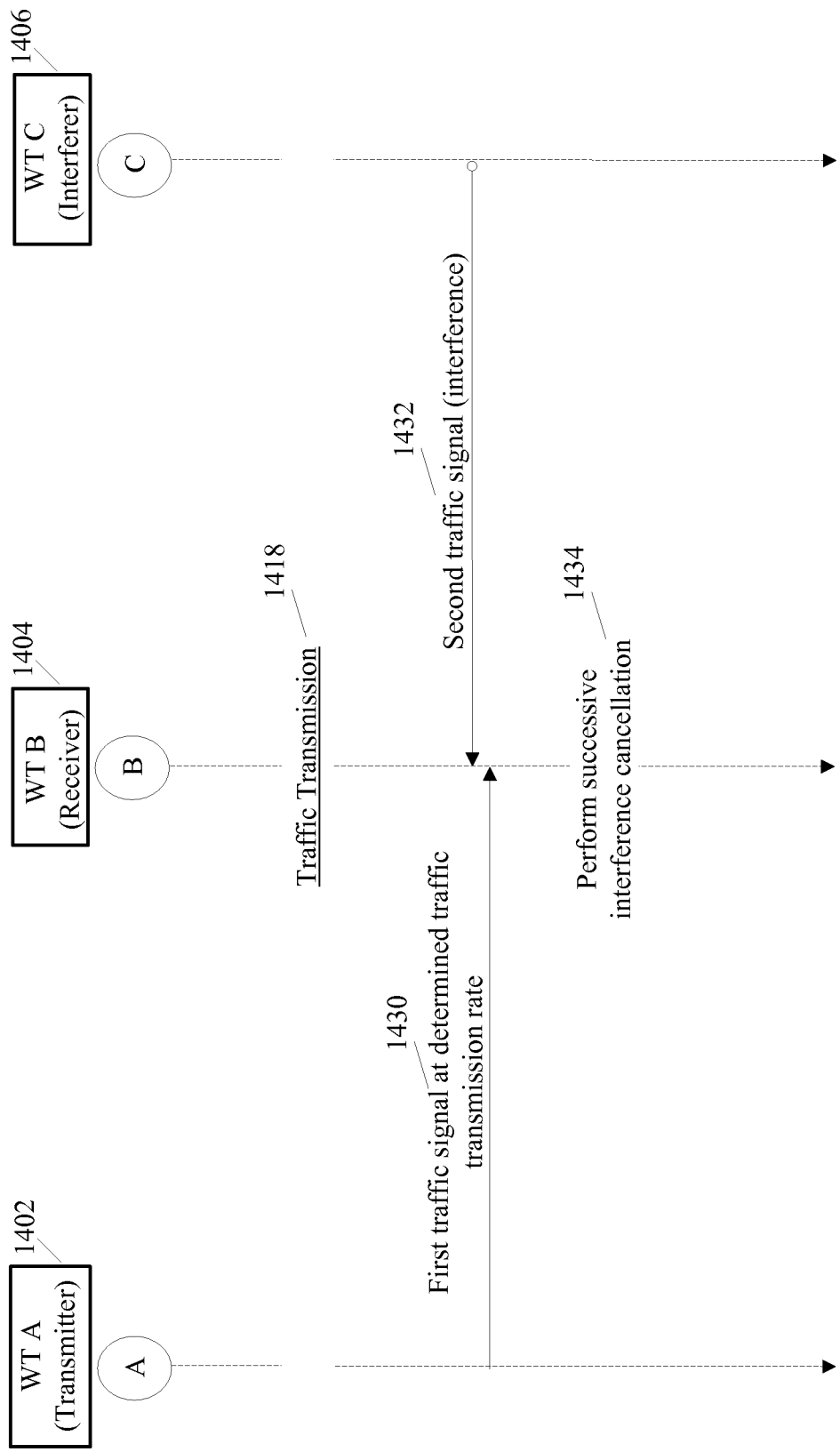

FIG. 14 (comprising FIGS. 14A and 14B) is a flow diagram illustrating one example of rate cap control of the interferer terminal. Similar to the baseline protocol illustrated in FIG. 4, during a connection scheduling stage 1408, a first wireless terminal WT A 1402 transmits a first transmission request 1410, which is received by the second wireless terminal WT B 1404. The second wireless terminal WT B 1404 then transmits a transmission request response 1412*a*, which is received by the first wireless terminal WT A 1402 so that the first wireless terminal WT A 1402 knows that the second wireless terminal WT B 1404 is ready to receive traffic transmission from the first terminal WT A 1402. Both the first and the second wireless terminals 1402 and 1404 may proceed to the second stage 1416 (rate scheduling).

Meanwhile, the transmission request response 1412*b* may also be received by the third terminal WT C 1406. This is because the terminals 1402, 1404, and 1406 may share a frequency space or communication channel.

In one implementation, a transmission priority may be established whereby lower priority terminals cede transmissions to higher priority terminals. In this example, the third terminal WT C 1406 may have a lower priority than the first terminal WT A 1402. Rather than dropping out or terminating transmissions altogether, the third terminal WT C 1406 may instead decide to adjust its traffic transmission rate so that it does not exceed the received transmission rate cap Rc. Thus, the third terminal WT C 1406 can continue to transmit without causing undue interference to the second terminal WT B 1404. For the sake of description, it is assumed that the traffic transmissions from the third terminal WT C 1406 have a lower scheduling priority than traffic transmissions from the first terminal WT A 1402. Consequently, the third terminal WT C 1406 may follow the rate cap Rc set by the second terminal WT B 1404.

Subsequently, the rate scheduling stage 1416 and traffic transmission stage 1418 may be performed similar to that of FIG. 5. For example, the rate scheduling stage 1416, a first and second pilot signal transmissions 1420 and 1422 from the first terminal WT A 1402 and the third terminal WT C 1406 may be received by the second terminal WT B 1404. The second terminal 1404 may then generate a rate feedback for traffic transmissions 1424 from the first device WT A 1402 based on the signal strengths of the first and second pilot signals 1420 and 1422. In one embodiment, in which the second terminal WT B 1404 expects that the interfering traffic signal from the third device WT C 1406 can be decoded and canceled out by using SIC, the rate feedback 1424 for traffic transmissions from the first device WT A 1402 may be based on the signal strength of the first pilot signal 1420 but not on the signal strength of the second pilot signal 1422. The traffic rate feedback is sent 1426 to the first terminal WT A. The first terminal 1402 may then use the traffic rate feedback 1426 to determine an actual traffic transmission rate 1428.

According to one aspect, the second terminal WT B 1404 may also send 1427 a transmission rate cap Rc 1425 to the third terminal 1406. The second terminal WT B 1404 may determine a transmission rate cap Rc 1425 based on the signal strength of the first pilot signal 1420 from the first device 1402 and the second pilot signal 1422 from the third terminal WT C 1406. The second terminal WT B 1404 then sends 1427 the transmission rate cap Rc 1425 to the third terminal WT C 1406. The transmission rate cap Rc may be a transmission rate at which a traffic transmission from the third terminal WT C 1406 is decodable by the second terminal WT B 1404 SO that it does not interfere with a concurrent or overlapping traffic transmission from the first terminal WT A 1402 to the second terminal WT B 1404. By restricting the transmission rate of the third terminal WT C 1406, the second terminal WT B 1404 can receive traffic transmissions from the first terminal WT A 1402 while allowing the third terminal WT C 1406 to concurrently transmit on a shared spectrum or channel. The third terminal WT C 1406 may then determine whether to proceed with transmissions using the received transmission rate cap Rc 1429. For instance, if the transmission rate cap Rc is too low to maintain a desired quality of service, the third terminal WT C 1406 may simply choose to wait and transmit later or change its transmission channel so it does not interfere with the second terminal WT B 1404.

During the traffic transmission stage 1418, the first terminal 1402 may send a first traffic signal at the determined traffic transmission rate 1430. The second terminal 1404 may receive the first traffic signal from the first terminal 1402 and a second traffic signal 1432 from the third terminal WT C 1406 as a combined traffic signal. The second terminal 1404 may then perform successive interference cancellation 1434 on the combined traffic signal. That is, the second terminal 1404 may decode and subtract the second traffic signal from the combined traffic signal and then decodes the first traffic signal from the remaining portion of the combined traffic signal.

Figure 15:
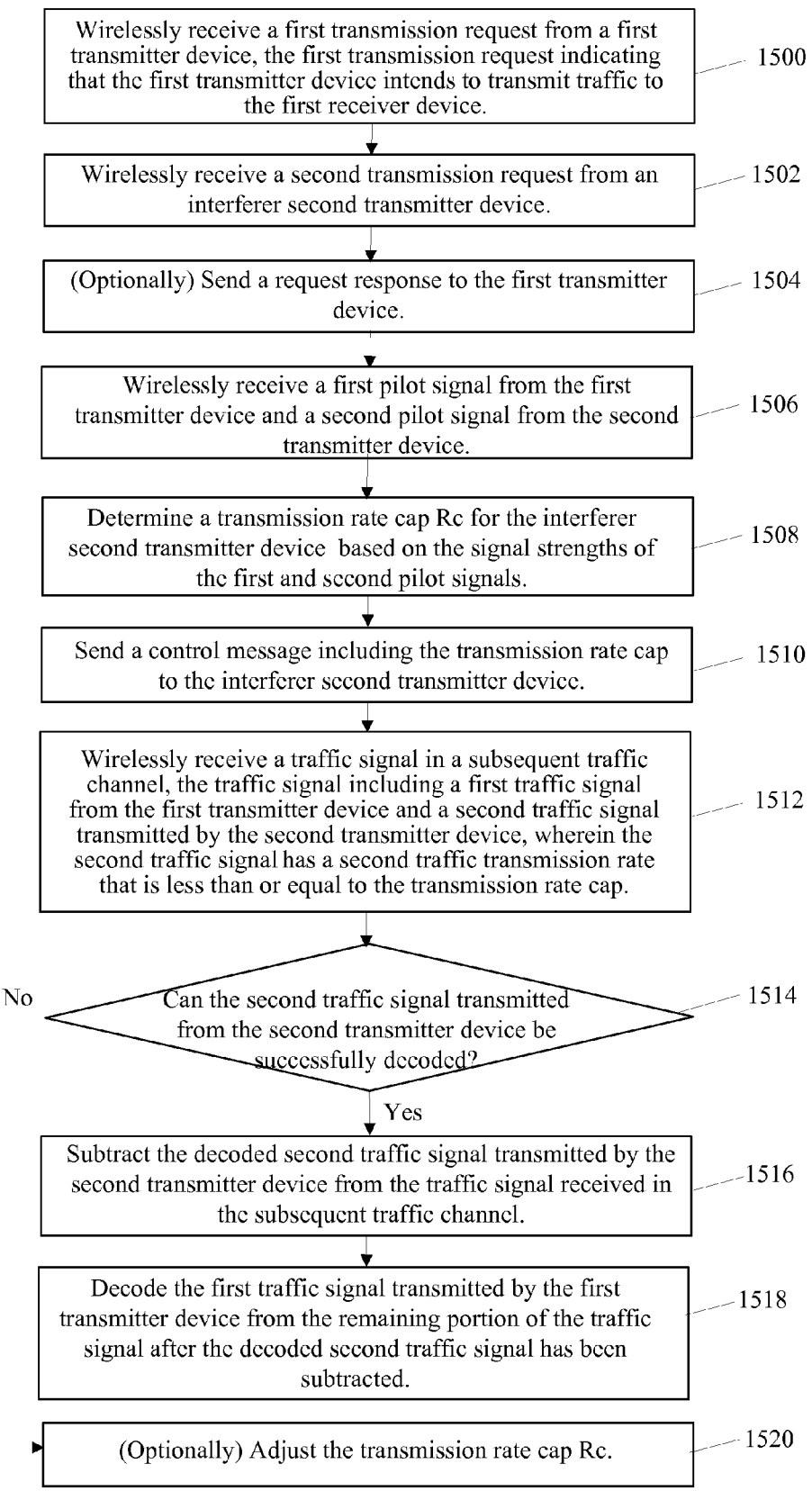
FIG. 15 illustrates an example of a method operational on a wireless first receiver device that performs passive successive interference cancellation within a peer-to-peer network.

FIG. 15 illustrates an example of a method operational on a wireless first receiver device that performs passive successive interference cancellation within a peer-to-peer network. In this example, the "second device" (e.g., WT B 304 in FIG. 3) us referred to as the first receiver device, the "first device" (e.g., WT A 302 in FIG. 3) is referred to as the intended first transmitter device, and the "third device" (e.g., WT C 306 in FIG. 3) is referred to as the interfering second transmitter terminal. In this example, traffic transmissions from the interfering second transmitter device (third device WT-C) to a second receiver device (fourth device WT-D) may have a lower communication priority (over a shared frequency spectrum) than traffic transmissions from the first transmitter device (first device WT-A) to the first receiver device (second device WT-B).

A first transmission request is wirelessly received from the first transmitter device (first device WT-A), wherein the first transmission request may indicate that the first transmitter device (first device WT-A) intends to transmit traffic to the first receiver device (second device WT-B ) 1500. A second transmission request is wirelessly received from an interferer second transmitter device (third device WT-C) 1502. The second transmission request may be intended for a second receiver device (i.e., not the first receiver device WT-B). The first receiver device (second device WT-B) may (optionally) send a request response to the first transmitter device (first device WT-A) 1504. A first pilot signal may be wirelessly received from the first transmitter device (first device WT-A) and a second pilot signal may be wirelessly received from the second transmitter device (third device WT-C) 1506. A transmission rate cap Rc for the interferer second transmitter device (third device WT-C) is determined based on the signal strengths of the first and second pilot signals 1508. The transmission rate cap Rc may be a maximum rate at which the first receiver device (second device WT-B) can reliably decode traffic signals from the second transmitter device (third device WT-C). A control message including the transmission rate cap Rc is sent to the interferer second transmitter device (third device WT-C) 1510. The transmission rate cap Rc may be sent during a connection scheduling stage. The second transmission request may be sent from the second transmitter device (third device WT-C) to the second receiver device (fourth device WT-D), the second receiver device (fourth device WT-D) being the intended receiver of the second transmitter device (third device WT-D).

In one example, a traffic transmission rate for traffic transmissions from the first transmitter device (first device WT-A) may also be obtained as illustrated in the rate scheduling stage 1416 in FIG. 14. That is, the first receiver device (second device WT-B) may provide a traffic rate feedback to the first transmitter device (first device WT-A), which the first transmitter device (first device WT-A) can use to determine its actual traffic transmission rate.

A traffic signal $S_{TRAFFIC-RX}$ may be wirelessly received by the first receiver device (second device WT-B) in a subsequent traffic channel, the traffic signal including a first traffic signal $S_1$ from the first transmitter device (first device WT-A) and a second traffic signal transmitted by the second transmitter device (third device WT-C), wherein the second traffic signal $S_2$ has a second traffic transmission rate that is less than or equal to the transmission rate cap Rc 1512. The first and second traffic signals $S_1$ and $S_2$ may be received in overlapping time intervals, and the first and second traffic signals $S_1$ and $S_2$ may be transmitted in the same frequency spectrum. The first receiver device (second device WT-B) may attempt to determine whether the second traffic signal $S_2$ transmitted from the second transmitter device (third device WT-C) can be decoded 1514. If decoding of the second traffic signal $S_2$ is successful, the decoded second traffic signal $S_2$ is subtracted from the traffic signal $S_{TRAFFIC-RX}$ received in the subsequent traffic channel 1516. The first traffic signal $S_1$ may then be decoded from the remaining portion of the received traffic signal $S_{TRAFFIC-RX}$ after the decoded second traffic signal $S_2$ has been subtracted 1518. That is, if the second traffic signal $S_2$ can be identified by the first receiver device (second device WT-B) from among other concurrent and/or overlapping signals, the first receiver device (second device WT-B) can subtract or remove the second traffic signal $S_2$ to extract its desired first traffic signal $S_1$. Otherwise, if the second traffic signal $S_2$ cannot be decoded by the first receiver device (second device WT-B), it may (optionally) adjust the transmission rate cap Rc 1520.

Figure 16:
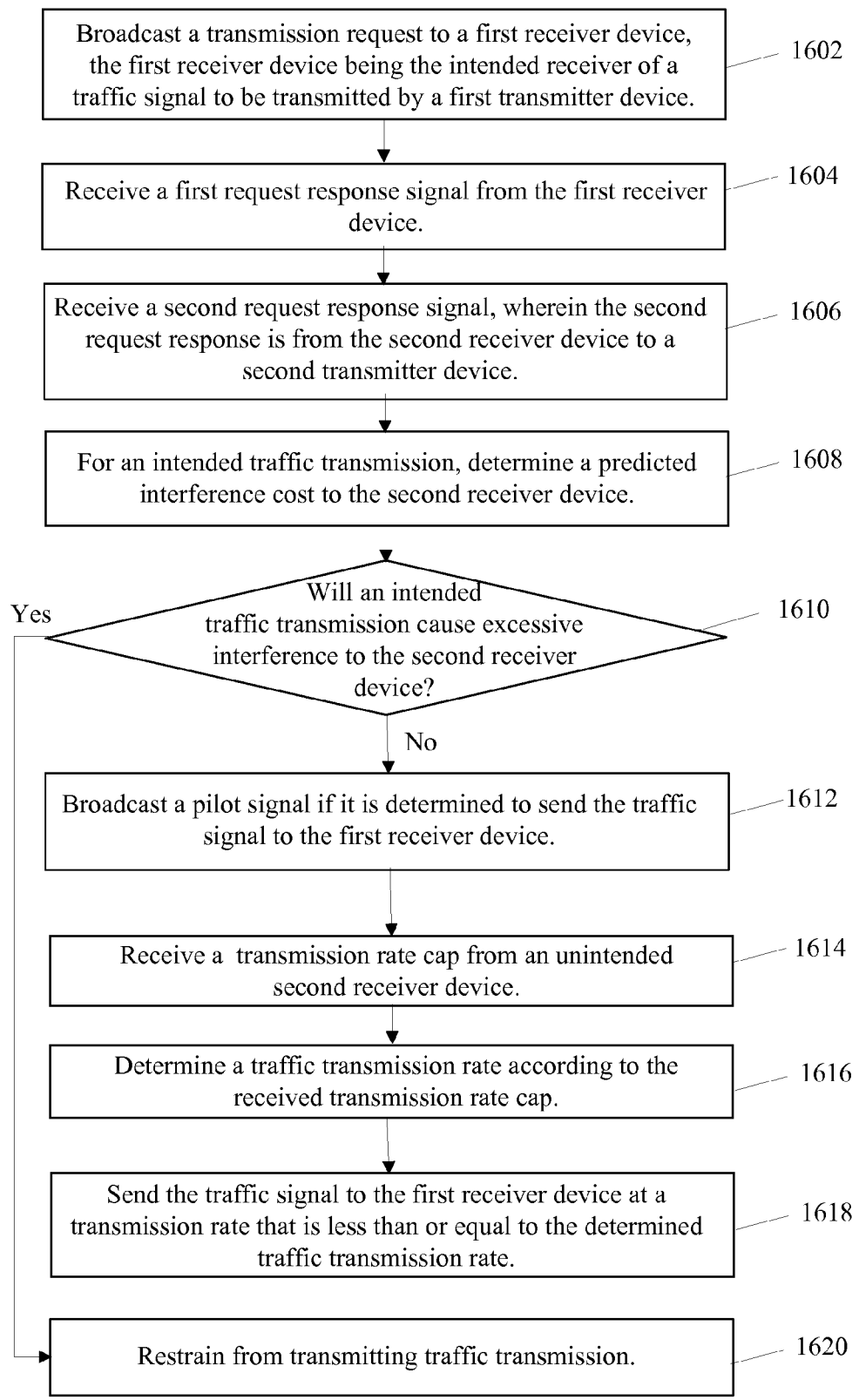
FIG. 16 illustrates an example of a method operational on an interfering wireless transmitter terminal that facilitates successive interference cancellation within a peer-to-peer network.

FIG. 16 illustrates an example of a method operational on an interfering wireless transmitter terminal that facilitates successive interference cancellation within a peer-to-peer network. That is, the method may allow the interfering transmitter terminal to facilitate successive interference cancellation (SIC) by an unintended receiver terminal in a peer-to-peer network. In this example, "third device" (e.g., WT C 306 in FIG. 3) is referred to as the interfering first transmitter device while the "fourth device" (e.g., WT D 308 in FIG. 3) is referred to as the intended first receiver device. The "first device" (e.g., WT A 302 in FIG. 3) may be referred to as a second transmitter device while the "second device" (e.g., WT B 304 in FIG. 3) may be referred to as a second receiver device. In this example, traffic transmissions from the interfering first transmitter device (third device WT-C) to the first receiver device (fourth device WT-D) may have a lower communication priority (over a shared frequency spectrum) than traffic transmissions from the second transmitter device (first device WT-A) to the second receiver device (second device WT-B).

The first transmitter device (third device WT-C) may broadcast a transmission request to a first receiver device (fourth device WT-D), the first receiver device (fourth device WT-D) being the intended receiver of a traffic signal to be transmitted by the first transmitter device (third device WT-C) 1602. Prior to sending a traffic signal to the intended first receiver device (fourth device WT-D), the first transmitter device (third device WT-C) may receive a first request response signal from the first receiver device (fourth device WT-D) which indicates that the first receiver device (fourth device WT-D) is ready to receive traffic from the first transmitter device (third device WT-C) 1604. Likewise, a second request response signal may be received by the first transmitter device (third device WT-C), wherein the second request response signal may be sent by the second receiver device (second device WT-B) to a second transmitter device (first device WT-A) indicating that the second receiver device (second device WT-B) is ready to receive traffic from the second transmitter device (first device WT-A) 1606.

The first transmitter device (third device WT-C) may then determine whether to send or broadcast the traffic signal to the first receiver device (fourth device WT-D). In one example, the first transmitter device (third device WT-C) may determine whether its intended traffic transmission will cause excessive interference to the second receiver device (second device WT-B), which will be receiving a traffic transmission from the second transmitter device (first device WT-A), by calculating a predicted interference cost to the second receiver device (second device WT-B) 1608. The predicted interference cost may be calculated as a function of the received power of the second request response signal as well as the intended transmission power the first transmitter device (third device WT-C) intends to use for its traffic transmission. For instance, the transmitter device (third device WT-C) may determine whether its intended traffic transmission will cause excessive interference to the second receiver device (second device WT-B) which will be receiving a traffic transmission from the second transmitter device (first device WT-A).

The first transmitter device (third device WT-C) may then determine whether the intended traffic transmission will cause excessive interference to the second receiver device (second device WT-B) 1610. The decision of whether the first transmitter device (third device WT-C) proceeds to transmit the traffic signal may be made by comparing the predicted interference cost with some threshold. If the predicted interference cost exceeds the threshold, the first transmitter device (third device WT-C) may decide to drop out and restrain from transmitting its traffic 1620. The value of the threshold may depend on whether the first transmitter device (third device WT-C) expects the second receiver device (second device WT-B) can successfully decode and cancel out the traffic signal from the first transmitter device (third device WT-C). For example, if the first transmitter device (third device WT-C) is aware that the second receiver device (second device WT-B) is capable of SIC, e.g., from a prior control message from the second receiver device (second device WT-B), then the value of the threshold is higher so that the second receiver device (second device WT-B) is expected to tolerate more interference from the first transmitter device (third device WT-C). In one embodiment, the first transmitter device (third device WT-C) may expect that the entire amount of its traffic signal can be canceled out at the second receiver device (second device WT-B) so that the value of the threshold is in effect infinite (e.g., the first transmitter device decides to transmit its traffic irrespective of the predicted interference cost to the second receiver device).

If the first transmitter device (third device WT-C) determines to send its intended traffic transmission to the first receiver device (second device WT-B), the first transmitter device (third device WT-C) may broadcast a pilot signal to the first receiver device (fourth device WT-D) 1612.

A transmission rate cap Rc may then be received from the unintended second receiver device (second device WT-B) 1614. A traffic transmission rate $R_{TRAFFIC\text{-}TX}$ is then determined by the first transmitter device (third device WT-C) according to the received transmission rate cap Rc 1616. The traffic transmission rate $R_{TRAFFIC\text{-}TX}$ may be a maximum rate at which the first transmitter device (third device WT-C) can transmit for reliable decoding by both the intended first receiver device (fourth device WT-D) and the unintended second receiver device (second device WT-B). The traffic transmission rate may be less than or equal to the transmission rate cap Rc received from the second receiver device (second device WT-B). The traffic signal is then sent to the first receiver device (fourth device WT-D) at the transmission rate $R_{TRAFFIC\text{-}TX}$ that is less than or equal to the determined traffic transmission rate 1618.

According to an optional feature, the first transmitter device (third device WT-C) may determine whether the second receiver device (second device WT-B) is capable of performing successive interference cancellation prior to broadcasting the transmission request to the first receiver device (fourth device WT-D).

Figure 17:
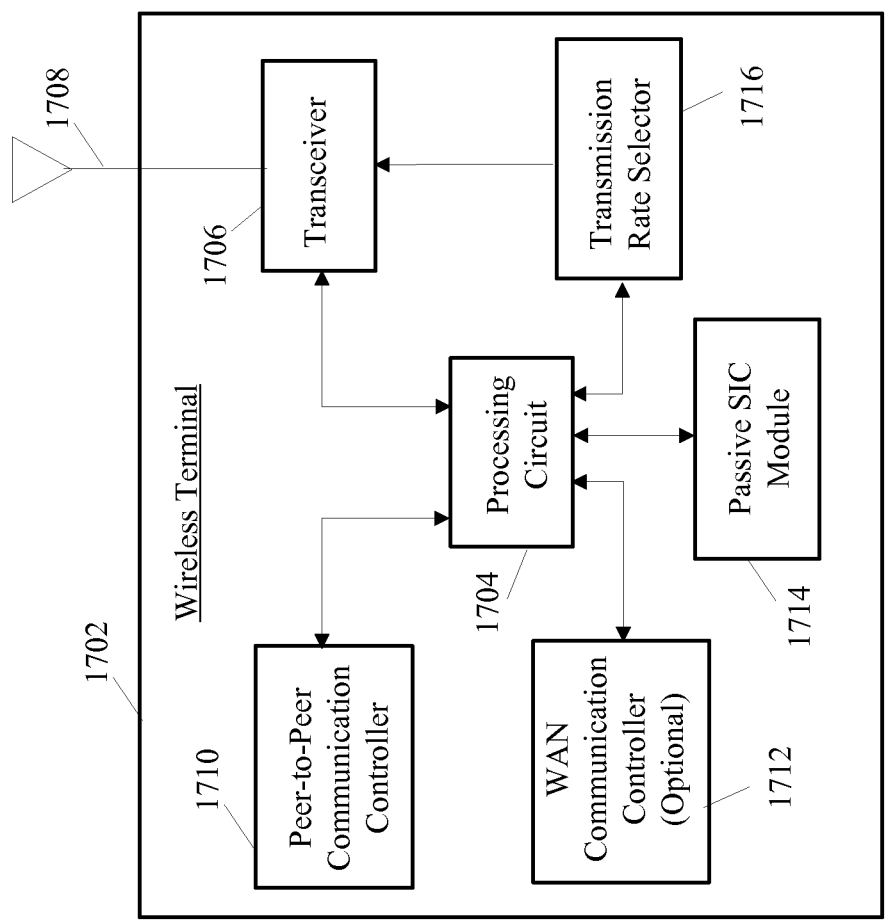
FIG. 17 is a block diagram illustrating a wireless terminal that is configured to perform or facilitate passive successive interference cancellation (SIC) within a peer-to-peer wireless network.

FIG. 17 is a block diagram illustrating a wireless terminal that is configured to perform or facilitate passive successive interference cancellation (SIC) within a peer-to-peer wireless network. The wireless terminal 1702 may include a processing circuit 1704 (e.g., one or more processors, electrical components, and/or circuit modules) coupled to a transceiver 1706 (e.g., transmitter and/or receiver modules) which is coupled to an antenna 1708 through which peer-to-peer communications can take place. The processing circuit 1704 may also be coupled to a peer-to-peer communication controller 1710 that may facilitate peer-to-peer communications and (optionally) a wide area network (WAN) communication controller 1712 that may facilitate communications over a WAN. The wireless terminal 1702 may also include a passive successive interference cancellation module 1714 coupled to the processing circuit 1704 and a transmission rate selector 1716.

In one example, the wireless terminal 1702 may operate as an first receiver device (fourth device WT-D) that is configured to perform passive SIC so as to subtract an interfering signal from a received signal to obtain a desired signal from another device with which it has a peer-to-peer communication connection. In this configuration, the wireless terminal may be a first receiver device (second device WT-B) and may be configured to perform the operations described in FIG. 15. For instance, the processing circuit 1704 and/or transceiver 1706 may operate to (a) wirelessly receive a first transmission request from a first transmitter device (first device WT-A), the first transmission request indicating that the first transmitter device (first device WT-A) intends to transmit traffic to the first receiver device (second device WT-B); and (b) wirelessly receive a second transmission request from an interferer second transmitter device (third device WT-C). The processing circuit 1704, transmission rate selector 1716, and/or peer-to-peer communication controller 1710 may determine a transmission rate cap for the interferer second transmitter device (third device WT-C) based on the signal strengths of the first and second transmission requests. The processing circuit 1704, peer-to-peer communication controller 1710, and/or transceiver 1706 may then send a control message including the transmission rate cap to the interferer second transmitter device (third device WT-C). Subsequently, the processing circuit 1704, peer-to-peer communication controller 1710, and/or transceiver 1706 may wirelessly receive a traffic signal in a subsequent traffic channel, the traffic signal including a first traffic signal from the first transmitter device (first device WT-A) and a second traffic signal transmitted by the second transmitter device (third device WT-C), wherein the second traffic signal has a traffic transmission rate that is less than or equal to the transmission rate cap. The processing circuit 1704, peer-to-peer communication controller 1710, and/or passive SIC module 1714 may then obtain the first traffic signal by decoding and subtracting the second traffic signal from the received traffic signal.

Consequently, a circuit in a mobile wireless terminal or first receiver device may be adapted to wirelessly receive a first transmission request from a first transmitter device (first device WT-A), the first transmission request indicating that the first transmitter device (first device WT-A) intends to transmit traffic to the first receiver device (second device WT-B). The same circuit, a different circuit, or a second section of the same or different circuit may be adapted to wirelessly receive a second transmission request from an interferer second transmitter device (third device WT-C). The same circuit, a different circuit, or a third section of the same or different circuit may be adapted to determine a transmission rate cap for the interferer second transmitter device (third device WT-C) based on the signal strengths of the first and second transmission requests. The same circuit, a different circuit, or a fourth section of the same or different circuit may be adapted to send a control message including the transmission rate cap to the interferer second transmitter device (third device WT-C). The same circuit, a different circuit, or a fifth section of the same or different circuit may be adapted to wirelessly receive a traffic signal in a subsequent traffic channel, the traffic signal including a first traffic signal from the first transmitter device (first device WT-A) and a second traffic signal transmitted by the second transmitter device (third device WT-C), wherein the second traffic signal has a traffic transmission rate that is less than or equal to the transmission rate cap. The same circuit, a different circuit, or a sixth section of the same or different circuit may be adapted to obtain the first traffic signal by decoding and subtracting the second traffic signal from the received traffic signal.

In another example, the wireless terminal 1702 may operate as an interfering first transmitter device (third device WT-C) that is configured to facilitate passive SIC by a second receiver device (second device WT-B) with which it shares a frequency spectrum within a peer-to-peer network. In this configuration, the wireless terminal (first transmitter device) may be configured to perform the operations described in FIG. 16. For instance, the transceiver 1706, processing circuit 1704, and/or peer-to-peer communication controller 1710 may broadcast a transmission request to a first receiver device (fourth device WT-D), the a first receiver device (fourth device WT-D) being the intended receiver of a traffic signal to be transmitted by the first transmitter device (third device WT-C). In response, the transceiver 1706, processing circuit 1704, and/or peer-to-peer communication controller 1710 may receive a transmission rate cap from an unintended second receiver device (second device WT-B). The processing circuit 1704 and/or transmission rate selector 1716 may then determine a traffic transmission rate according to the received transmission rate cap. The processing circuit 1704, transceiver 1706 and/or peer-to-peer communication controller 1710 may then wirelessly send the traffic signal to the first receiver device (fourth device WT-D) at a transmission rate that is less than or equal to the determined traffic transmission rate.

Consequently, a circuit in a mobile wireless terminal or first transmitter device (third device WT-C) may be adapted to broadcast a transmission request to a first receiver device (WT-D), first receiver device (WT-D) being the intended receiver of a traffic signal to be transmitted by the first transmitter device (third device WT-C). The same circuit, a different circuit, or a second section of the same or different circuit may be adapted to receive a transmission rate cap from the unintended second receiver device (second device WT-B). The same circuit, a different circuit, or a third section of the same or different circuit may be adapted to determine a traffic transmission rate according to the received transmission rate cap. The same circuit, a different circuit, or a fourth section of the same or different circuit may be adapted to wirelessly send the traffic signal to the first receiver device (fourth device WT-D) at a transmission rate that is less than or equal to the determined traffic transmission rate.

Passive Successive Interference Cancellation—Two Rate Feedback

Figure 18A:
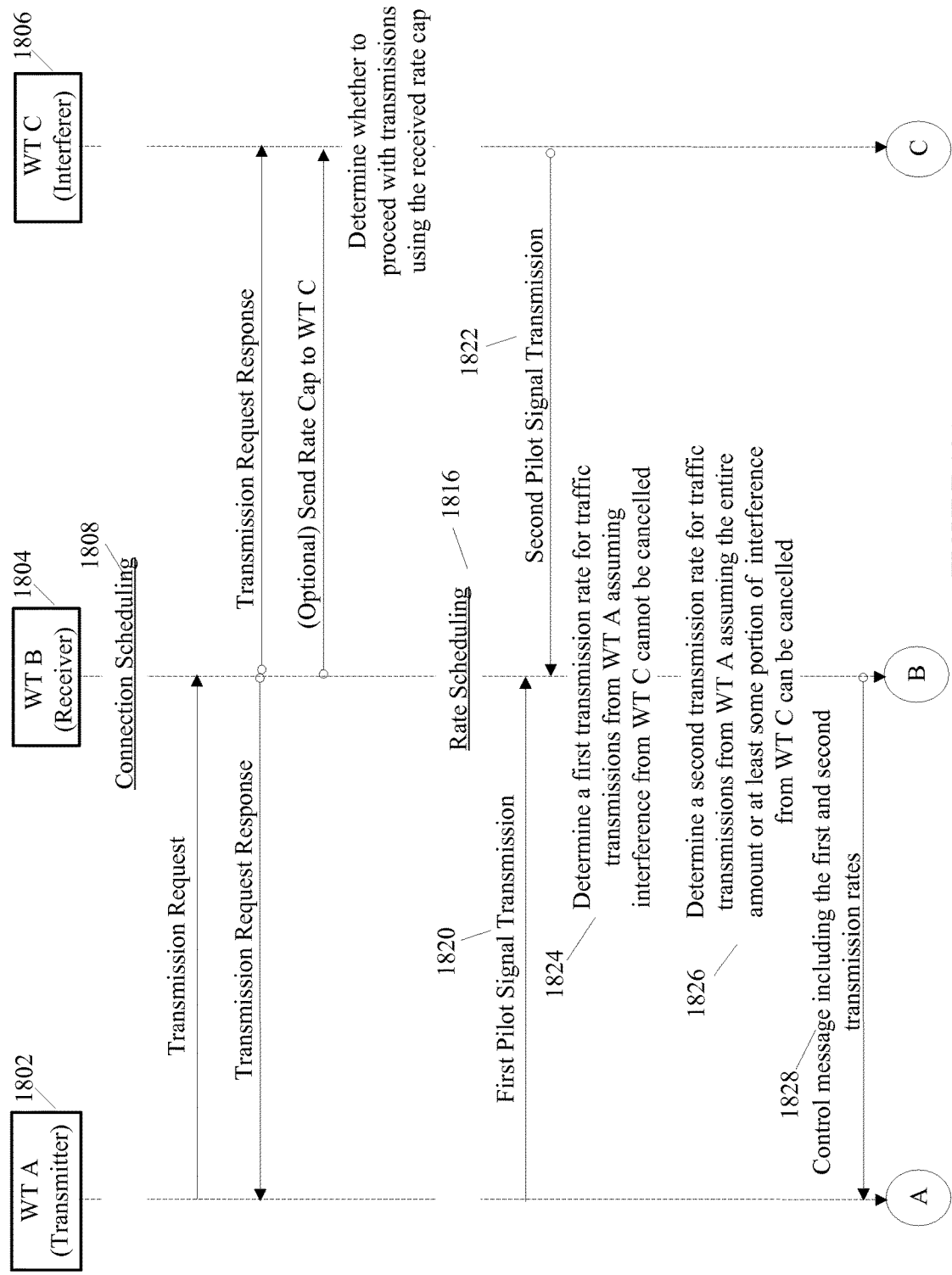
FIG. 18 (comprising FIGS. 18A, 18B and 18C) is a flow diagram illustrating yet another example of interference management in an ad hoc peer to peer network where terminals share a frequency spectrum.
Figure 18B:
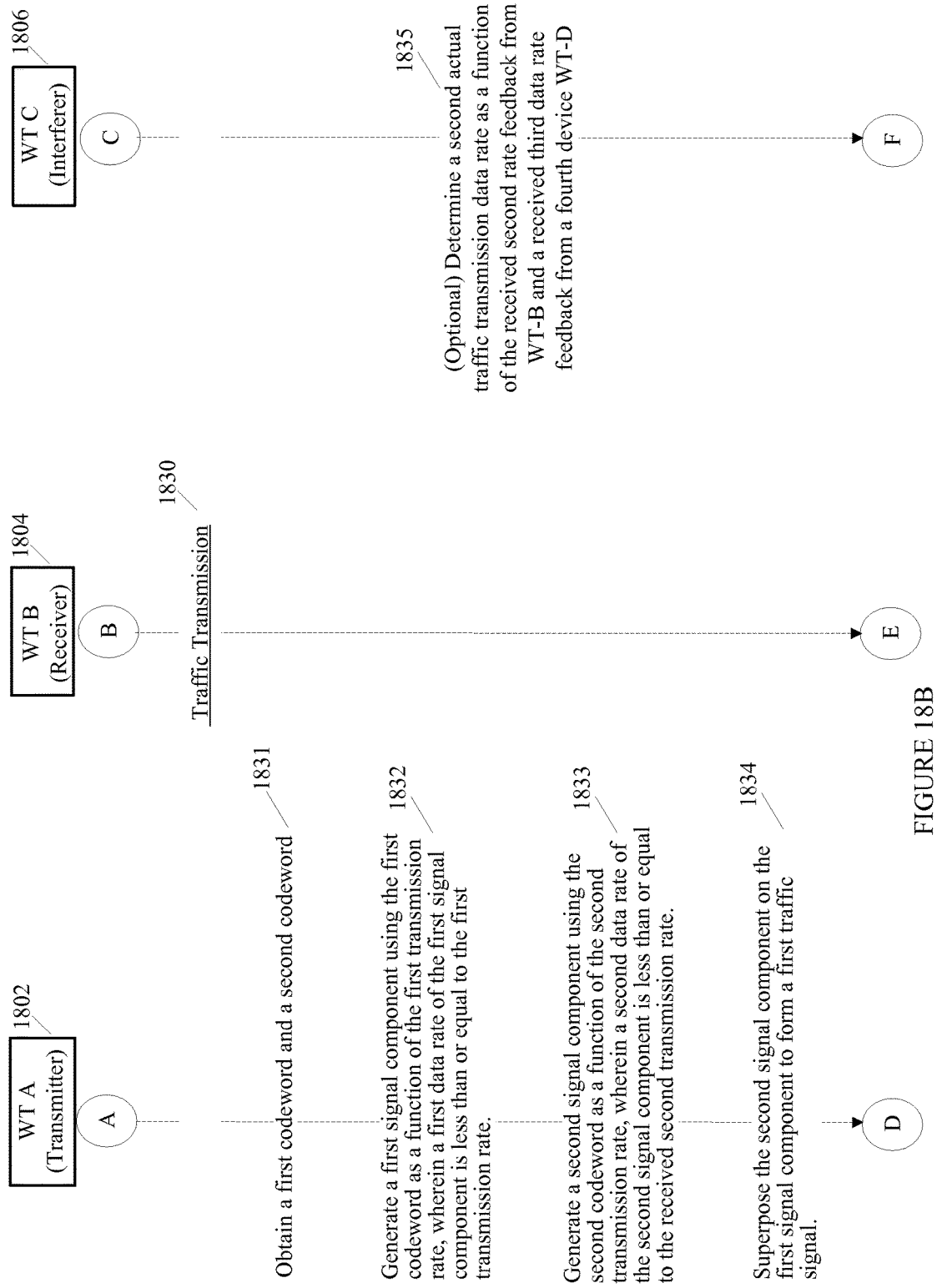
Figure 18C:
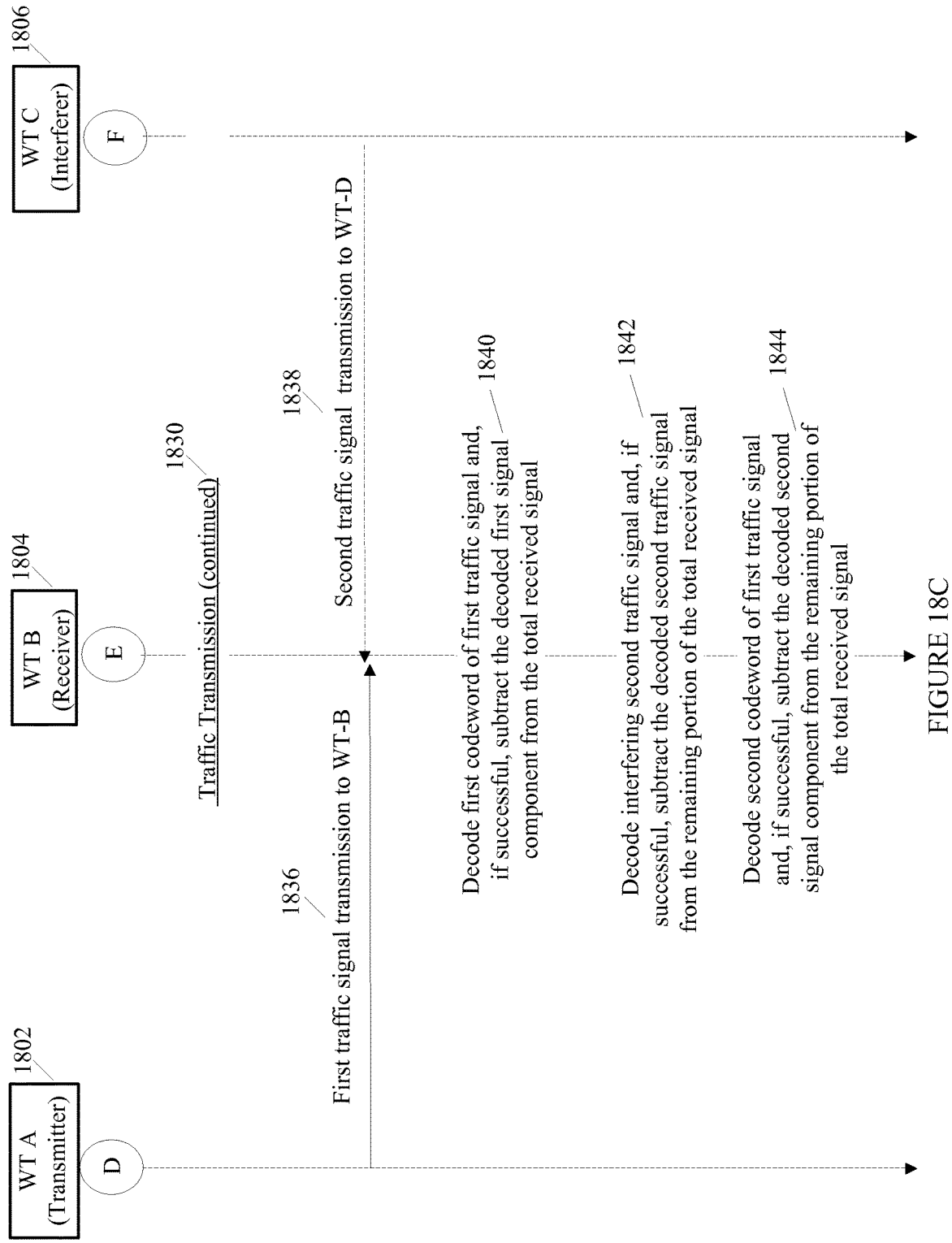

FIG. 18 (comprising FIGS. 18A, 18B and 18C) is a flow diagram illustrating yet another example of interference management in an ad hoc peer to peer network where terminals share a frequency spectrum. In this implementation, the receiver terminal WT B 1804 reports two transmission rates back to the transmitter terminal WT A 1802, a first rate accounting for interference and a second rate without accounting interference from a third terminal WT C 1806. The transmitter terminal WT A 1802 may then prepare two codewords which can be decodable with or without the dominant interferer and sends a superimposed version of the two codewords to the second terminal WT B 1804. In this option, the receiver terminal WT B 1804 does not have to control the transmission rates from the interferer third terminal WT C 1806.

During a connection scheduling stage 1808, a similar protocol may be performed as connection scheduling stage 1408 (FIG. 14) where a rate cap may be provided to the interferer third terminal WT C 1806.

During a rate scheduling stage 1816, the first terminal WT A 1802 transmits a first pilot signal $P_1$ 1820. The third terminal WT C 1806 also transmits a second pilot signal $P_2$ 1822. The second terminal WT B 1804 determines a first transmission rate $R_1$ it can support for traffic transmissions from the first device as a function of the received signal strength of the first pilot $P_1$ 1820 from the first terminal WT A 1802. In one example, the first transmission rate $R_1$ may assume that the interfering signal energy from the third terminal WT C 1806 cannot be cancelled out 1824. In addition, the second terminal WT B 1804 may determine a second transmission rate $R_2$ it can support of the traffic transmission from the first terminal WT A 1802 as a function of the received signal strength of the first pilot $P_1$ 1820 from the first terminal WT A 1802 and the second pilot P2 from the third terminal WTC 1806. In one example, the second transmission rate $R_2$ may assume that the entire amount or at least some portion of the interfering signal energy from the third terminal WT C 1806 can be cancelled out 1826. In addition, the second transmission rate $R_2$ may be obtained or selected assuming that the entire amount or at least some portion of a first traffic transmission $S_1$, from the first terminal WT A 1802 to the second terminal WT B 1804, at the transmission rate $R_1$, can be canceled out. However, the first transmission rate $R_1$ may assume that a second traffic transmission $S_2$, from the first terminal WT A 1802 to the second terminal WT B 1804, at the second transmission rate $R_2$ cannot be canceled out.

In one embodiment, the ratio of the transmission powers of the first and second traffic transmissions $S_1$ and $S_2$ is known by both the first terminal WT A 1802 and the second terminal WT B 1804. For example, the first terminal WT A 1802 may inform the second terminal WT B 1804 of this power ratio. The first terminal WT A 1802 may change the value of the power ratio and then inform the second terminal WT B 1804 of the change. When the first transmission rate $R_1$ is determined, the signal energy of the second traffic transmission $S_2$, as well as the signal energy of the interfering signal energy $S_{INT}$ from the third terminal WT C 1806, is treated as interference. When the second transmission rate $R_2$ is determined, the signal energy of the first traffic transmission, as well as the signal energy of the interfering signal energy from the third terminal WT C 1806, is excluded because they are expected to be canceled out in SIC. The second transmission rate $R_2$ may be greater than the first transmission rate $R_1$.

The second terminal WT B 1804 then sends both the first and second transmission rates $R_1$ and $R_2$ to the first terminal WT A 1802. During a traffic transmission stage 1830, the first terminal WT A 1802 may determine a first codeword and a second codeword 1831. The first and second codewords may act as markers that identify the first and second traffic transmissions or signal components $S_1$ and $S_2$ from WT A 1802 to WT B 1804.

A first signal component is generated using the first codeword as a function of the first transmission rate, wherein a first data rate of the first signal component is less than or equal to the first transmission rate 1832. That is, the first codeword may be encoded according to a first data rate that is less than or equal to the first transmission rate. Similarly, a second signal component is generated using the second codeword as a function of the second transmission rate, wherein a second data rate of the second signal component is less than or equal to the received second transmission rate 1833. That is, the second codeword may be encoded according to the second data rate that is less than or equal to the second transmission rate. Consequently, the first and second signal components may be encoded according to different data rates.

The second signal component may be superposed on the first signal component to form a first traffic signal 1834. For example, the two codewords can be transmitted in a superposition manner, i.e., the first codeword is sent using a large QPSK constellation, and the second codeword is sent using is sent using a small QAM constellation superposed on the large QPSK constellation. In one instance, the first wireless terminal WT A 1802 may include a first information data block and a second information data block to be transmitted to the second wireless terminal WT B 1804. The two data blocks may be different, representing different data to be transmitted to the second terminal WT B 1804. The first data block may be encoded to a first codeword and mapped to QPSK constellation, thereby outputting a block of QPSK symbols. The second data block may be encoded to a second codeword and mapped to QAM constellation, thereby outputting a block of QAM symbols. In one embodiment, the power per QPSK symbol may be greater than the power per QAM symbol, which is the reason it is referred to as a "large" QPSK constellation and "small" QAM constellation. The actual first traffic signal that the first wireless terminal WT A 1802 transmits to the second wireless terminal WT B 1804 may include a number of complex symbols, each of which may be the sum of one QPSK symbol from the block of QPSK symbols and one QAM symbol from the block of QAM symbols, which is the reason it is said the two signals are superposed with each other. That is, the overall first traffic signal can be viewed as a combination of two signal components, generated from the first and the second codewords respectively.

The first terminal WT A 1802 then transmits the first traffic signal 1836 to the second terminal WT B 1804. Similarly, the third terminal WT C 1806 may send a concurrent second traffic signal transmission 1838 to a fourth terminal WT-D. Due to the nature of wireless broadcasts, the second traffic signal transmission 1838 may also be received by the second terminal WT B 1804. According to an optional feature, the third terminal WT C 1806 may determine a second actual traffic transmission data rate as a function of a received second rate feedback from the second terminal WT-B 1804 and/or a received third data rate feedback from a fourth device WT-D.

Upon receiving a total received signal (e.g., combining one or more signal transmissions from one or more terminals or devices), the second terminal WT B 1804 may attempt to decode first codeword of first traffic signal and, if successful, subtracts the decoded first signal component from the total received signal 1840. After subtracting the first signal component, the second terminal WT B 1804 may decode the interfering second traffic signal and, if successful, subtracts the decoded second traffic signal from the remaining portion of the total received signal 1842. Lastly, the second codeword of first traffic signal may be decoded and, if successful, subtract the decoded second signal component from the remaining portion of the total received signal 1844.

Figure 19:
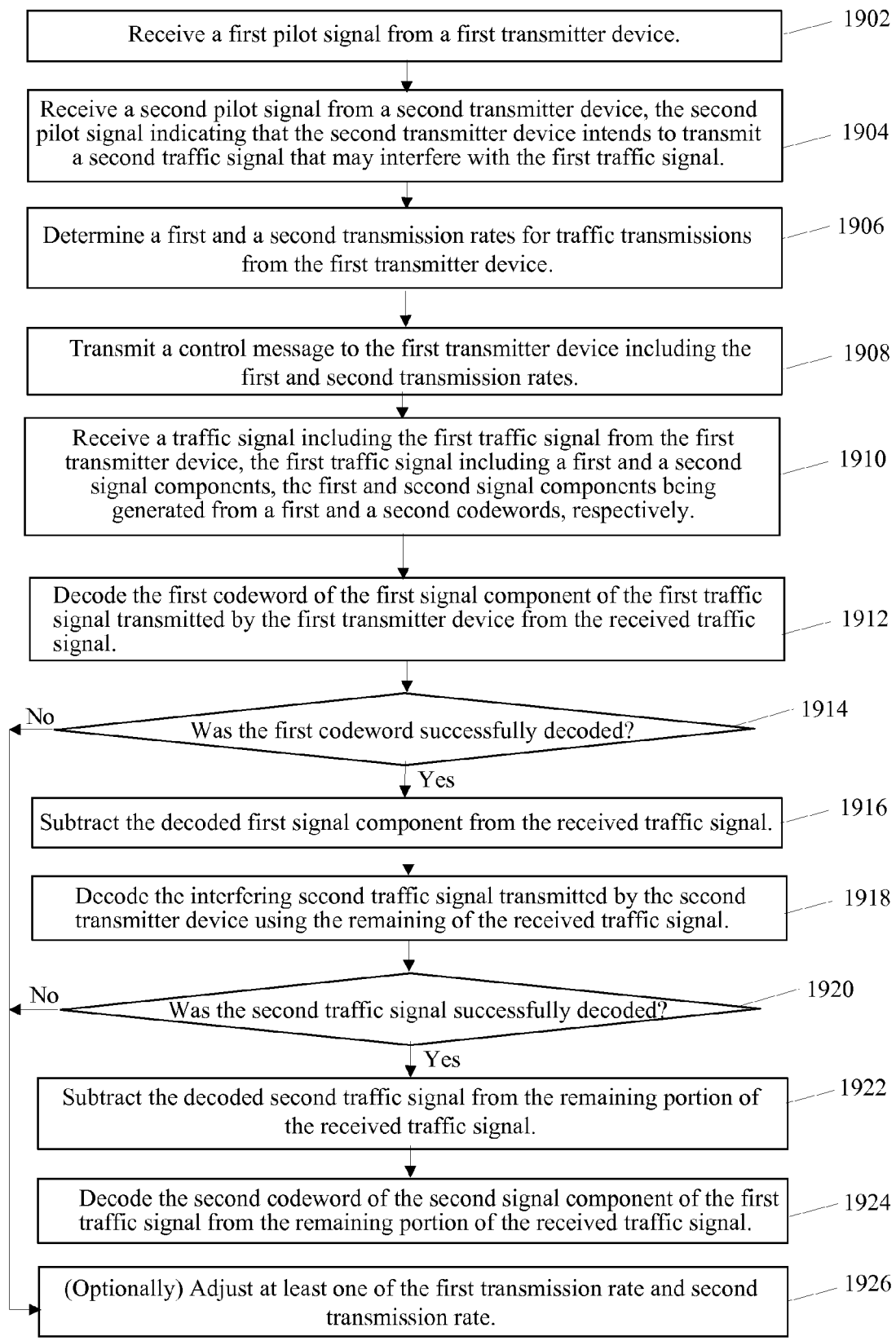
FIG. 19 illustrates an example of a method operational on a wireless receiver terminal that performs successive interference cancellation within a peer-to-peer network.

FIG. 19 illustrates an example of a method operational on a wireless receiver terminal that performs successive interference cancellation within a peer-to-peer network. In this example, the "second device" (e.g., WT B 304 in FIG. 3) is referred to as the first receiver terminal, the "first device" (e.g., WT A 302 in FIG. 3) is referred to as the first transmitter device, and the "third device" (e.g., WT C 306 in FIG. 3) is referred to as the interfering second transmitter terminal is referred to as. In this example, traffic transmissions from the first transmitter device (first device WT-A) to the first receiver device (second device WT-B) may have a higher communication priority (over a shared frequency spectrum) than traffic transmissions to the second receiver device (fourth device WT-D) from the interfering first transmitter device (third device WT-C).

The first receiver device (second device WT-B) may receive a first pilot signal $P_1$ from the first transmitter device (first device WT-A) 1902, wherein the first receiver device (second device WT-B) may be an intended receiver of a first traffic signal $S_1$ to be transmitted from the first transmitter device (first device WT-A). A second pilot signal P2 may be received from a second transmitter device (third device WT-C), wherein the second pilot signal P2 indicates that the second transmitter device (third device WT-C) intends to transmit a second traffic signal $S_2$ that will or may interfere with the first traffic signal 1904. Such second traffic signal $S_2$ may be transmitted within a shared frequency spectrum (e.g., same or overlapping time slot, channel, and/or frequency) such that it may interfere with the first traffic signal $S_1$. A first and a second transmission rates $R_1$ and $R_2$ may then be determined for traffic transmissions from the first transmitter device (first device WT-A) 1906. A control message may be transmitted to the first transmitter device (first device WT-A) including the first and second transmission rates $R_1$ and $R_2$ 1908. A traffic signal $S_{TRAFFIC-RX}$ may be received including the first traffic signal $S_1$ from the first transmitter device (first device WT-A), wherein the first traffic signal $S_1$ may include a first and a second signal components $C_1$ and $C_2$, the first and second signal components $C_1$ and $C_2$ being generated from a first and a second codewords $W_1$ and $W_2$, respectively 1910. In one example, a codeword is a block of encoded bits. The encoded bits are mapped into constellation, e.g., QPSK or QAM, to become a block of complex symbols. The complex symbols may be referred to as signal components. For example, if x(n) is the n-th symbol to be transmitted, x(n)=x1(n)+x2(n), where x1(n) and x2(n) are two signal components, which are generated from two codewords respectively. In one instance, the second signal component $C_2$ may be superposed on the first signal component $C_1$ to form the first traffic signal $S_1$. For example, the first signal component $C_1$ may use a quadrature phase-shift keying (QPSK) constellation and the second signal component $C_2$ may use a quadrature amplitude modulation (QAM) constellation (e.g., QAM-16, QAM-64, and QAM-256 constellations).

The method may further include decoding the first codeword $W_1$ of the first signal component $C_1$ of the first traffic signal $S_1$ transmitted by the first transmitter device (first device WT-A) from the received traffic signal $S_{TRAFFIC-RX}$ 1912. If the first codeword is successfully decoded 1914, the decoded first signal component $C_1$ is subtracted from the received traffic signal $C_1$ 1916. The interfering second signal $S_2$ transmitted by the second transmitter device (third device WT-C) is then decoded using the remaining portion of the received traffic signal $S_{TRAFFIC-RX}$ 1918. If the interfering second signal $S_2$ is successfully decoded 1920, the method may further include subtracting the decoded interfering second traffic signal $S_2$ from the remaining portion of the received traffic signal $S_{TRAFFIC-RX}$ 1922. The second codeword $W_2$ of the second signal component $C_2$ of the first traffic signal $S_1$ transmitted by the first transmitter device (first device WT-A) may then be decoded from the remaining portion of the received traffic signal $S_{TRAFFIC-RX}$ 1924 after both the decoded first signal component $C_1$ and the decoded interfering second signal $S_2$ have been subtracted.

If the decoding of the first codeword 1914 and/or the interfering second traffic signal 1920 fail, at least one of the first transmission rate and second transmission rate may be adjusted.

In some implementations, a first signal power $PWR_{P1}$ of the first pilot signal $P_1$ may be indicative of the signal power of the first traffic signal $S_1$ to be transmitted by the first transmitter device (first device WT-A). Similarly, a second signal power $PWR_{P2}$ of the second pilot signal $P_2$ may be indicative of the signal power of the interfering second traffic signal $S_2$ to be transmitted by the second transmitter device (third device WT-C). In one example, these signal powers may be the signal powers as received by the first receiver device (second device WT-B).

In some implementations, a ratio $RT_{C12}$ of a first transmission power $PWR_{C1-TX}$ of the first signal component $C_1$ and a second transmission power $PWR_{C2-TX}$ of the second signal component $C_2$ may be known to the first receiver device (second device WT-B). In one example, this transmission power ratio $RT_{C12}$ may be a fixed constant known to both the first transmitter device (first device WT-A) and the first receiver device (second device WT-B). For instance, the first receiver device (second device WT-B) may communicate with the first transmitter device (first device WT-A) to determine this transmission power ratio $RT_{C12}$ prior to receiving the first pilot signal $P_1$ from the first transmitter device (first device WT-A).

In one example, the first transmission rate $R_1$ may be determined as a function of the first and second signal powers of the first and the second pilot signals $P_1$ and $P_2$, respectively, and the transmission power ratio $RT_{C12}$. For instance, determining the first transmission rate $R_1$ for traffic transmissions from the first transmitter device (first device WT-A) may include: (a) predicting received signal powers $PWR_{C1-RX}$ and $PWR_{C2-RX}$ of the first and the second signal components $C_1$ and $C_2$ of the first traffic signal $S_1$ to be transmitted by the first transmitter device (first device WT-A) as a function of the first signal power $PWR_{P1}$ of the first pilot signal $P_1$ and the transmission power ratio $RT_{C12}$, (b) predicting a received signal power $PWR_{S2-RX}$ of the interfering second signal $S_2$ to be transmitted by the second transmitter device (third device WT-C) as a function of the second signal power $PWR_{P2}$ of the second pilot signal $P_2$; and/or (c) wherein the first transmission rate $R_1$ is determined as a function of the ratio $RT_{PREDICTED}$ of a predicted signal power $PWR_{S-PREDICTED}$ and a predicted noise power $PWR_{NOISE}$. The predicted signal power $PWR_{S-PREDICTED}$ may include the determined received signal power $PWR_{C1-RX}$ of the first signal component $C_1$ of the first traffic signal $S_1$ to be transmitted by the first transmitter device (first device WT-A) and the predicted noise power $PWR_{NOISE}$ including the determined received signal power $PWR_{C2-RX}$ of the second signal component $C_2$ of the first traffic signal $S_1$ to be transmitted by the first transmitter device (first device WT-A) and the determined received signal power $PWR_{S2-RX}$ of the interfering second traffic signal $S_2$ to be transmitted by the second transmitter device (third device WT-C).

Likewise, the second transmission rate $R_2$ may be determined as a function of the signal power $PWR_{P1}$ of the first pilot signal $P_1$ and the transmission power ratio $RT_{C12}$. For instance, determining the first transmission rate for traffic transmissions from the first transmitter device (first device WT-A) may include predicting the received signal power of the second signal component of the first traffic signal to be transmitted by the first transmitter device (first device WT-A) as a function of the signal power of the first pilot signal and the transmission power ratio $RT_{C12}$. The second transmission rate $R_2$ may be determined as a function of the ratio $RT_{PREDICTED}$ of the predicted signal power $PWR_{S-PREDICTED}$ and the predicted noise power $PWR_{NOISE}$. The predicted signal power $PWR_{S-PREDICTED}$ may include the determined received signal power $PWR_{C2-RX}$ of the second signal component $C_2$ of the first traffic signal $S_1$ to be transmitted by the first transmitter device (first device WT-A) and the predicted noise power $PWR_{NOISE}$ excluding the determined received signal power $PWR_{C1-RX}$ of the first signal component $C_1$ of the intended first traffic signal $S_1$ to be transmitted by the first transmitter device (first device WT-A) and the determined power $PWR_{S2-TX}$ of the interfering second traffic signal $S_2$ to be transmitted by the second transmitter device (third device WT-C). In one example, a first data rate $R_{Data-1}$ of the first signal component $C_1$ of the first traffic signal $S_1$ transmitted by the first transmitter device (first device WT-A) may be less than or equal to the determined first transmission rate $R_1$. Similarly, a second data rate $R_{Data-2}$ of the second signal component $C_2$ of the first traffic signal $S_1$ transmitted by the first transmitter device (first device WT-A) may less than or equal to the determined second transmission rate $R_2$.

Figure 20:
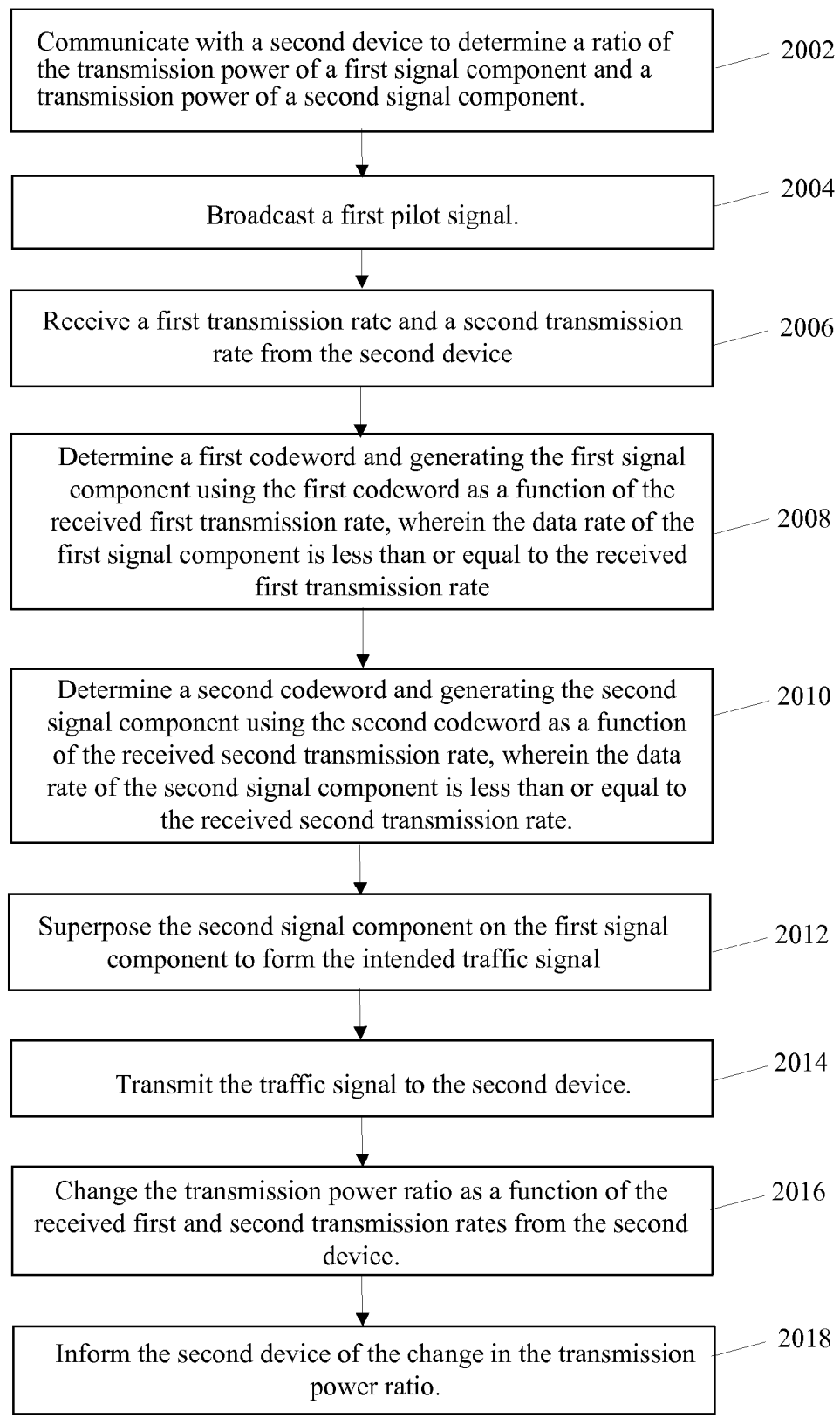
FIG. 20 illustrates an example of a method operational in a first transmitter device for facilitating successive interference cancellation (SIC) in a wireless first receiver device operating in a peer-to-peer network.

FIG. 20 illustrates an example of a method operational in a first transmitter device for facilitating successive interference cancellation (SIC) in a wireless first receiver device operating in a peer-to-peer network. In this example, the "first device" (e.g., WT A 302 in FIG. 3) is referred to as the first transmitter device and the "second device" (e.g., WT B 304 in FIG. 3) is referred to as the first receiver device is referred to as the. The first receiver device may be the intended receiver of an intended first traffic signal to be transmitted from the first transmitter device.

The first transmitter device may broadcast a first pilot signal 2004. In response, the first transmitter device (first device WT-A) may receive a first transmission rate and a second transmission rate from the first receiver device (second device WT-B) 2006. The first transmitter device (first device WT-A) may then determine a first codeword and generates a first signal component using the first codeword as a function of the received first transmission rate, wherein the data rate of the first signal component is less than or equal to the received first transmission rate 2008. Similarly, the first transmitter device (first device WT-A) may determine a second codeword and generates a second signal component using the second codeword as a function of the received second transmission rate, wherein the data rate of the second signal component is less than or equal to the received second transmission rate 2010. The first transmitter device (first device WT-A) may then superpose the second signal component on the first signal component to form a traffic signal 2012 and transmits the traffic signal to the first receiver device (second device WT-B) 2014. In one example, the first signal component may use QPSK constellation and the second signal component may use QAM constellation, including one of QAM-16, QAM-64, and QAM-256 constellations.

According to one feature, the first transmitter device (first device WT-A) may communicate with the first receiver device (second device WT-B) to determine the ratio of the transmission power of the first signal component and the transmission power of the second signal component 2002. The transmission power ratio may be determined prior to broadcasting the first pilot signal. According to another feature, the first device may change the transmission power ratio as a function of the received first and second transmission rates from the first receiver device (second device WT-B) 2016 and then informs the first receiver device (second device WT-B) of the change in the transmission power ratio 2018. The change of the transmission power ratio may occur in a time scale at least five times larger than the time scale of a traffic transmission. The ratio of the transmission power of the first signal component and the transmission power of the second signal component may be a fixed constant known to both the first transmitter device (first device WT-A) and the first receiver device (second device WT-B). The intended traffic signal may be transmitted over a shared frequency spectrum and in an overlapping time interval as a second traffic signal transmitted by a second transmitter device (third device WT-C) to a second receiver device (fourth device WT-D).

Figure 21:
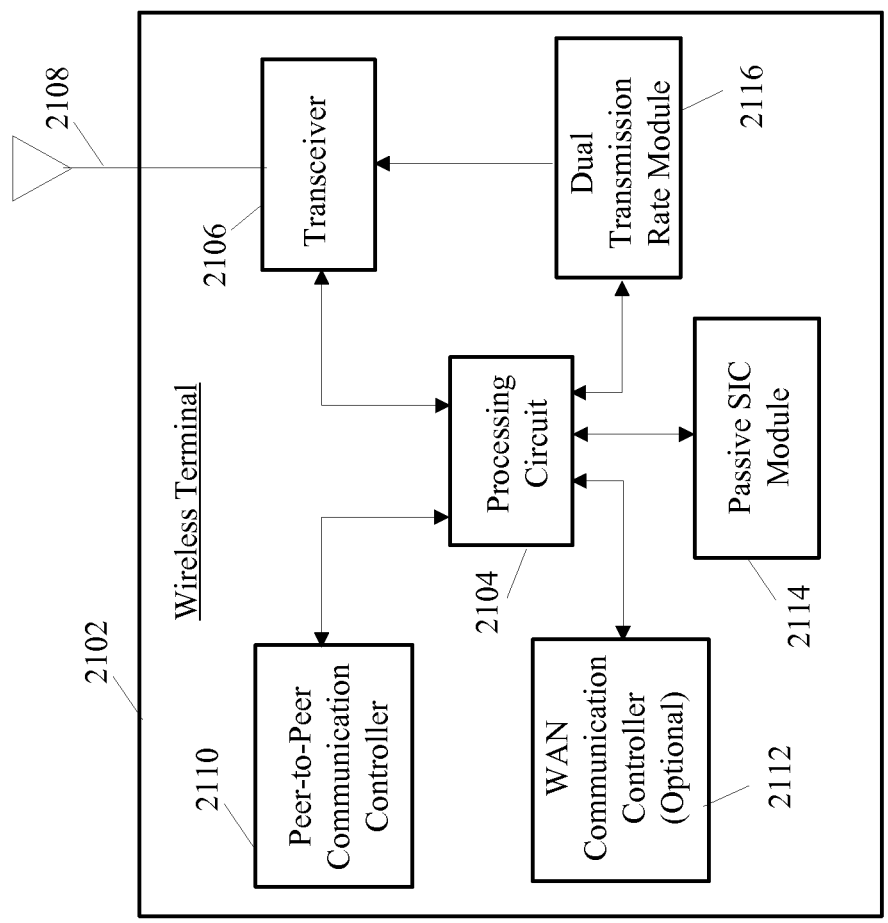
FIG. 21 is a block diagram illustrating a wireless terminal that is configured to perform or facilitate passive successive interference cancellation (SIC) within a peer-to-peer wireless network by employing dual transmission rates.

FIG. 21 is a block diagram illustrating a wireless terminal that is configured to perform or facilitate passive successive interference cancellation (SIC) within a peer-to-peer wireless network by employing dual transmission rates. The wireless terminal 2102 may include a processing circuit 2104 (e.g., one or more processors, electrical components, and/or circuit modules) coupled to a transceiver 2106 (e.g., transmitter and/or receiver modules) which is coupled to an antenna 2108 through which peer-to-peer communications can take place. The processing circuit 2104 may also be coupled to a peer-to-peer communication controller 2110 that may facilitate peer-to-peer communications and (optionally) a wide area network (WAN) communication controller 2112 that may facilitate communications over a WAN. The wireless terminal 2102 may also include a passive successive interference cancellation module 2114 coupled to the processing circuit 2104 and a dual transmission rate module 2116.

In one example, the wireless terminal 2102 may operate as a first receiver device and perform passive SIC so as to provide dual transmission rates to a first transmitter device with which it has a peer-to-peer communication connection. In this configuration, the wireless terminal 2102 may be configured to perform the operations described in FIG. 14. For instance, the processing circuit 2104 and/or transceiver 2106 may operate to (a) receive a first pilot signal from the first transmitter device (first device WT-A), and/or (b) receive a second pilot signal from a second transmitter device (third device WT-C), the second pilot signal indicating that the second transmitter device (third device WT-C) intends to transmit a second traffic signal. The processing circuit 2104, dual transmission rate selector 2116, and/or peer-to-peer communication controller 2110 may determine a first and a second transmission rates for traffic transmissions from the first transmitter device (first device WT-A). The processing circuit 2104 and/or transceiver 2106 may then transmit a control message to the first transmitter device (first device WT-A), the control message including the first and second transmission rates. The processing circuit 2104 and/or transceiver 2106 may then receive a traffic signal including the first traffic signal from the first transmitter device (first device WT-A), the first traffic signal including a first and a second signal components, the first and second signal components being generated from a first and a second codewords, respectively. The second signal component may be superposed on the first signal component to form the first traffic signal. A transmission power ratio of a first transmission power of the first signal component and a second transmission power of the second signal component is maybe known to the wireless terminal 2102. The processing circuit 2104 peer-to-peer communication controller 2114, and/or passive SIC Module may further (a) decode the first codeword of the first signal component of the first traffic signal transmitted by the first transmitter device (first device WT-A) from the received traffic signal, (b) subtract the decoded first signal component from the received traffic signal if decoding the first codeword succeeds, (c) decode the interfering second traffic signal transmitted by the second transmitter device (third device WT-C) using the remaining of the received traffic signal after the decoded first signal component has been subtracted, (d) subtract the decoded interfering second traffic signal from the remaining of the received traffic signal if decoding the interfering second traffic signal succeeds, and/or (e) decode the second codeword of the second signal component of the first traffic signal transmitted by the first transmitter device (first device WT-A) from the remaining of received traffic signal after both the decoded first signal component and the decoded interfering second traffic signal have been subtracted.

Consequently, a circuit in a mobile wireless terminal or first receiver device (second device WT-B) may be adapted to wirelessly receive a first pilot signal from a first transmitter device (first device WT-A). The same circuit, a different circuit, or a second section of the same or different circuit may be adapted to wirelessly receive a second pilot signal from a second transmitter device (third device WT-C), the second pilot signal indicating that the second transmitter device (third device WT-C) intends to transmit a second traffic signal. The same circuit, a different circuit, or a third section of the same or different circuit may be adapted to determine a first and a second transmission rates for traffic transmissions from the first transmitter device (first device WT-A). The same circuit, a different circuit, or a fourth section of the same or different circuit may be adapted to transmit a control message to the first transmitter device (first device WT-A), the control message including the first and second transmission rates. The same circuit, a different circuit, or a fifth section of the same or different circuit may be adapted to receive a traffic signal including the first traffic signal from the first transmitter device (first device WT-A), the first traffic signal including a first and a second signal components, the first and second signal components being generated from a first and a second codewords, respectively. The same circuit, a different circuit, or a sixth section of the same or different circuit may be adapted to obtain a transmission power ratio of a first transmission power of the first signal component and a second transmission power of the second signal component, wherein the first transmission rate is determined as a function of the signal powers of the first and the second pilot signals and the transmission power ratio.

In another example, the wireless terminal 2102 or first transmitter device (first device WT-A) may be configured to facilitate passive SIC by a second receiver device (fourth device WT-D) based on the receipt of dual transmission rates obtained from a first receiver device (second device WT-B). In this configuration, the wireless terminal 2102 may be configured to perform the operations described in FIG. 20. For example, the transceiver 2106, processing circuit 2104, and/or peer-to-peer communication controller 2110 may broadcast a first pilot signal. In response, the transceiver 2106, processing circuit 2104, and/or peer-to-peer communication controller 2110 may receive a first transmission rate and a second transmission rate from the first receiver device (second device WT-B). The processing circuit 2104, peer-to-peer communication controller 2110, passive SIC module 2114, and/or dual transmission rate module 2116 may then (a) determine a first codeword and generate a first signal component using the first codeword as a function of the received first transmission rate, wherein a first data rate of the first signal component is less than or equal to the received first transmission rate, and/or (b) determine a second codeword and generate a second signal component using the second codeword as a function of the received second transmission rate, wherein a second data rate of the second signal component is less than or equal to the received second transmission rate. The processing circuit 2104, transceiver 2106, passive SIC module 2114, and/or peer-to-peer communication controller 2110 may then superpose the second signal component on the first signal component to form a first traffic signal. The processing circuit 2104 and/or transceiver 2106 may then transmit the first traffic signal to the first receiver device (second device WT-B).

Consequently, a circuit in a mobile wireless terminal or first transmitter device (first device WT-A) may be adapted to broadcast a first pilot signal. The same circuit, a different circuit, or a second section of the same or different circuit may be adapted to receive a first transmission rate and a second transmission rate from the first receiver device (second device WT-B). The same circuit, a different circuit, or a third section of the same or different circuit may be adapted to determine a first codeword and generate a first signal component using the first codeword as a function of the received first transmission rate, wherein a first data rate of the first signal component is less than or equal to the received first transmission rate. The same circuit, a different circuit, or a fourth section of the same or different circuit may be adapted to determine a second codeword and generate a second signal component using the second codeword as a function of the received second transmission rate, wherein a second data rate of the second signal component is less than or equal to the received second transmission rate. The same circuit, a different circuit, or a fifth section of the same or different circuit may be adapted to superpose the second signal component on the first signal component to form a first traffic signal. The same circuit, a different circuit, or a sixth section of the same or different circuit may be adapted to transmit the first traffic signal to the first receiver device (second device WT-B). The same circuit, a different circuit, or a seventh section of the same or different circuit may be adapted to determine a transmission power ratio of the transmission power of the first signal component and the transmission power of the second signal component. The same circuit, a different circuit, or an eight section of the same or different circuit may be adapted to change the transmission power ratio as a function of the received first and second transmission rates from the first receiver device (second device WT-B). The same circuit, a different circuit, or a ninth section of the same or different circuit may be adapted to inform the first receiver device (second device WT-B) of the change in the transmission power ratio.

Figure 22A:
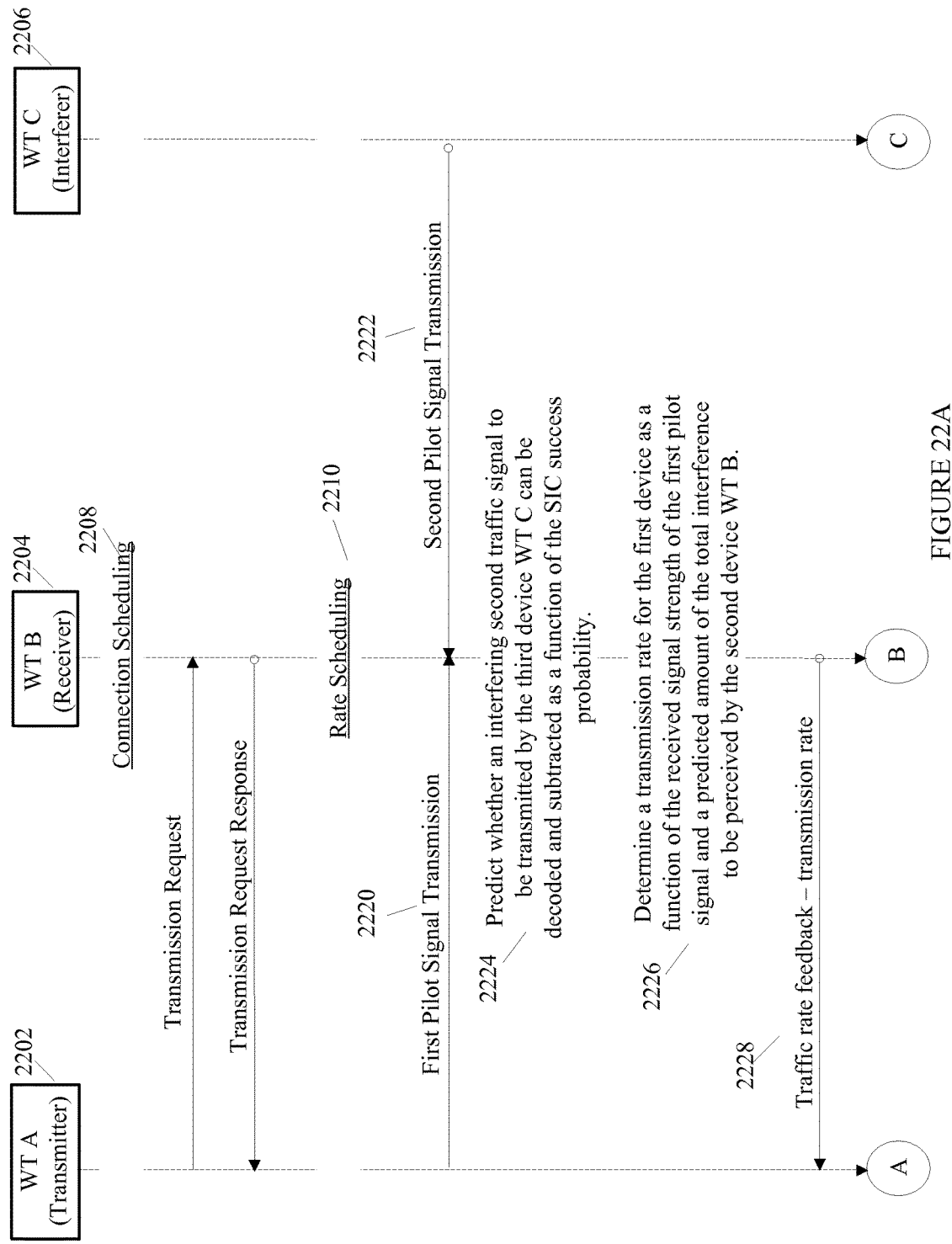
FIG. 22 (comprising FIGS. 22A and 22B) is a flow diagram illustrating yet another example of interference management in which a receiver second device uses pilot signals to predict interference from an interferer third device.
Figure 22B:
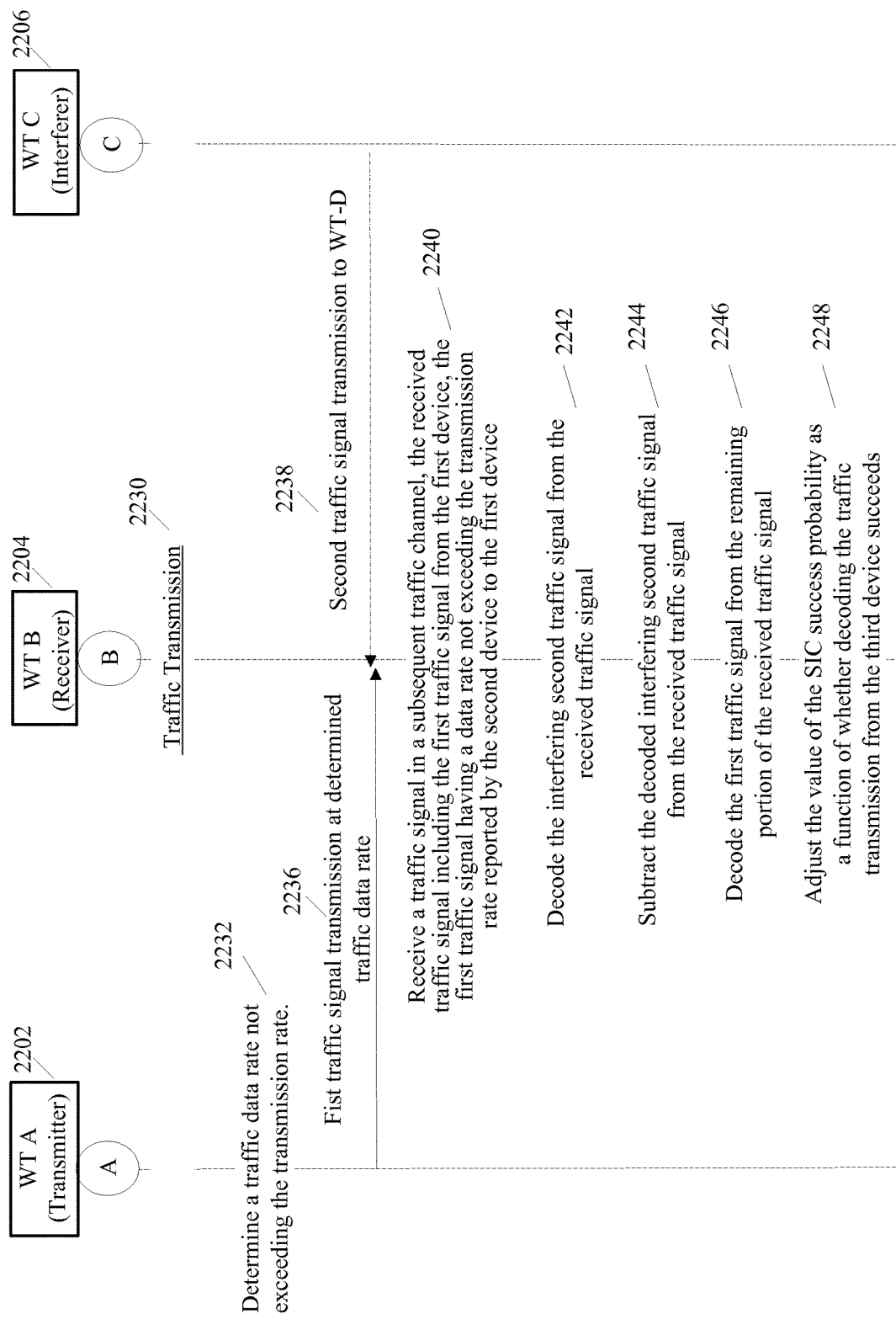

Passive Successive Interference Cancellation—One Rate Feedback and Probability Adaptation FIG. 22 (comprising FIGS. 22A and 22B) is a flow diagram illustrating yet another example of interference management in which a receiver second device uses pilot signals to predict interference from an interferer third device. Based on this interference prediction, the receiver second device may decide on which transmission rate to give as feedback to a transmitter first device with which it has peer-to-peer communications.

During a link (connection) scheduling stage 2208, a similar protocol may be performed as connection scheduling stage 401 (FIG. 4). During a rate scheduling stage 2210, the first device WT A 2202 transmits a first pilot signal 2220. The third device WT C 2206 may also transmit a second pilot signal 2222. The second device WT B 2204 may predict 2224 whether it can decode and cancel out (subtract) an interfering second traffic signal from the third device WT C 2206, as a function of 1) a SIC success probability and/or 2) the strength of the received pilot 2222 from the third device WT C 2206. The second device WT B 2204 may also determine a transmission rate 2226 it can support from the first device WT A 2202 as a function of the received signal strength of the first pilot 2220 from the first device WT A 2202 and an estimation or predicted amount of the total interference to be perceived by the second device WT B. The second device WT B 2204 then sends the transmission rate 2228 to the first device WT A.

During a traffic transmission stage 2230, the first device WT A 2202 may determine a traffic data rate 2232, as a function of the received transmission rate from the second device WT B 2204. The first device WT A 2202 then uses the traffic data rate to transmit a first traffic signal 2236 to the second device WT B 2204. The interfering third device WT C 2206 may also transmit its second traffic transmission to a fourth device WT D, either concurrently or in an overlapping timeslot / channel as the first traffic signal. The second device WT B 2204 receives a traffic signal in a subsequent traffic channel that includes the first traffic signal from the first device WT A 2202 and the second traffic signal 2238 from the third device WT B 2206. The first traffic signal may have a data rate not exceeding the transmission rate reported by the second device WT B to the first device WT A 2240.

The second device WT B 2204 may first attempt to decode 2240 the interfering second traffic signal 2242 from the third device WT C 2206. If decoding succeeds, the second device WT B 2204 cancels or subtracts 2244 the second traffic signal 2238 out from the received traffic signal 2244. Finally the second device WT B 2204 decodes the desired traffic transmission 2246 from the first device WT A 2202. The second device 2204 may adjust the value of the SIC success probability as a function of whether decoding the traffic transmission from the third device succeeds 2248. For example, if the second device successfully cancels out the interference, it may increase the value of the SIC success probability so that in a subsequent time, the second device may have a greater probability that it will predict it can decode and cancel out (subtract) the interfering second traffic signal from the third device. The second device may maintain a different value of SIC success probability for another device other than the third device.

Figure 23A:
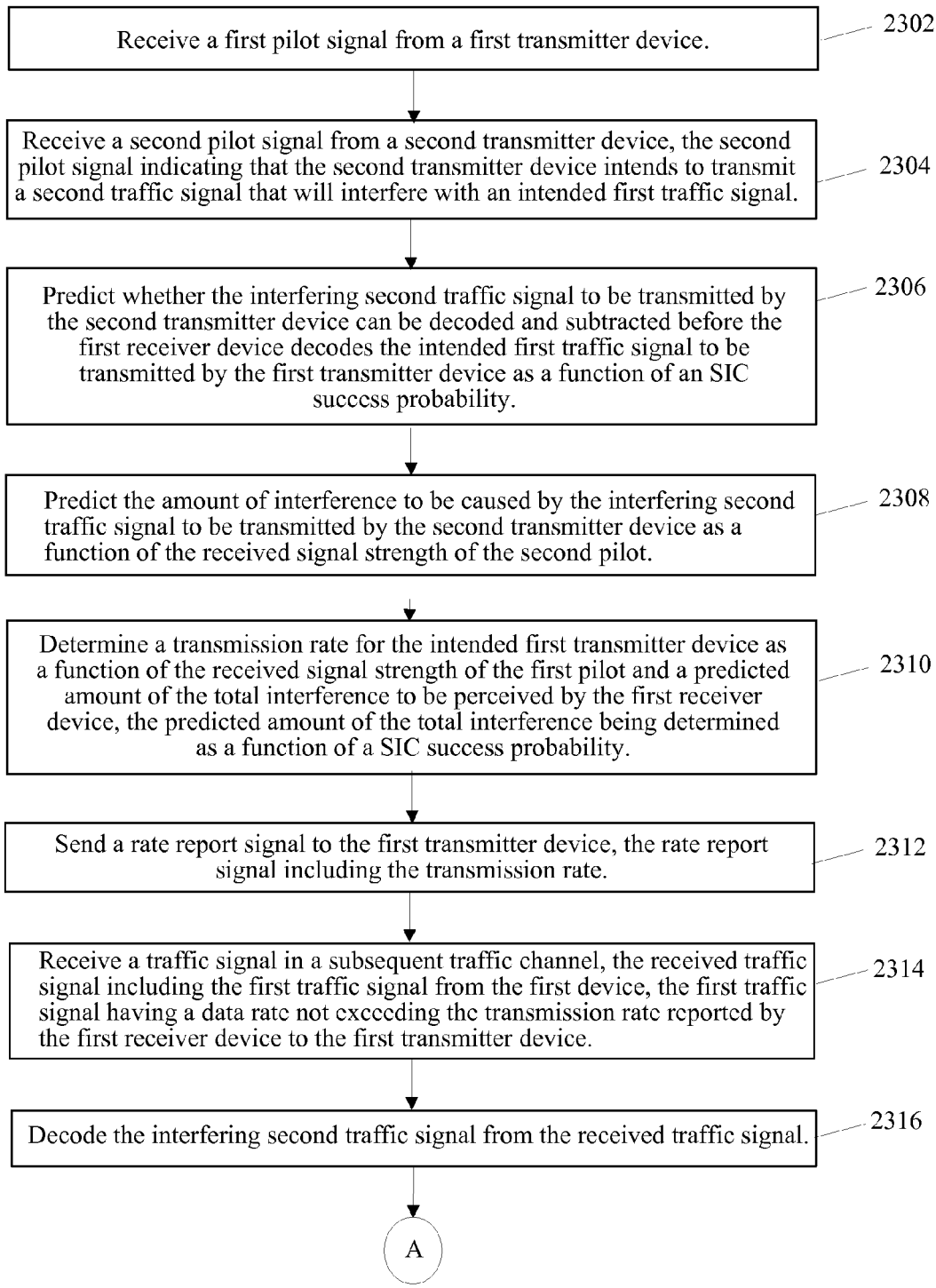
FIG. 23 (comprising FIGS. 23A and 23B) illustrates an example of a method operational on a wireless first receiver device that performs successive interference cancellation within a peer-to-peer network based on predicting interference from an interferer second transmitter device.
Figure 23B:
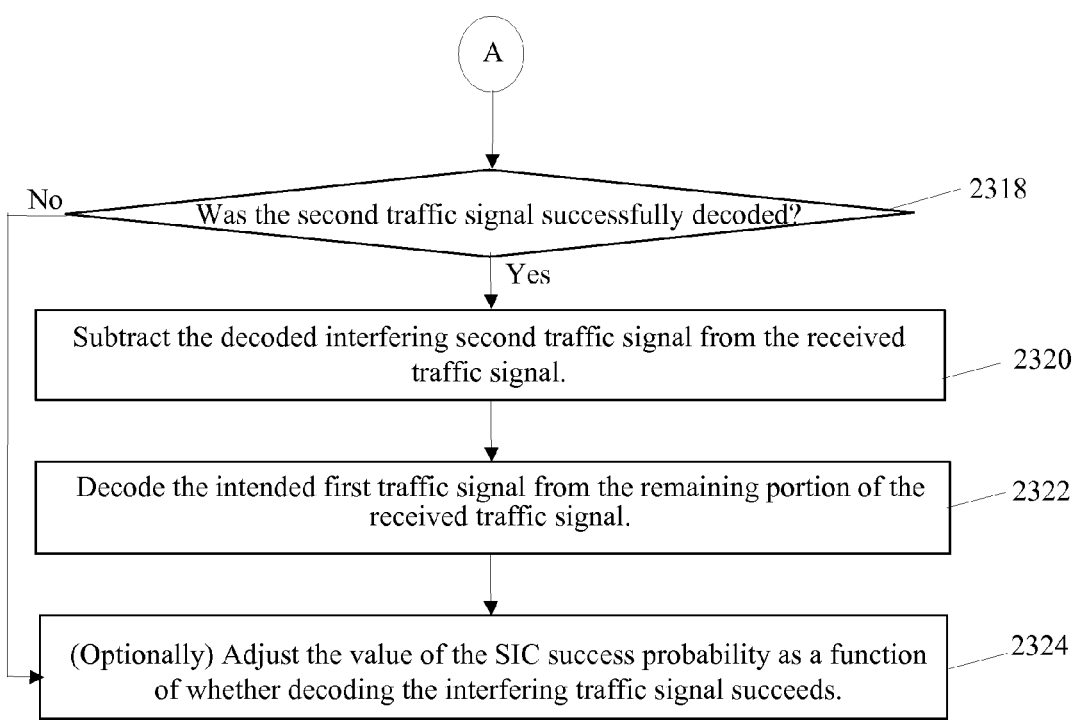

FIG. 23 (comprising FIGS. 23A and 23B) illustrates an example of a method operational on a wireless first receiver device that performs successive interference cancellation within a peer-to-peer network based on predicting interference from an interferer second transmitter device. In this example, the "second device" (e.g., WT B 304 in FIG. 3) may be referred as the first receiver device, the "first device" (e.g., WT A 302 in FIG. 3) may be referred to as the first transmitter device, and the "third device" (e.g., WT C 306 in FIG. 3) may be referred to as the interfering second transmitter terminal. In this example, traffic transmissions from the first transmitter device (first device WT-A) to the first receiver device (second device WT-B) may have a higher communication priority (over a shared frequency spectrum) than traffic transmissions from the second transmitter device (third device WT-C) to the second receiver device (fourth device WT-D).

The first receiver device (second device WT-B) may receive a first pilot signal from the first transmitter device (first device WT-A) 2302 and may also receive a second pilot signal from a second transmitter device (third device WT-C), the second pilot signal indicating that the second transmitter device (third device WT-C) intends to transmit a second traffic signal 2304. A first traffic signal may be transmitted by the first transmitter device (first device WT-A) over a shared frequency spectrum and in an overlapping or concurrent time interval as the second traffic signal transmitted by the second transmitter device (third device WT-C) to a second receiver device (fourth device WT-D). Consequently, the second traffic signal may interfere with reception of the first traffic signal by the first receiver device (second device WT-B).

The first receiver device (second device WT-B) may predict whether the interfering second traffic signal to be transmitted by the second transmitter device (third device WT-C) can be decoded and subtracted before the first receiver device (second device WT-B) decodes the first traffic signal to be transmitted by the first transmitter device (first device WT-A) as a function of the SIC success probability 2306.

The first receiver device (second device WT-B) may also predict the amount of interference to be caused by the interfering second traffic signal to be transmitted by the second transmitter device (third device WT-C) as a function of the received signal strength of the second pilot signal 2308. In one example, the first receiver device (second device WT-B) may discount the predicted amount of interference to be caused by the interfering second traffic signal to be transmitted by the second transmitter device (third device WT-C) by a discounting factor as a function of the SIC success probability, the discounting factor being between zero and one. The discounted predicted amount of interference to be caused by the interfering second traffic signal to be transmitted by the second transmitter device (third device WT-C) may be included in the calculation of the predicted amount of the total interference to be perceived by the first receiver device (second device WT-B).

The first receiver device (second device WT-B) may then determine a transmission rate for the first transmitter device (first device WT-A) as a function of the received signal strength of the first pilot and a predicted amount of the total interference to be perceived by the first receiver device (second device WT-B), the predicted amount of the total interference being determined as a function of a SIC success probability 2310.

In another example, if it is predicted that the interfering second traffic signal to be transmitted by the second transmitter device (third device WT-C) cannot be decoded and subtracted, the first receiver device (second device WT-B) may also predict the amount of interference to be caused by the interfering second traffic signal to be transmitted by the second transmitter device (third device WT-C) as a function of the received signal strength of the second pilot and including the predicted amount of the interfering second traffic signal to be transmitted by the second transmitter device (third device WT-C) in the calculation of the predicted amount of the total interference to be perceived by the first receiver device (second device WT-B). The interfering second traffic signal to be transmitted by the second transmitter device (third device WT-C) may be excluded in the calculation of the predicted amount of the total interference to be perceived by the first receiver device (second device WT-B) if it is predicted that the interfering second traffic signal to be transmitted by the second transmitter device (third device WT-C) can be decoded and subtracted.

The first receiver device (second device WT-B) may then send a rate report signal to the first transmitter device (first device WT-A), the rate report signal including the transmission rate 2312. In response, the first receiver device (second device WT-B) may receive a traffic signal in a subsequent traffic channel, the received traffic signal including the first traffic signal from the first transmitter device (first device WT-A), the first traffic signal having a data rate not exceeding the transmission rate reported by the first receiver device (second device WT-B) to the first transmitter device (first device WT-A) 2314. The interfering second traffic signal may be decoded from the received traffic signal 2316. If the interfering second traffic signal can be successfully decoded 2318, the decoded interfering second traffic signal is subtracted from the received traffic signal 2320. The first traffic signal may then be decoded from the remaining portion of the received traffic signal 2322.

According to one feature, the value of the SIC success probability may be adjusted as a function of whether decoding the interfering second traffic signal succeeds 2324. For example, the value of the SIC success probability is increased if decoding the interfering second traffic signal succeeds and the value of the SIC success probability is decreased if decoding the interfering second traffic signal fails.

Figure 24:
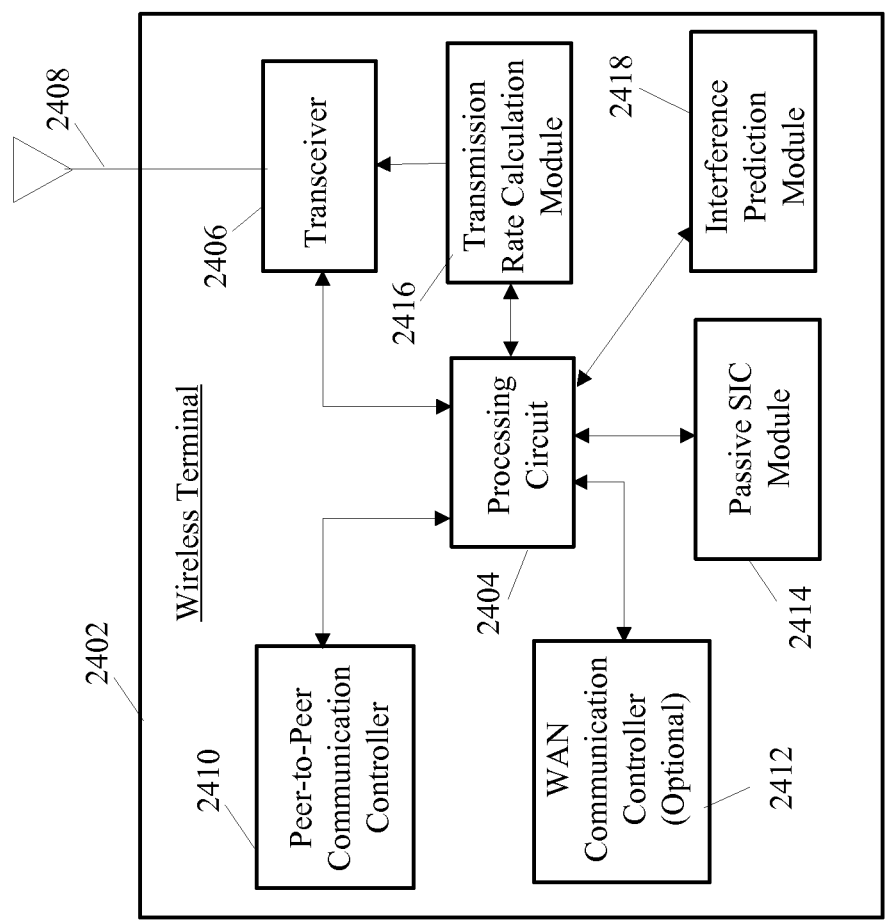
FIG. 24 is a block diagram illustrating a wireless terminal that is configured to perform or facilitate passive successive interference cancellation (SIC) within a peer-to-peer wireless network.

FIG. 24 is a block diagram illustrating a wireless terminal that is configured to perform or facilitate passive successive interference cancellation (SIC) within a peer-to-peer wireless network. The wireless terminal 2402 may include a processing circuit 2404 (e.g., one or more processors, electrical components, and/or circuit modules) coupled to a transceiver 2406 (e.g., transmitter and/or receiver modules) which is coupled to an antenna 2408 through which peer-to-peer communications can take place. The processing circuit 2404 may also be coupled to a peer-to-peer communication controller 2410 that may facilitate peer-to-peer communications and (optionally) a wide area network (WAN) communication controller 2412 that may facilitate communications over a WAN. The wireless terminal 2402 may also include a passive successive interference cancellation module 2414 coupled to the processing circuit 2404 and a transmission rate calculation module 2416 and an interference prediction module 2418.

In one example, the wireless terminal 2402 may operate as a first receiver device (second device WT-B) and may be configured to perform passive SIC using interference prediction so as to subtract an interfering signal from a received signal to obtain a desired signal from another device with which it has a peer-to-peer communication connection. In this configuration, the wireless terminal may be configured to perform the operations described in FIG. 23. For instance, the processing circuit 2404 and/or transceiver 2406 may operate to (a) wirelessly receive a first pilot signal from the first transmitter device (first device WT-A); and (b) wirelessly receive a second pilot signal from a second transmitter device (third device WT-C), the second pilot signal indicating that the second transmitter device (third device WT-C) intends to transmit a second traffic signal. The processing circuit 2404, transmission rate calculation module 2416, interference prediction module 2418 and/or peer-to-peer communication controller 2410 may determine a transmission rate for the first transmitter device (first device WT-A) as a function of the received signal strength of the first pilot signal and a predicted amount of the total interference to be perceived by the first receiver device (second device WT-B), the predicted amount of the total interference being determined as a function of a SIC success probability. The processing circuit 2404, peer-to-peer communication controller 2410, and/or transceiver 2406 may then send a rate report signal to the first transmitter device (first device WT-A), the rate report signal including the transmission rate.

The processing circuit 2404, transmission rate calculation module 2416, interference prediction module 2418 and/or peer-to-peer communication controller 2410 may (a) predict the amount of interference to be caused by the interfering second traffic signal to be transmitted by the second transmitter device (third device WT-C) as a function of the received signal strength of the second pilot signal; and/or (b) predict whether the interfering second traffic signal to be transmitted by the second transmitter device (third device WT-C) can be decoded and subtracted before the first receiver device (second device WT-B) decodes the first traffic signal to be transmitted by the first transmitter device (first device WT-A) as a function of the SIC success probability.

The processing circuit 2404, peer-to-peer communication controller 2410, and/or transceiver 2406 may wirelessly receive a traffic signal in a subsequent traffic channel, the received traffic signal including the first traffic signal from the first transmitter device (first device WT-A), the first traffic signal having a data rate not exceeding the transmission rate reported by the first receiver device (second device WT-B) to the first transmitter device (first device WT-A). The processing circuit 2404, peer-to-peer communication controller 2410, and/or passive SIC module 2414 may then (a) decode the interfering second traffic signal from the received traffic signal, (b) subtract the decoded interfering second traffic signal from the received traffic signal, (c) decode the first traffic signal from the remaining portion of received traffic signal after the decoded interfering second traffic signal has been subtracted and/or (d) adjust the value of the SIC success probability as a function of whether decoding the interfering traffic signal succeeds.

Consequently, a circuit in a mobile wireless terminal or first receiver device may be adapted to (a) receive a first pilot signal from the first transmitter device (first device WT-A) and (b) receive a second pilot signal from a second transmitter device (third device WT-C), the second pilot signal indicating that the second transmitter device (third device WT-C) intends to transmit a second traffic signal. The same circuit, a different circuit, or a second section of the same or different circuit may be adapted to predict whether the interfering second traffic signal to be transmitted by the third device can be decoded and subtracted before the first receiver device (second device WT-B) decodes a first traffic signal to be transmitted by the first transmitter device (first device WT-A) as a function of the SIC success probability. The same circuit, a different circuit, or a third section of the same or different circuit may be adapted to determine a transmission rate for the first transmitter device (first device WT-A) as a function of the received signal strength of the first pilot signal and a predicted amount of the total interference to be perceived by the first receiver device (second device WT-B), the predicted amount of the total interference being determined as a function of a SIC success probability. The same circuit, a different circuit, or a fourth section of the same or different circuit may be adapted to send a rate report signal to the first transmitter device (first device WT-A), the rate report signal including the transmission rate. The same circuit, a different circuit, or a fifth section of the same or different circuit may be adapted to receive a traffic signal in a subsequent traffic channel, the received traffic signal including a first traffic signal from the first transmitter device (first device WT-A) and the interfering second traffic signal from the second transmitter device (third device WT-C), the first traffic signal having a data rate not exceeding the transmission rate reported by the first receiver device (second device WT-B) to the first transmitter device (first device WT-A).

Figure 25A:
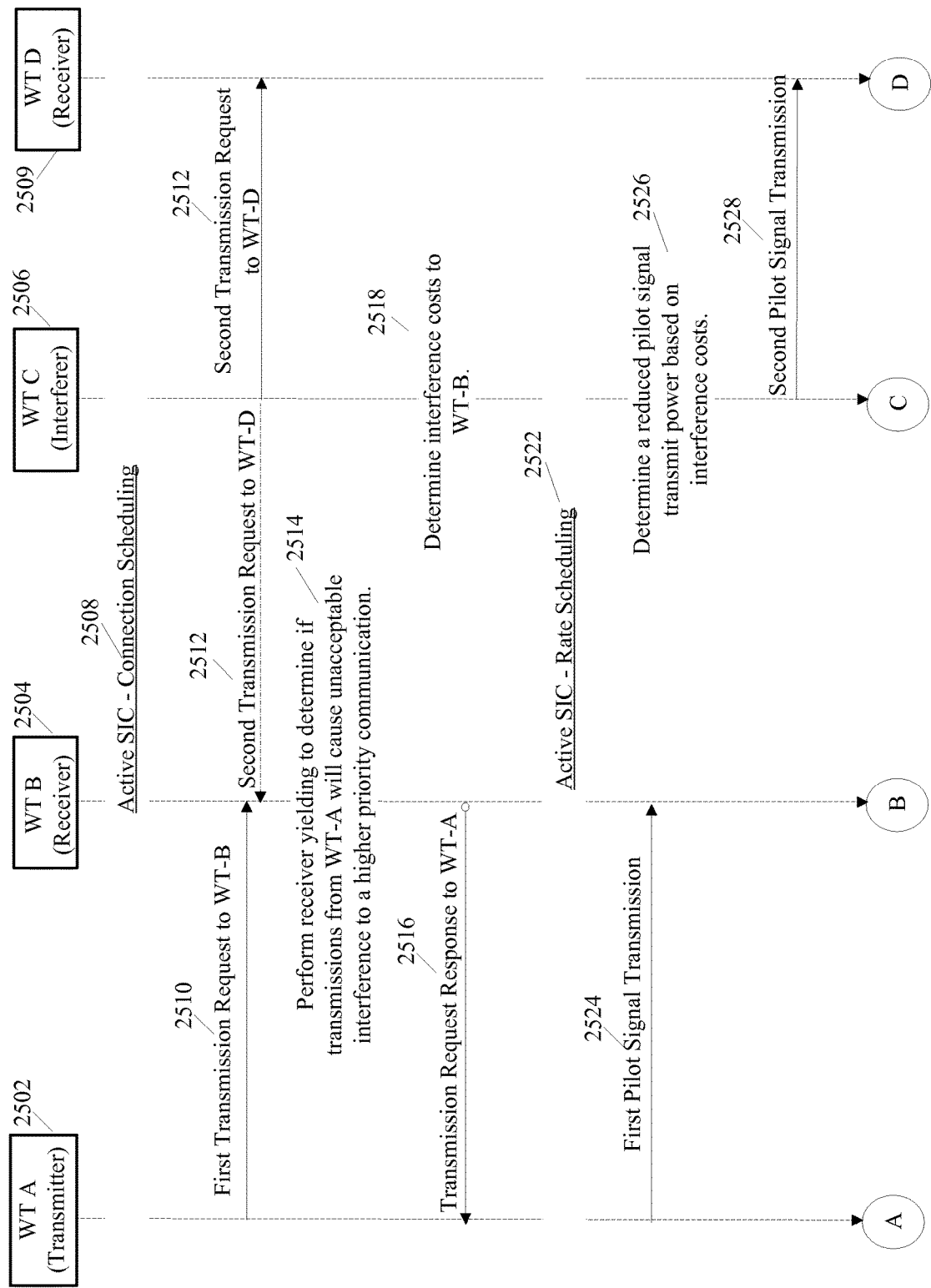
FIG. 25 (comprising FIGS. 25A, 25B, and 25C) illustrates another example of a protocol for an ad hoc communication network that facilitates interference cancellation.
Figure 25B:
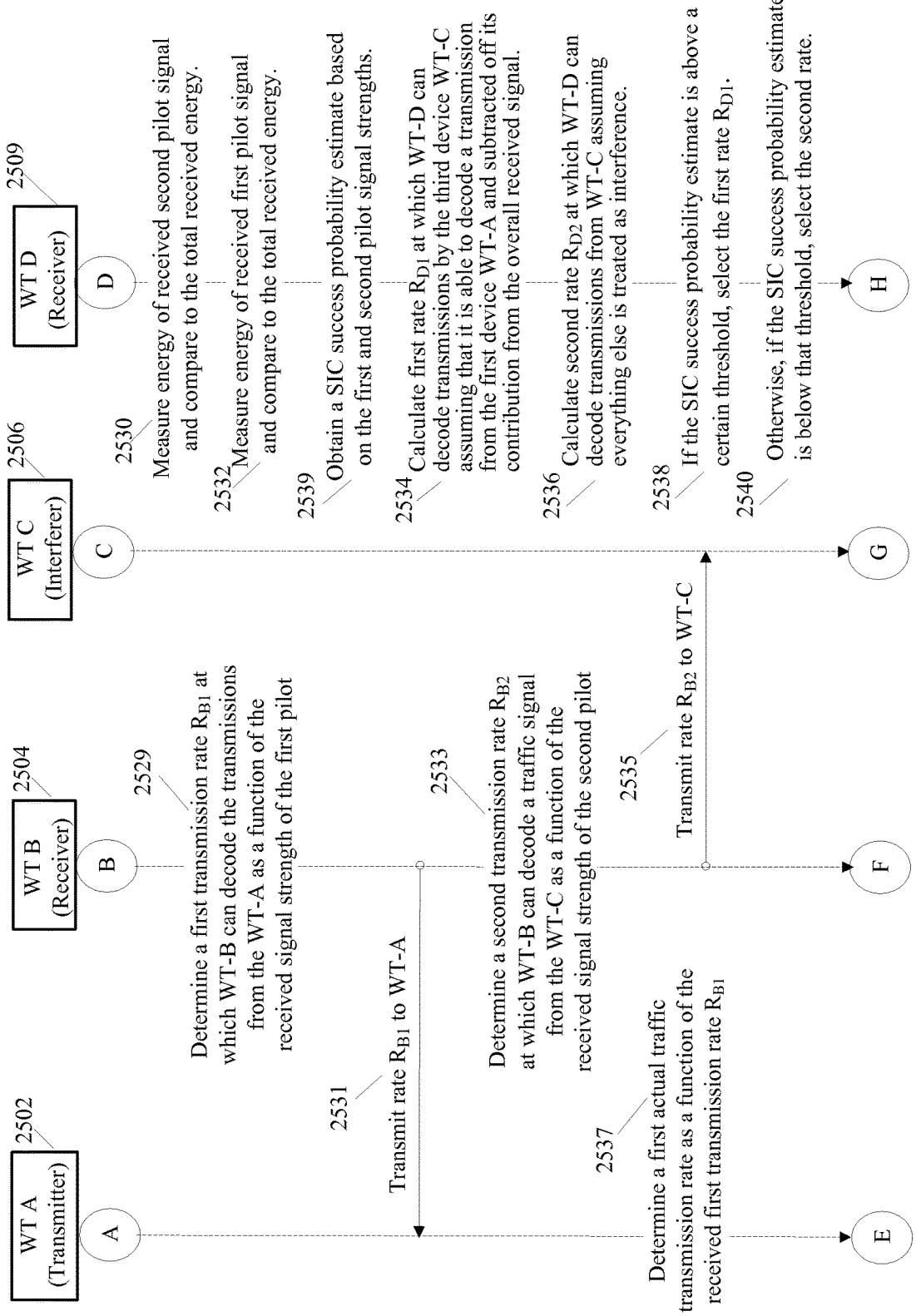
Figure 25C:
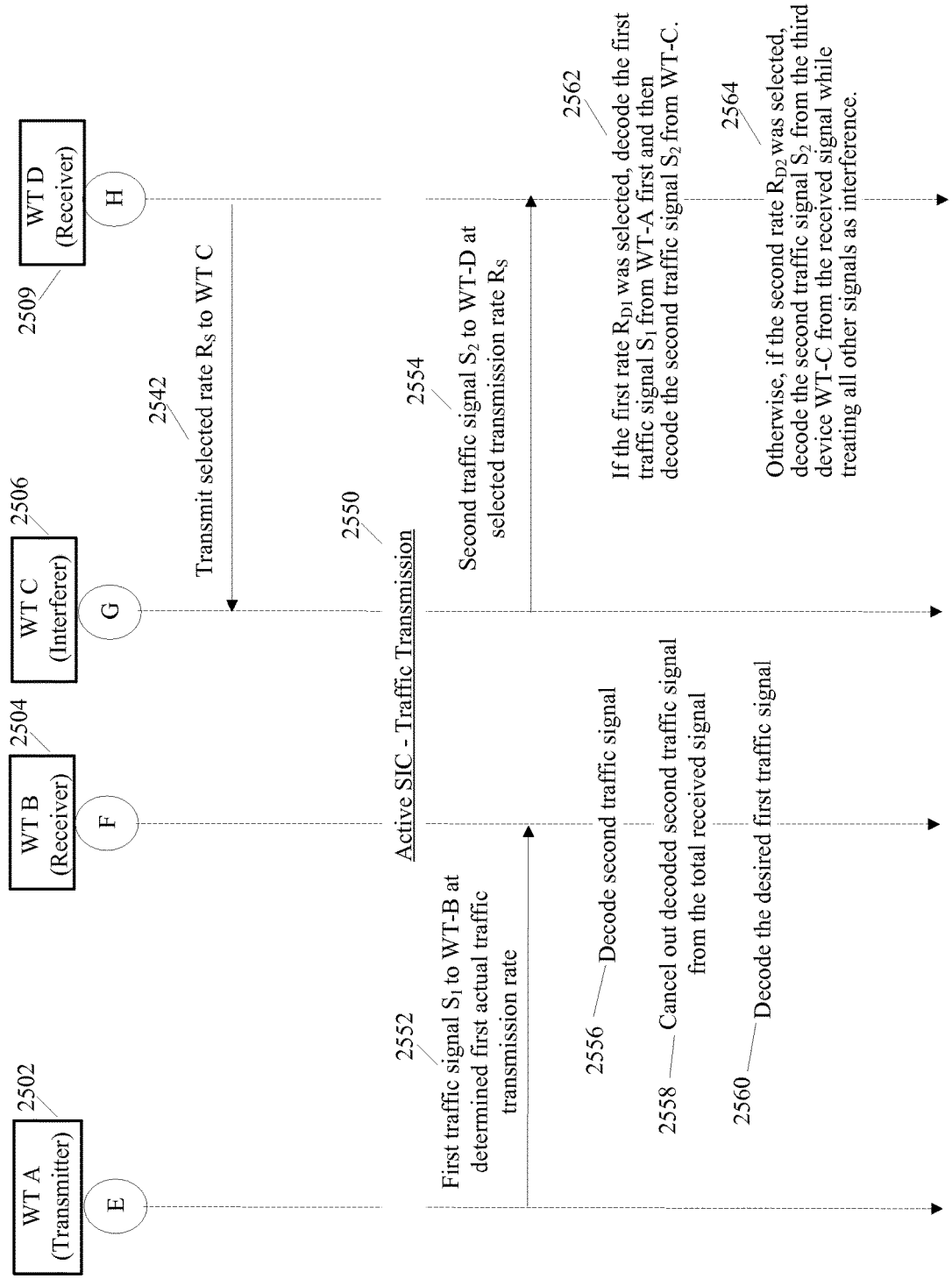

Passive Successive Interference Cancellation—Transmit Power Control by Interfering Device with SIC Success Probability Adaptation FIG. 25 (comprising FIGS. 25A, 25B, and 25C) illustrates another example of a protocol for an ad hoc communication network that facilitates interference cancellation. In this example, the protocol may include a connection scheduling stage 2508, a rate scheduling stage 2522, and a transmission stage 2550. In this example, additional transmission power control is performed by the interfering transmitter device with rate control from the lower-priority receiver device.

In the link (connection) scheduling stage 2508, a first device WT-A 2502 (transmitter) transmits a first transmission request 2510, which is heard by a second device WT-B 2504 (receiver). A nearby third device WT-C 2506 (interferer) may transmit a second transmission request 2512 to a fourth device WT-D 2509 (receiver). The second transmission request 2512 may also be received or perceived by the second device WT-B 2504. According to one feature, the second device WT-B 2504 may then perform receiver yielding where it may decide to drop out (e.g., ignore or deny the transmission request from the first device WT-A 2502) if it will cause unacceptable interference to a higher priority communication. For instance, the second device WT-B 2504 may determine, as a function of the received signal strength of the first and/or the second transmission requests 2510 and 2512, whether it can cancel the interference from the third device WT-C 2506. If so, the second device WT-B 2504 may send a transmission request response 2516 to the first device WT-A 2502 which indicates that it can establish a connection with the first device WT-A 2502 without causing unacceptable interference to other nearby devices.

Rather than implementing transmitter yielding at the third device WT-C 2506, the third device WT-C 2506 may instead perform power control in the later stages of the protocol (i.e., rate scheduling stage and/or traffic transmission stage) so as to ensure that it does not generate excessive interference for the second device WT-B 2504. Similarly, a fourth device WT-D 2509, which is the intended receiver for transmissions from the third device WT-C 2506, need not perform receiver yielding. That is, the fourth device WT-D 2509 does not drop out if it detects that the signal power from the first device WT-A 2502 is greater than a receiver-yield threshold. Instead, the fourth device WT-D 2509 may choose to decode and subtract the traffic signal from the first device WT-A 2502 before decoding the signal from the third device WT-C 2506.

In the rate scheduling stage 2522, the first device WT-A 2502 may transmit a first pilot signal $P_1$ 2524. The third device WT-C 2506 may also transmit a second pilot signal $P_2$ 2528. However, the third device WT-C 2506 may determine a reduced transmit power 2526 if the interference cost 2518, as determined in the connection scheduling stage 2508, is greater than a given threshold. The third device WT-C 2506 then transmits the second pilot signal $P_2$ at the reduced transmit power 2526.

The second device WT-B 2504 may determine a first transmission rate $R_{B1}$ 2529 at which it can decode a first traffic transmission $S_1$ from the first device WT-A 2502 as a function of the received signal strength $PWR_{P1}$ of the first pilot signal $P_1$ 2524 from the first device WT-A 2502, assuming at least some portion of the signal energy from the third device WT-C 2506 can be cancelled out. The second device WT-B 2504 may send a first rate report signal (feedback) including the first transmission rate $R_{B1}$ 2531 to the first device WT-A 2502. The first device WT-A 2502 may determine a first actual traffic transmission rate $R_{ACTUAL-1}$ 2537, as a function of the received first transmission rate $R_{B1}$ from the second device WT-B 2504. That is, the first actual transmission rate $R_{ACTUAL-1}$ is equal to or less than the first transmission rate $R_{B1}$.

In addition, the second device WT-B 2504 may also determine a second transmission rate $R_{B2}$ 2533 at which it can decode a second traffic transmission $S_2$ from the third device WT-C 2506 as a function of the received signal strength $PWR_{P2}$ of the second pilot signal $P_2$ 2528 from the third device WT-C 2506. The second transmission rate $R_{B2}$ 2533 may also be determined as a function of the received signal strength $PWR_{P1}$ of the first pilot $P_1$ from the first device WT-A 2502. This is because when the second device WT-B 2504 attempts to carry out SIC to cancel out the traffic signal from the third device WT-C 2506 before it can decode the intended traffic signal from the first device WT-A 2502, the traffic signal from the first device WT-A 2502 is treated as interference in the process of first decoding the traffic signal from the third device WT-C 2506. Consequently, the second transmission rate $R_{B2}$ may be a maximum rate at which the second device WT-B2504 can decode and cancel traffic transmissions from the third device WT-C 2506 to be able to decode the desired traffic transmissions from the first device WT A 2502, which is transmitted at the first rate $R_{B1}$. The second device WT-B 2504 may send the second rate report signal including the second transmission rate $R_{B2}$ 2535 to the third device WT-C 2506.

The fourth device WT-D 2509 may measure the energy in the second pilot signal $P_2$ transmitted from the third device WT-C 2506 and compares it to the total energy received 2530. The fourth device WT-D 2509 may also measure the energy in the first pilot signal $P_1$ transmitted from the first device WT-A 2502 and compares it to the total energy received 2532. An SIC success probability estimate $P_{SIC}$ is obtained based on the first and second pilot signal strengths 2539. For instance, the SIC probability estimate $P_{SIC}$ may be a ratio $RT_{P2/P1}$ of the second pilot signal $P_2$ strength and the first pilot signal $P_1$ strength.

Based on these pilot signal $P_1$ and $P_2$ energy comparisons, the fourth device WT-D 2509 may calculate two transmission rates. The first rate $R_{D1}$ 2534 may be a transmission rate (of the third device) at which the fourth device WT-D 2509 can decode transmissions from the third device WT-C 2506 assuming that it is able to decode a transmission from the first device WT-A 2502 and subtract the contribution of the first device transmission from the overall received signal. The second rate $R_{D2}$ 2536 may be a second transmission rate at which the fourth device WT-D 2509 can decode transmissions from the third device WT-C 2506 while treating everything else (including the transmissions from the first device WT-A 2502) as interference.

If the SIC success probability estimate $P_{SIC}$ is above a certain threshold, the fourth device WT-D 2509 selects the first rate $R_{D1}$ 2538. Otherwise, if the SIC success probability estimate $P_{SIC}$ is below the threshold, the fourth device WT-D 2509 selects the second rate $R_{D2}$ 2540. The fourth device WT-D 2509 sends the selected rate $R_S$ to the third device WT-C 2542. The fourth device WT-D 2509 may maintain different SIC success probability estimates for different devices with which it communicates.

The third device WT-C 2506 receives the selected transmission rate $R_S$ sent by the fourth device WT-D 2509 as well as the transmission rate $R_{B2}$ sent by the second device WT-B 2504. The transmission rate $R_{B2}$ is the transmission rate at which the second device WT-B 2504 can cancel out transmissions from the third device WT-C 2506 to decode and obtain the desired traffic signal or transmissions from the first device WT-A 2502.

In the traffic transmission stage 2550, the first device WT-A 2502 sends the first traffic signal $S_1$ 2552 to the second device WT-B 2504 at the first actual traffic transmission rate $R_{ACTUAL-1}$. Concurrent or overlapping with the first traffic signal $S_1$, the third device WT-C 2506 may also send its second traffic signal $S_2$ to the fourth device WT-D 2509 at the selected rate $R_S$ 2554.

The second device WT-B 2504 may receive a combined signal including part or all of the first and second traffic signals $S_1$ and $S_2$. The second device WT-B 2504 may decode the second traffic signal $S_2$ 2546 from the third device WT-C 2506, then cancel it out (subtract) from the total received signal 2558, and finally decode the desired first traffic signal $S_2$ 2560 from the first device WT-A 2502.

Similarly, the fourth device WT-D 2509 may receive a combined signal including part or all of the first and second traffic signals $S_1$ and $S_2$. If the selected rate $R_S$ is the first rate $R_{D1}$, the fourth device WT-D 2509 first decodes the first traffic signal $S_1$ sent by the first device WT-A 2502, reconstructs the corresponding signal and subtracts off its contribution from the overall received signal before decoding the second traffic signal $S_2$ from the third device WT-C 2506. If the selected rate $R_S$ is the second rate $R_{D2}$, the fourth device WT-D 2509 decodes the second traffic signal $S_2$ from the third device WT-C 2506 from the received signal while treating all other signals (including signals from the first device WT-A 2502) as interference 2564.

If the SIC decoding of the second traffic signal $S_2$ is successful, the fourth device WT-D 2509 may increase the SIC success probability estimate $P_{SIC}$. On the other hand, if the SIC decoding fails, the fourth device may decrease the SIC success probability estimate $P_{SIC}$.

Figure 26:
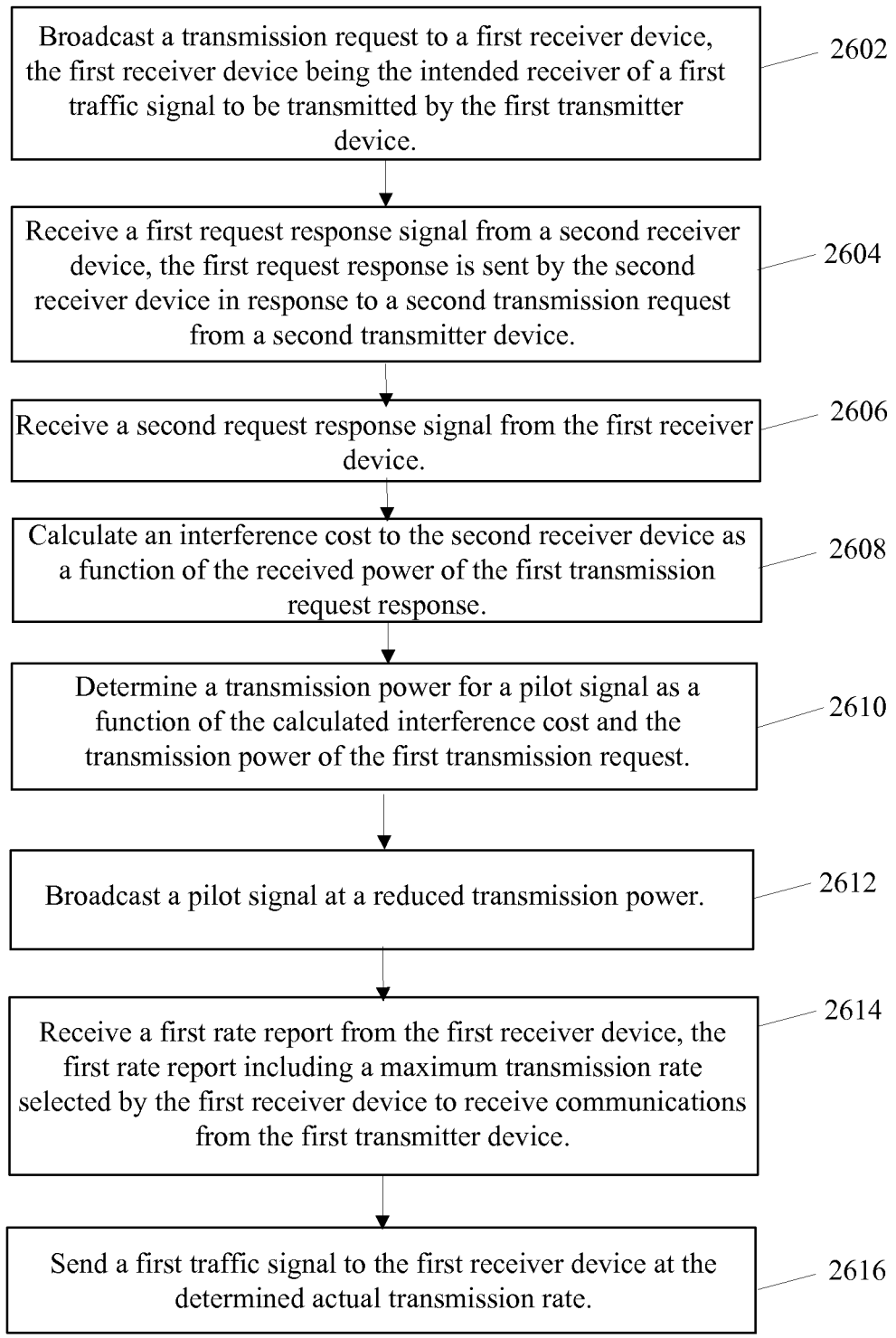
FIG. 26 illustrates an example of a method operational on an interfering first transmitter device that facilitates active successive interference cancellation within a peer-to-peer network.

FIG. 26 illustrates an example of a method operational on an interfering first transmitter device that facilitates active successive interference cancellation within a peer-to-peer network. In this example, the "third device" (e.g., WT C 306 in FIG. 3) is referred to as the "first transmitter device" and the "fourth device" (e.g., WT D 308 in FIG. 3) is referred to as the first receiver device. The "first device" (e.g., WT A 302 in FIG. 3) may be referred to as the second transmitter device and the second device (e.g., WT B 304 in FIG. 3) is referred to as the second receiver device. In this example, traffic transmissions from the third device (WT-C) to the fourth device (WT-D) may have a lower communication priority than traffic transmissions from the first device (WT-A) to the second device (WT-B).

The first transmitter device (third device WT-C) may broadcast a first transmission request to a first receiver device (fourth device WT-D), the first receiver device (fourth device WT-D) being the intended receiver of a first traffic signal to be transmitted by the first transmitter device (third device WT C) 2602.

Prior to sending a first traffic signal to the intended fourth device, a first request response may be received by the first transmitter device (third device WT-A), wherein the first transmission request response may be sent by a second receiver device (second device WT-B) in response to a second transmission request from a second transmitter device (first device WT-A) 2604. The first request response may indicate that the second receiver device (second device WT-B) is ready to receive traffic transmissions from the second transmitter device (first device WT-A). Likewise, the first transmitter device (third device WT-C) may receive a second transmission request response from the first receiver device (fourth device WT-D) 2606 which indicates that the first receiver device (fourth device WT-D) is ready to receive traffic from the first transmitter device (third device WT-C).

The first transmitter device (third device WT-C) may then determine whether to send or broadcast the first traffic signal to the first receiver device (fourth device WT-D). In one example, the first transmitter device (third device WT-C) may calculate an interference cost to the second receiver device (second device WT-B) as a function of the received power of the first request response 2608. That is, the first transmitter device (third device WT-C) may determine whether its intended traffic transmission will cause excessive interference to the second receiver device (second device WT-B), which will be receiving a traffic transmission from the second transmitter device (first device WT-A). The predicted interference cost may be calculated as a function of the received power of the second transmission request response signal and, possibly, the transmission power the first transmitter device (third device WT-C) intends to use for its traffic transmission. The first transmitter device (third device WT-C) may then determine a transmission power for a pilot signal as a function of the calculated interference cost and the transmission power of the first transmission request 2610. That is, the determined transmission power may be selected such that it does not cause unacceptable interference to other nearby devices (especially those having a higher communication priority). The first transmitter device (third device WT-C) may broadcast a pilot signal at the determined transmission power 2612. Note that, in one implementation, the transmission power of pilot signals within a peer-to-peer network may be proportional to the traffic transmission power for the transmitting device. The first transmitter device (third device WT-C) may then receive a first rate report from the first receiver device (fourth device WT-D), the first rate report including a maximum transmission rate selected by the first receiver device (fourth device WT-D) to receive communications from the first transmitter device (third device WT-C) 2614. For example, the first transmission rate may be the maximum rate at which the first receiver device (fourth device WT-D) can reliably decode a second traffic signal from the second transmitter device (first device WT-a) that is intended for the second receiver device (second device WT-B).

The first transmitter device (third device WT-C) may then send or transmit a first traffic signal to the first receiver device (fourth device WT-D) using a transmission rate lower than or equal to the maximum transmission rate 2616. Note that, in one example, traffic transmissions from the second transmitter device (first device WT-A) to the second receiver device (second device WT-B) are of higher priority than the traffic transmissions from the first transmitter device (third device WT-C) to the first receiver device (fourth device WT-D). According to one feature, the transmission power of the first traffic signal may be proportional to the transmission power of the pilot signal. The first traffic signal may be transmitted over a frequency spectrum shared with a second traffic signal transmitted from the second transmitter device (first device WT-A) to the second receiver device (second device WT-B).

Figure 27:
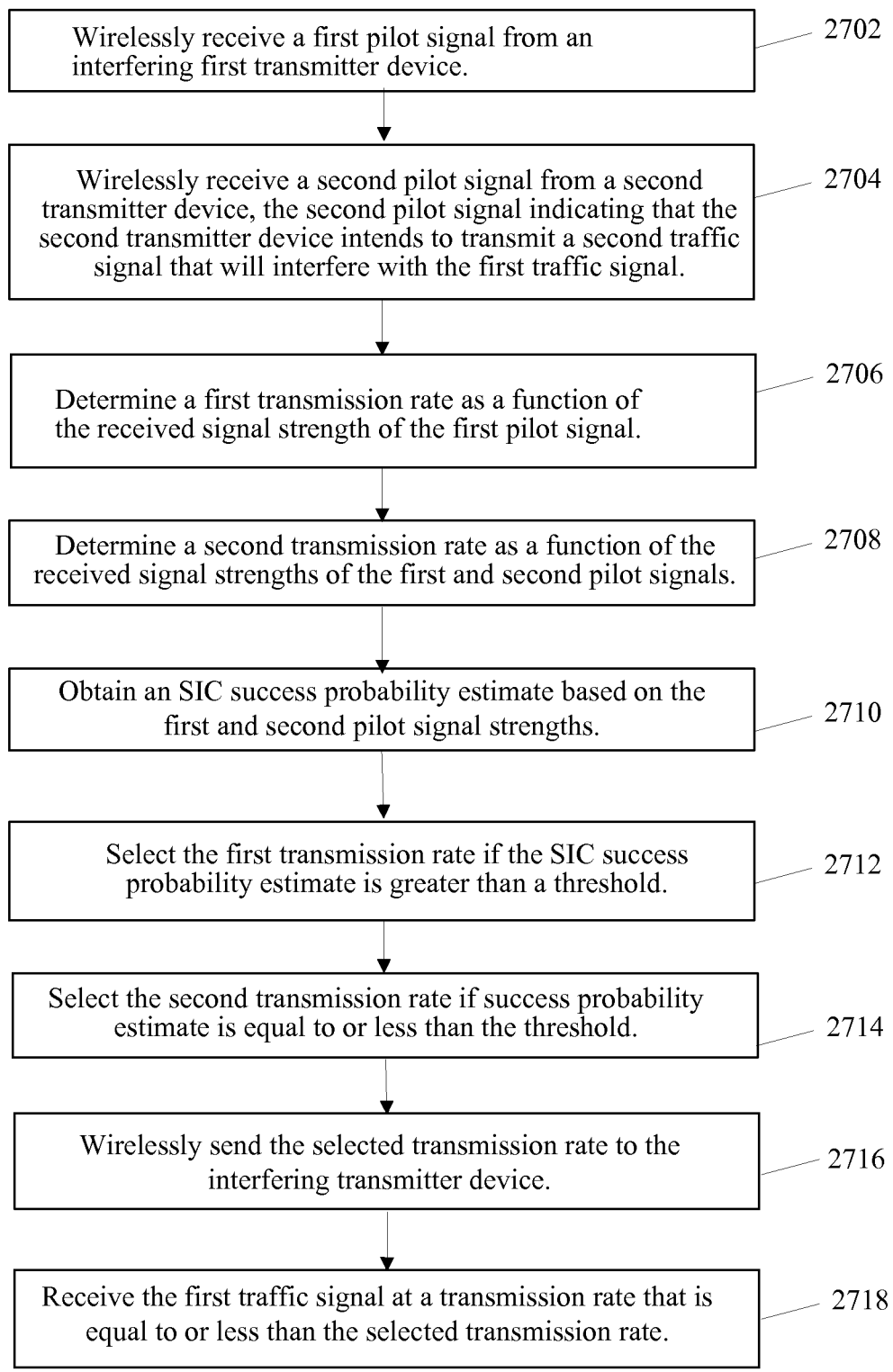
FIG. 27 illustrates an example of a method operational on a first receiver device that facilitates active successive interference cancellation within a peer-to-peer network.

FIG. 27 illustrates an example of a method operational on a first receiver device that facilitates active successive interference cancellation within a peer-to-peer network. In this example, the "fourth device" (WT D 308 in FIG. 3) is referred to as the first receiver device and the "third device" (WT C 306 in FIG. 3) is referred to as the first transmitter device. The "first device" (e.g., WT A 302 in FIG. 3) is referred to as the second transmitter device and the second device (e.g., WT B 304 in FIG. 3) is referred to as the second receiver device. In this example, traffic transmissions from the first transmitter device (third device WT-C) to the first receiver device (fourth device WT-D) may have a lower communication priority (over a shared frequency spectrum) than traffic transmissions from the second transmitter device (first device WT-A) to the second receiver device (second device WT-B).

The first receiver device (fourth device WT-D) may wirelessly receive a first pilot signal from the first transmitter device (third device WT-C) 2702. Additionally, the first receiver device (fourth device WT-D) may also wirelessly receive a second pilot signal from a second transmitter device (third device WT-C), the second pilot signal indicating that the second transmitter device (third device WT-C) intends to transmit a second traffic signal that will interfere with the first traffic signal 2704. The first receiver device (fourth device WT-D) may then determine a first transmission rate as a function of the received signal strength of the first pilot signal 2706. In one example, the first transmission rate may be a rate at which the first receiver device (fourth device WT-D) can decode transmissions from the first transmitter device (third device WT-C) assuming that it is able to first decode transmissions from the second transmitter device (first device WT-A) and subtract them from the overall received signal. Similarly, the first receiver device (fourth device WT-D) may determine a second transmission rate as a function of the received signal strengths of the first and second pilot signals 2708. In one example, the second transmission rate may be a rate at which the first receiver device (fourth device WT-D) can decode traffic transmissions from the interfering first transmitter device (third device WT-C) assuming everything else is treated as interference.

An SIC success probability estimate may then be obtained or calculated based on the first and second pilot signal strengths 2710. If the SIC success probability estimate is greater than a threshold, the receiver device selects the first transmission rate 2712. Otherwise, if the success probability estimate is equal to or less than the threshold, the first receiver device (fourth device WT-D) selects the second transmission 2714. The first receiver device (fourth device WT-D) then wirelessly sends the selected transmission rate to the interfering first transmitter device (third device WT-C) 2716. In response, the first receiver device (fourth device WT-D) may receive the first traffic signal at a transmission rate that is equal to or less than the selected transmission rate 2718.

Figure 28:
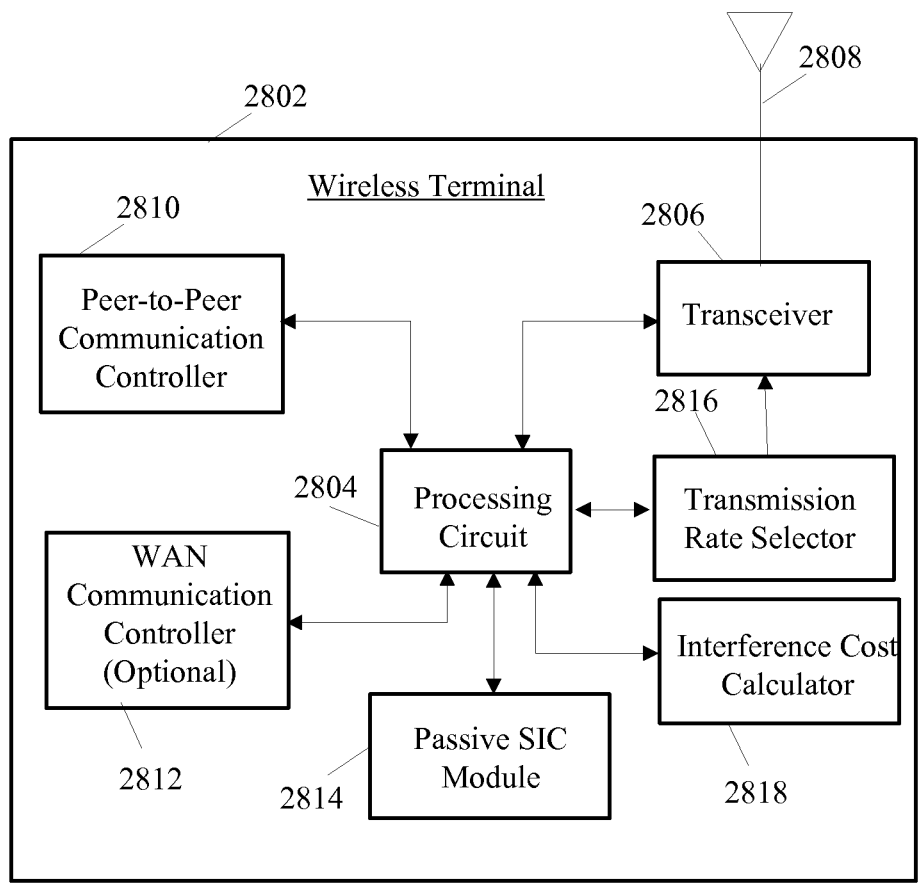
FIG. 28 is a block diagram illustrating a wireless terminal that is configured to perform or facilitate active successive interference cancellation (SIC) within a peer-to-peer wireless network.

FIG. 28 is a block diagram illustrating a wireless terminal that is configured to perform or facilitate active successive interference cancellation (SIC) within a peer-to-peer wireless network. The wireless terminal 2802 may include a processing circuit 2804 (e.g., one or more processors, electrical components, and/or circuit modules) coupled to a transceiver 2806 (e.g., transmitter and/or receiver modules) which is coupled to an antenna 2808 through which peer-to-peer communications can take place. The processing circuit 2804 may also be coupled to a peer-to-peer communication controller 2810 that may facilitate peer-to-peer communications and (optionally) a wide area network (WAN) communication controller 2812 that may facilitate communications over a WAN. The wireless terminal 2802 may also include an active successive interference cancellation module 2814 coupled to the processing circuit 2804, a transmission rate selector 2816 and an interference cost calculator 2818.

In one example, the wireless terminal 2802 may be configured to operate as a first transmitter device (third device WT-C) to adjust its transmission adjust its transmission power to reduce interference to other nearby devices while adjusting its transmission rate under the direction of its intended first receiver device (fourth device WT-C). In this configuration, the wireless terminal (first transmitter device) may be configured to perform the operations described in FIGS. 25 and 26.

Consequently, a circuit in a first transmitter device may be adapted broadcast a first transmission request to the first receiver device. The same circuit, a different circuit, or a second section of the same or different circuit may be adapted receive a first transmission request response from a second receiver device, the second transmission request response sent by the second receiver device in response to a second transmission request from a second transmitter device. The same circuit, a different circuit, or a third section of the same or different circuit may be adapted to calculate an interference cost to the second receiver device as a function of the received power of the first transmission request response. The same circuit, a different circuit, or a fourth section of the same or different circuit may be adapted to determine the transmission power for a pilot signal as a function of the calculated interference cost and the transmission power of the first transmission request. The same circuit, a different circuit, or a fifth section of the same or different circuit may be adapted to compare the calculated interference cost with a threshold; and wherein the determined transmission power of the pilot signal is smaller than the transmission power of the first transmission request if the calculated interference cost exceeds the threshold. The same circuit, a different circuit, or a sixth section of the same or different circuit may be adapted determine the transmission power for a pilot signal as a function of the calculated interference cost and the transmission power of the first transmission request. The same circuit, a different circuit, or an seventh section of the same or different circuit may be adapted to transmit the pilot signal using the determined transmission power. The same circuit, a different circuit, or a eight section of the same or different circuit may be adapted to receive a first rate report from the first receiver device, the first rate report including a maximum transmission rate selected by the first receiver device to receive communications from the first transmitter device. The same circuit, a different circuit, or a ninth section of the same or different circuit may be adapted to transmit a first traffic signal to the first receiver device using a transmission rate lower than or equal to the maximum transmission rate.

In one example, the wireless terminal 2802 may be configured to operate as a first receiver device (fourth device WT-D) to determine a maximum transmission rate which a first transmitter device (third device WT-C) should use in communicating with the first receiver device to facilitate SIC. In this configuration, the wireless terminal (first receiver device) may be configured to perform the operations described in FIGS. 25 and 27.

Consequently, a circuit in a mobile wireless terminal may be adapted to receive a first pilot signal from the interfering first transmitter device. The same circuit, a different circuit, or a second section of the same or different circuit may be adapted to receive a second pilot signal from a second transmitter device, the second pilot signal indicating that the second transmitter device intends to transmit a second traffic signal that will interfere with the first traffic signal. The same circuit, a different circuit, or a third section of the same or different circuit may be adapted to determine a first transmission rate as a function of the received signal strength of the first pilot signal. The same circuit, a different circuit, or a fourth section of the same or different circuit may be adapted to determine a second transmission rate as a function of the received signal strengths of the first and second pilot signals. The same circuit, a different circuit, or a fifth section of the same or different circuit may be adapted to obtain an SIC success probability estimate based on the first and second pilot signal strengths. The same circuit, a different circuit, or a sixth section of the same or different circuit may be adapted select the first transmission rate if the SIC success probability estimate is greater than a threshold. The same circuit, a different circuit, or a seventh section of the same or different circuit may be adapted to select the second transmission rate if success probability estimate is equal to or less than the threshold. The same circuit, a different circuit, or an eight section of the same or different circuit may be adapted to send the selected transmission rate to the interfering first transmitter device.

While some examples described herein may be implemented in the context of an OFDM TDD system, the methods and apparatus of various embodiments are applicable to a wide range of communications systems including many non-OFDM, many non-TDD systems, and/or many non-cellular systems.

In various embodiments terminals and/or devices described herein may be implemented using one or more modules to perform the steps corresponding to one or more methods. Such modules may be implemented using software, hardware or a combination of software and hardware. In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Numerous additional variations on the methods and apparatus described above will be apparent to those skilled in the art in view of the above descriptions. Such variations are to be considered within scope of the subject matter covered by the claims. The methods and apparatus of various embodiments may be, and in various embodiments are, used with CDMA, orthogonal frequency division multiplexing (OFDM), and/or various other types of communications techniques which may be used to provide wireless communications connections between access nodes and mobile terminals/devices. In some embodiments the access nodes may be implemented as base stations which establish communications connections with mobile terminals/devices using OFDM and/or CDMA. In various embodiments the mobile terminals and/or devices may be implemented as notebook computers, personal data assistants (PDAs), or other portable devices including receiver/transmitter circuits and logic and/or routines, for implementing the methods of various embodiments.

One or more of the components, steps, and/or functions illustrated in FIGS. 1-28 may be rearranged and/or combined into a single component, step, or function or embodied in several components, steps, or functions. Additional elements, components, steps, and/or functions may also be added. The apparatus, devices, and/or components illustrated in FIGS. 1, 3, 8, 11, 13, 17, 21, 24 and/or 28 may be configured or adapted to perform one or more of the methods, features, or steps described in FIGS. 2, 4-7, 9-10, 12, 14-16, 18-20, 22-23, and/or 25-27. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a first receiver device for performing successive interference cancellation (SIC) in an ad hoc peer-to-peer network, the first receiver device being the intended receiver of a first traffic signal to be transmitted from a first transmitter peer device, a second receiver device being the intended receiver of a second signal to be transmitted from a second transmitter peer device, comprising:
   establishing and maintaining an ad hoc peer-to-peer network that provides a direct link between the first transmitter device and the first receiver device, the ad hoc peer-to-peer network being established and maintained while avoiding an access point, base station, or central network controller;
   receiving a first pilot signal from the first transmitter device via the ad hoc peer-to-peer network;
   receiving a second pilot signal from the second transmitter device via the ad hoc peer-to-peer network, the second pilot signal indicating that the second transmitter device intends to transmit a second traffic signal; and
   determining a transmission rate for the first transmitter device as a function of the received signal strength of the first pilot and a predicted amount of the total interference to be perceived by the first receiver device, the predicted amount of the total interference being determined as a function of a SIC success probability.

2. The method of claim 1, further comprising:
   sending a rate report signal to the first transmitter device, the rate report signal including the transmission rate.

3. The method of claim 1, further comprising:
   predicting whether the interfering second traffic signal to be transmitted by the second transmitter device can be decoded and subtracted before the first receiver device decodes the first traffic signal to be transmitted by the first transmitter device as a function of the SIC success probability.

4. The method of claim 3, further comprising:
   predicting the amount of interference to be caused by the interfering second traffic signal to be transmitted by the second transmitter device as a function of the received signal strength of the second pilot and including the predicted amount of the interfering second traffic signal to be transmitted by the second transmitter device in the calculation of the predicted amount of the total interference to be perceived by the first receiver device if it is predicted that the interfering second traffic signal to be transmitted by the second transmitter device cannot be decoded and subtracted; and excluding the interfering second traffic signal to be transmitted by the second transmitter device in the calculation of the predicted amount of the total interference to be perceived by the first receiver device if it is predicted that the interfering second traffic signal to be transmitted by the second transmitter device can be decoded and subtracted.

5. The method of claim 1, further comprising:
predicting the amount of interference to be caused by the interfering second traffic signal to be transmitted by the second transmitter device as a function of the received signal strength of the second pilot signal;
discounting the predicted amount of interference to be caused by the interfering second traffic signal to be transmitted by the second transmitter device by a discounting factor as a function of the SIC success probability, the discounting factor being between zero and one; and
including the discounted predicted amount of interference to be caused by the interfering second traffic signal to be transmitted by the second transmitter device in the calculation of the predicted amount of the total interference to be perceived by the first receiver device.

6. The method of claim 1, further comprising:
receiving a traffic signal in a subsequent traffic channel, the received traffic signal including the first traffic signal from the first transmitter device, the first traffic signal having a data rate not exceeding the transmission rate reported by the first receiver device to the first transmitter device.

7. The method of claim 6, wherein the received traffic signal includes the interfering second traffic signal from the second transmitter device, the method further comprising:
decoding the interfering second traffic signal from the received traffic signal.

8. The method of claim 7, further comprising:
subtracting the decoded interfering second traffic signal from the received traffic signal if decoding the interfering second traffic signal succeeds; and
decoding the first traffic signal from the remaining portion of received traffic signal after the decoded interfering second traffic signal has been subtracted.

9. The method of claim 7, further comprising:
adjusting the value of the SIC success probability as a function of whether decoding the interfering traffic signal succeeds.

10. The method of claim 9, wherein the value of the SIC success probability is increased if decoding the interfering second traffic signal succeeds and the value of the SIC success probability is decreased if decoding the interfering second traffic signal fails.

11. The method of claim 1, wherein the second traffic signal will interfere with the first traffic signal.

12. The method of claim 1, wherein the first traffic signal is transmitted over a shared frequency spectrum and in an overlapping time interval as the second traffic signal transmitted by the second transmitter device to a second receiver device.

13. A first receiver device adapted for wireless peer-to-peer communications with a first transmitter device via an ad hoc peer-to-peer network, the first receiver device being the intended receiver of a first traffic signal to be transmitted from the first transmitter device, comprising:
a transmitter;
a receiver; and
a processing circuit adapted for wireless peer-to-peer communications through the transmitter and receiver over a peer-to-peer communication channel and configured to perform successive interference cancellation (SIC) by the first receiver device, the processing circuit configured to:
establish and maintain an ad hoc peer-to-peer network that provides a direct link between the first transmitter device and the first receiver device, the ad hoc peer-to-peer network being established and maintained while avoiding an access point, base station, or central network controller;
receive a first pilot signal from the first transmitter device via the ad hoc peer-to-peer network;
receive a second pilot signal from a second transmitter device via the ad hoc peer-to-peer network, the second pilot signal indicating that the second transmitter device intends to transmit a second traffic signal to a second receiver device; and
determine a transmission rate for the first transmitter device as a function of the received signal strength of the first pilot signal and a predicted amount of the total interference to be perceived by the first receiver device, the predicted amount of the total interference being determined as a function of a SIC success probability.

14. The first receiver device of claim 13, wherein the processing circuit is further adapted to:
send a rate report signal to the first transmitter device, the rate report signal including the transmission rate.

15. The first receiver device of claim 13, wherein the processing circuit is further adapted to:
predict whether the interfering second traffic signal to be transmitted by the second transmitter device can be decoded and subtracted before the first receiver device decodes the first traffic signal to be transmitted by the first transmitter device as a function of the SIC success probability.

16. The first receiver device of claim 15, wherein the processing circuit is further adapted to:
predict the amount of interference to be caused by the interfering second traffic signal to be transmitted by the second transmitter device as a function of the received signal strength of the second pilot and including the predicted amount of the interfering second traffic signal to be transmitted by the second transmitter device in the calculation of the predicted amount of the total interference to be perceived by the first receiver device if it is predicted that the interfering second traffic signal to be transmitted by the second transmitter device cannot be decoded and subtracted; and
exclude the interfering second traffic signal to be transmitted by the second transmitter device in the calculation of the predicted amount of the total interference to be perceived by the first receiver device if it is predicted that the interfering second traffic signal to be transmitted by the second transmitter device can be decoded and subtracted.

17. The first receiver device of claim 13, wherein the processing circuit is further adapted to:
predict the amount of interference to be caused by the interfering second traffic signal to be transmitted by the second transmitter device as a function of the received signal strength of the second pilot signal;
discount the predicted amount of interference to be caused by the interfering second traffic signal to be transmitted by the second transmitter device by a discounting factor as a function of the SIC success probability, the discounting factor being between zero and one; and include the discounted predicted amount of interference to be caused by the interfering second traffic signal to be transmitted by the second transmitter device in the calculation of the predicted amount of the total interference to be perceived by the first receiver device.

18. The first receiver device of claim 13, wherein the processing circuit is further adapted to:
receive a traffic signal in a subsequent traffic channel, the received traffic signal including the first traffic signal from the first transmitter device, the first traffic signal having a data rate not exceeding the transmission rate reported by the first receiver device to the first transmitter device.

19. The first receiver device of claim 18, wherein the received traffic signal includes the interfering second traffic signal from the second transmitter device, and the processing circuit is further adapted to:
decode the interfering second traffic signal from the received traffic signal.

20. The method of claim 19, wherein the processing circuit is further adapted to:
subtract the decoded interfering second traffic signal from the received traffic signal if decoding the interfering second traffic signal succeeds; and
decode the first traffic signal from the remaining portion of received traffic signal after the decoded interfering second traffic signal has been subtracted.

21. The first receiver device of claim 19, wherein the processing circuit is further adapted to:
adjust the value of the SIC success probability as a function of whether decoding the interfering traffic signal succeeds.

22. The first receiver device of claim 21, wherein the value of the SIC success probability is increased if decoding the interfering second traffic signal succeeds and the value of the SIC success probability is decreased if decoding the interfering second traffic signal fails.

23. A first receiver device adapted for wireless peer-to-peer communications with a first transmitter device via an ad hoc peer-to-peer network, the first receiver device being the intended receiver of a first traffic signal to be transmitted from the first transmitter device, comprising:
means for establishing and maintaining an ad hoc peer-to-peer network that provides a direct link between the first transmitter device and the first receiver device, the ad hoc peer-to-peer network being established and maintained while avoiding an access point, base station, or central network controller;
means for receiving a first pilot signal from the first transmitter device via the ad hoc peer-to-peer network;
means for receiving a second pilot signal, via an ad hoc peer-to-peer network, from a second transmitter device which intends to transmit to a second receiver device, the second pilot signal indicating that the second transmitter device intends to transmit a second traffic signal; and
means for determining a transmission rate for the first transmitter device as a function of the received signal strength of the first pilot and a predicted amount of the total interference to be perceived by the first receiver device, the predicted amount of the total interference being determined as a function of a SIC success probability.

24. The first receiver device of claim 23, further comprising:
means for sending a rate report signal to the first transmitter device, the rate report signal including the transmission rate.

25. The first receiver device of claim 13, further comprising
means for predicting whether the interfering second traffic signal to be transmitted by the second transmitter device can be decoded and subtracted before the first receiver device decodes the first traffic signal to be transmitted by the first transmitter device as a function of the SIC success probability.

26. The first receiver device of claim 23, further comprising:
means for receiving a traffic signal in a subsequent traffic channel, the received traffic signal including the first traffic signal from the first transmitter device and the interfering second traffic signal from the second transmitter device, the first traffic signal having a data rate not exceeding the transmission rate reported by the first receiver device to the first transmitter device.

27. The first receiver device of claim 26, further comprising:
means for decoding the interfering second traffic signal from the received traffic signal;
means for subtracting the decoded interfering second traffic signal from the received traffic signal;
means for decoding the first traffic signal from the remaining portion of received traffic signal after the decoded interfering second traffic signal has been subtracted; and
means for adjusting the value of the SIC success probability as a function of whether decoding the interfering traffic signal succeeds.

28. A circuit for performing successive interference cancellation (SIC) by a first receiver device in wireless peer-to-peer communications with a first transmitter device via an ad hoc peer-to-peer network, wherein the circuit is adapted to:
establish and maintain an ad hoc peer-to-peer network that provides a direct link between the first transmitter device and the first receiver device, the ad hoc peer-to-peer network being established and maintained while avoiding an access point, base station, or central network controller;
receive a first pilot signal from the first transmitter device via the ad hoc peer-to-peer network;
receive a second pilot signal, via the ad hoc peer-to-peer network, from a second transmitter device, the second pilot signal indicating that the second transmitter device intends to transmit a second traffic signal; and
determine a transmission rate for the first transmitter device as a function of the received signal strength of the first pilot and a predicted amount of the total interference to be perceived by the first receiver device, the predicted amount of the total interference being determined as a function of a SIC success probability.

29. The circuit of claim 28, wherein the circuit is further adapted to:
send a rate report signal to the first transmitter device, the rate report signal including the transmission rate.

30. The circuit of claim 28, wherein the circuit is further adapted to:
predict whether the interfering second traffic signal to be transmitted by the second transmitter device can be decoded and subtracted before the first receiver device decodes a first traffic signal to be transmitted by the first transmitter device as a function of the SIC success probability.

31. The circuit of claim 28, wherein the circuit is further adapted to:
receive a traffic signal in a subsequent traffic channel, the received traffic signal including a first traffic signal from the first transmitter device and the interfering second traffic signal from the second transmitter device, the first traffic signal having a data rate not exceeding the transmission rate reported by the first receiver device to the first transmitter device.

32. The circuit of claim 31, wherein the circuit is further adapted to:
decode the interfering second traffic signal from the received traffic signal;
subtract the decoded interfering second traffic signal from the received traffic signal;
decode the first traffic signal from the remaining portion of received traffic signal after the decoded interfering second traffic signal has been subtracted; and
adjust the value of the SIC success probability as a function of whether decoding the interfering traffic signal succeeds.

33. A non-transitory machine-readable medium comprising instructions for performing successive interference cancellation (SIC) in a first receiver device, the first receiver device in wireless peer-to-peer communications with a first transmitter device via an ad hoc peer-to-peer network, which when executed by a processor causes the processor to:
establish and maintain an ad hoc peer-to-peer network that provides a direct link between the first transmitter device and the first receiver device, the ad hoc peer-to-peer network being established and maintained while avoiding an access point, base station, or central network controller;
receive a first pilot signal from the first transmitter device via the ad hoc peer-to-peer network;
receive a second pilot signal, via the ad hoc peer-to-peer network, from a second transmitter device which intends to transmit to a second receiver device, the second pilot signal indicating that the second transmitter device intends to transmit a second traffic signal; and
determine a transmission rate for the first transmitter device as a function of the received signal strength of the first pilot and a predicted amount of the total interference to be perceived by the first receiver device, the predicted amount of the total interference being determined as a function of a SIC success probability.

34. The non-transitory machine-readable medium of claim 33 further comprising instructions to:
send a rate report signal to the first transmitter device, the rate report signal including the transmission rate.

35. The non-transitory machine-readable medium of claim 33 further comprising instructions to:
predict whether the interfering second traffic signal to be transmitted by the second transmitter device can be decoded and subtracted before the first receiver device decodes a first traffic signal to be transmitted by the first transmitter device as a function of the SIC success probability.

36. The non-transitory machine-readable medium of claim 33 further comprising instructions to:
receive a traffic signal in a subsequent traffic channel, the received traffic signal including a first traffic signal from the first transmitter device and the interfering second traffic signal from the second transmitter device, the first traffic signal having a data rate not exceeding the transmission rate reported by the first receiver device to the first transmitter device.

37. The non-transitory machine-readable medium of claim 36 further comprising instructions to:
decode the interfering second traffic signal from the received traffic signal;
subtract the decoded interfering second traffic signal from the received traffic signal;
decode the first traffic signal from the remaining portion of received traffic signal after the decoded interfering second traffic signal has been subtracted; and
adjust the value of the SIC success probability as a function of whether decoding the interfering traffic signal succeeds.

38. The method of claim 1, wherein the transmission rate is a first transmission rate that is a maximum rate at which the first receiver device can reliably decode the second traffic signal from the second transmitter device, wherein a second transmission rate is a maximum rate at which the first receiver device can reliably decode the first traffic signal from the first transmitter device assuming that the second traffic signal from the second transmitter device has been decoded and subtracted from the overall received signal.

39. The first receiver device of claim 13, wherein the transmission rate is a first transmission rate that is a maximum rate at which the first receiver device can reliably decode the second traffic signal from the second transmitter device, wherein a second transmission rate is a maximum rate at which the first receiver device can reliably decode the first traffic signal from the first transmitter device assuming that the second traffic signal from the second transmitter device has been decoded and subtracted from the overall received signal.

* * * * *